United States Patent
McCoy

(10) Patent No.: US 8,442,042 B2
(45) Date of Patent: May 14, 2013

(54) APPLIANCE AND A CONSUMABLE HOLDER WITH AN EMBEDDED VIRTUAL ROUTER

(75) Inventor: Richard A. McCoy, Stevensville, MI (US)

(73) Assignee: Whirlpool Corporation, Benton Harbor, MI (US)

(*) Notice: Subject to any disclaimer, the term of this patent is extended or adjusted under 35 U.S.C. 154(b) by 443 days.

(21) Appl. No.: 12/256,555

(22) Filed: Oct. 23, 2008

(65) Prior Publication Data

US 2009/0046715 A1    Feb. 19, 2009

Related U.S. Application Data

(63) Continuation-in-part of application No. 11/932,876, filed on Oct. 31, 2007, which is a continuation-in-part of application No. PCT/US2006/022503, filed on Jun. 9, 2006.

(60) Provisional application No. 60/595,148, filed on Jun. 9, 2005.

(51) Int. Cl.
*H04L 12/28* (2006.01)
*H04L 12/56* (2006.01)
*G06F 15/16* (2006.01)

(52) U.S. Cl.
USPC ............ 370/389; 370/254; 370/392; 709/201

(58) Field of Classification Search .......... 370/230–392; 340/825.69–72; 709/201–229; 710/302–304; 715/705–772; 719/328
See application file for complete search history.

(56) References Cited

U.S. PATENT DOCUMENTS

| | | | |
|---|---|---|---|
| 4,308,975 A | 1/1982 | Bowen | |
| 4,851,818 A | 7/1989 | Brown et al. | |
| 5,680,551 A | 10/1997 | Martino, II | |
| 5,812,393 A | 9/1998 | Drucker | |
| 5,888,381 A | 3/1999 | Primdahl et al. | |
| 6,024,867 A | 2/2000 | Parise | |
| 6,101,452 A | 8/2000 | Krall et al. | |
| 6,186,140 B1 | 2/2001 | Hoague | |
| 6,198,975 B1 | 3/2001 | Drucker et al. | |
| 6,233,619 B1 * | 5/2001 | Narisi et al. | 709/230 |

(Continued)

FOREIGN PATENT DOCUMENTS

| | | |
|---|---|---|
| DE | 20115173 U1 | 12/2001 |
| DE | 10144667 A1 | 3/2003 |

(Continued)

OTHER PUBLICATIONS

Beyond Microwave Spec Sheet found at http://www.smarthome.com/manuals/1304.pdf.

(Continued)

*Primary Examiner* — Man Phan
(74) *Attorney, Agent, or Firm* — Clifton G. Green; McGarry Bair PC

(57) ABSTRACT

An embedded virtual router is provided for a system comprising a device having a first software component configured to obtain and convey information associated with a consumable and an appliance having a second software component configured to perform a physical cycle of operation on an article using the consumable. The embedded virtual router encapsulates the two software components so that collaboration between them is uniform and identical whether the collaboration is over a network or sharing a runtime environment.

19 Claims, 34 Drawing Sheets

U.S. PATENT DOCUMENTS

| | | | |
|---|---|---|---|
| 6,289,396 B1 * | 9/2001 | Keller et al. | 719/323 |
| 6,312,589 B1 | 11/2001 | Jarocki et al. | |
| 6,424,991 B1 | 7/2002 | Gish | |
| 6,558,444 B1 | 5/2003 | Hunter | |
| 6,613,236 B1 | 9/2003 | Guess et al. | |
| 6,662,925 B2 * | 12/2003 | Franci | 198/370.05 |
| 6,672,097 B1 | 1/2004 | Ashley | |
| 6,681,137 B1 | 1/2004 | Drucker et al. | |
| 6,715,302 B2 | 4/2004 | Ferragut, II | |
| 6,747,367 B2 | 6/2004 | Cline et al. | |
| 6,802,186 B2 | 10/2004 | Holmes et al. | |
| 6,956,490 B2 | 10/2005 | Childers | |
| 7,011,044 B2 | 3/2006 | Segura Jobal | |
| 7,047,663 B2 | 5/2006 | Zhang et al. | |
| 7,117,051 B2 * | 10/2006 | Landry et al. | 700/83 |
| 7,172,121 B2 * | 2/2007 | Lawlor | 235/462.01 |
| 7,201,005 B2 | 4/2007 | Voglewede et al. | |
| 7,248,892 B2 | 7/2007 | White et al. | |
| 7,313,422 B2 | 12/2007 | White et al. | |
| 7,351,941 B2 * | 4/2008 | Kim | 219/702 |
| 7,353,073 B2 * | 4/2008 | Ferchau | 700/108 |
| 7,680,691 B2 * | 3/2010 | Kimball et al. | 705/22 |
| 2001/0025392 A1 * | 10/2001 | Youn et al. | 8/159 |
| 2001/0049846 A1 | 12/2001 | Guzzi et al. | |
| 2001/0052111 A1 | 12/2001 | Scott | |
| 2002/0040505 A1 * | 4/2002 | Tanaka et al. | 8/158 |
| 2002/0184401 A1 | 12/2002 | Kadel, Jr. et al. | |
| 2003/0126311 A1 | 7/2003 | Kushnirskiy et al. | |
| 2003/0167358 A1 | 9/2003 | Marvin et al. | |
| 2003/0168389 A1 | 9/2003 | Astle et al. | |
| 2003/0212654 A1 | 11/2003 | Harper et al. | |
| 2004/0051740 A1 | 3/2004 | Reichel et al. | |
| 2004/0057455 A1 * | 3/2004 | Choi | 370/463 |
| 2004/0240455 A1 * | 12/2004 | Shen | 370/400 |
| 2005/0033544 A1 | 2/2005 | Brooks et al. | |
| 2005/0152294 A1 | 7/2005 | Yu et al. | |
| 2005/0194317 A1 | 9/2005 | Ikeyama et al. | |
| 2005/0269403 A1 | 12/2005 | White et al. | |
| 2006/0030377 A1 | 2/2006 | White et al. | |
| 2006/0060214 A1 | 3/2006 | Rosenbauer | |
| 2006/0060512 A1 | 3/2006 | Astle et al. | |
| 2006/0081016 A1 | 4/2006 | Hsu et al. | |
| 2006/0106934 A1 * | 5/2006 | Figaro et al. | 709/227 |
| 2006/0123570 A1 | 6/2006 | Pace et al. | |
| 2006/0157391 A1 | 7/2006 | Astle et al. | |
| 2006/0179583 A1 | 8/2006 | Ambuter et al. | |
| 2006/0190266 A1 * | 8/2006 | Tanigawa et al. | 704/273 |
| 2006/0221981 A1 * | 10/2006 | Ashwood-Smith et al. | 370/400 |
| 2006/0272359 A1 | 12/2006 | Kang | |
| 2007/0001005 A1 | 1/2007 | White et al. | |
| 2007/0102024 A1 | 5/2007 | Classen | |
| 2007/0153808 A1 * | 7/2007 | Parker et al. | 370/395.53 |
| 2007/0162783 A1 * | 7/2007 | Talaugon et al. | 714/4 |
| 2008/0047958 A1 | 2/2008 | Cole et al. | |
| 2008/0180228 A1 | 7/2008 | Wakefield et al. | |
| 2008/0181172 A1 | 7/2008 | Angelhag et al. | |
| 2009/0073977 A1 * | 3/2009 | Hussain et al. | 370/389 |
| 2010/0094980 A1 * | 4/2010 | Sarkar et al. | 709/221 |

FOREIGN PATENT DOCUMENTS

| | | |
|---|---|---|
| EP | 1010971 A1 | 6/2000 |
| EP | 1063340 A1 | 12/2000 |
| EP | 1088927 A1 | 4/2001 |
| EP | 1880647 A1 | 1/2008 |
| JP | 2004030631 A | 1/2004 |
| JP | 20050224271 A | 8/2005 |
| WO | 02/20893 A1 | 3/2002 |
| WO | 02/077353 A1 | 10/2002 |
| WO | 03/029550 A1 | 4/2003 |
| WO | 03/048027 A2 | 6/2003 |
| WO | 03/054825 A2 | 7/2003 |
| WO | 2004/085027 A1 | 10/2004 |
| WO | 2005/070816 A1 | 8/2005 |
| WO | 2006/055295 A1 | 5/2006 |
| WO | 2006/071364 A1 | 7/2006 |
| WO | 2007/004173 A1 | 1/2007 |
| WO | 2007/033212 A2 | 3/2007 |
| WO | 2008/016683 A1 | 2/2008 |
| WO | 2008/027910 A1 | 3/2008 |

OTHER PUBLICATIONS

Beyond Microwave Scanning Illustration of Microwave Control Panel found at http://www.smarthome.com/images/1304side2big.gif.

Amazon.com Customer Reviews of Beyond WBYMW1 850-Watt Microwave Oven with Barcode Scanning found at http://www.amazon.com/review/product/B0000C8W7Z/ref=cm.

Reviews OnLine: International Housewares Show: Millennium Edition found at http://www.reviewsonline.com/ihs00.htm.

Halfbakery: Microwave Dinner Bar Codes found at http://www.halfbakery.com/idea/Microwave_20Dinner_20Bar_20Codes#977331600.

\* cited by examiner

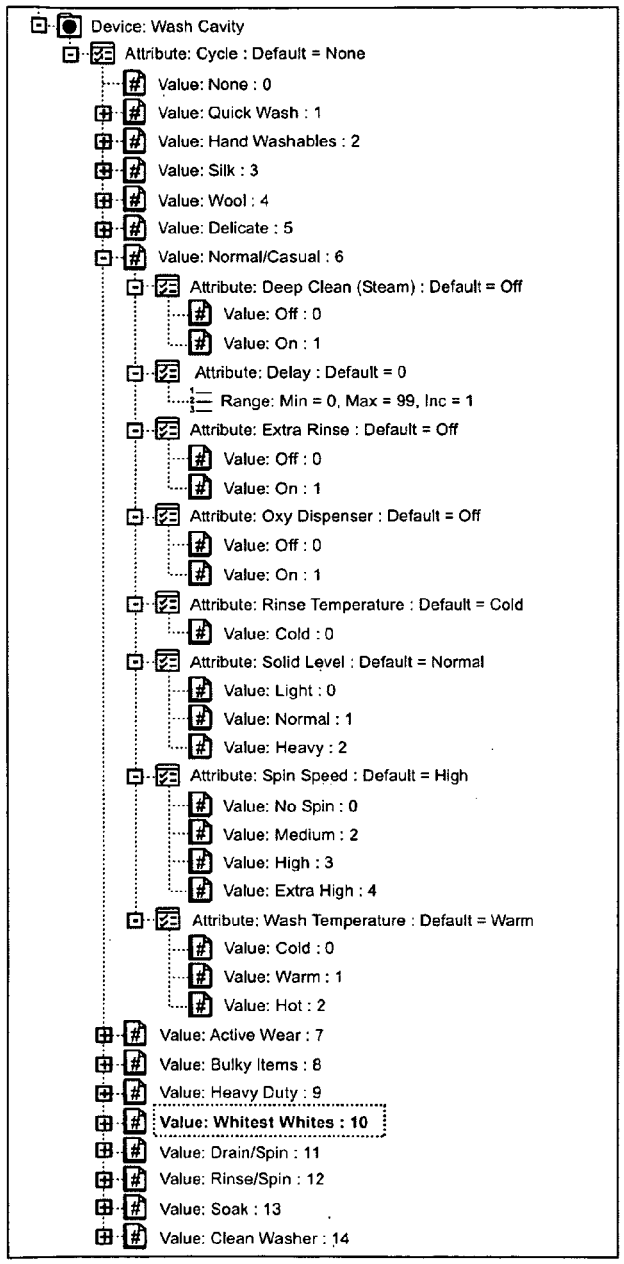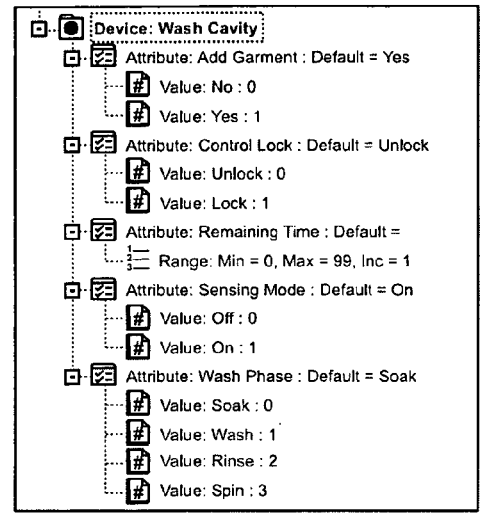
Fig. 29
Fig. 28

APPLIANCE AND A CONSUMABLE HOLDER WITH AN EMBEDDED VIRTUAL ROUTER

CROSS-REFERENCE TO RELATED APPLICATION

This application is a continuation-in-part of U.S. patent application Ser. No. 11/932,876, filed Oct. 31, 2007, which is a continuation-in-part of International Patent Application No. PCT/US2006/022503, filed Jun. 9, 2006, which further claims priority on U.S. Provisional Patent Application No. 60/595,148, filed Jun. 9, 2005.

BACKGROUND OF THE INVENTION

1. Field of the Invention

The invention relates to devices that hold consumables used by or operated on by a communicating appliance.

2. Description of the Related Art

Household appliances typically operate on an article using one or more cycles of operation. Many appliances perform the cycles of operation using a consumable. A consumable comprises a finite supply of at least one product or a perishable good that must be periodically replenished or replaced. For example, a washing machine might use a detergent and a fabric softener while washing clothes, or a dishwasher might use a detergent and a water softener while washing dishes. In some cases, appliances perform cycles of operation on a consumable as the article. A consumable may be a food item where, for example, a range oven or a microwave oven might perform a cycle of operation on the consumable.

In performing a cycle of operation, an appliance may also use a resource. A resource comprises a product or good that is in relatively constant and unlimited supply. Common resources include utilities, such as water, electricity, air, or gas. Sometimes a consumable is mixed with a resource, as for example, when a detergent is mixed with water.

It is known to provide communication between an appliance and a device that affects use of a consumable by the appliance. However, there is a need to improve communication between consumable holders and appliances or between consumables and appliances.

SUMMARY OF THE INVENTION

According to the invention, an embedded virtual router is provided for a system comprising a device having a first software component configured to obtain and convey information associated with a consumable and an appliance having a second software component configured to perform a physical cycle of operation on an article using the consumable. The first and second software components collaborate with each other by at least one method of access or exposure to each other to facilitate the cycle of operation. The embedded virtual router encapsulates routing information about the locations of the first and second software components wherein collaboration between the first and second software components is uniform and identical whether the collaboration is over a network or within a shared runtime environment.

In another aspect of the invention, a system comprises a device having a first memory and a first software component configured to obtain and convey information associated with a consumable and an appliance having a second memory and a second software component configured to perform a physical cycle of operation on the consumable or on an article using the consumable. The first and second software components collaborate with each other by using identification and routing information to facilitate the cycle of operation, and an embedded virtual router in each of the first and second memories encapsulates the identification and routing information associated with the first and second software components. Thus, messages can be routed to or through one of the first and second software components using the encapsulated identification and routing information so that collaboration between the first and second software components is independent of architecture dependencies.

In a further aspect of the invention, a system comprises a device having a first memory and a first software component configured to obtain and convey information associated with a consumable and an appliance having a second memory and a second software component configured to perform a physical cycle of operation on the consumable or on an article using the consumable. The first and second software components are configured to collaborate with each other by using identification and routing information to facilitate the cycle of operation, and each of the first and second memories comprises an embedded virtual router having an encapsulation of identification and routing information associated with the first and second software components. The collaboration comprises a message from the first software component to the second software component that invokes a software function linked to the encapsulated identification and routing information. Thus, messages can be routed to or through one of the first and second software components using the encapsulated identification and routing information so that collaboration between the first and second software components is independent of architecture dependencies

BRIEF DESCRIPTION OF THE DRAWINGS

In the drawings:

FIG. 28 illustrates an exemplary data structure used in the taxonomy architecture of the invention.

FIG. 29 illustrates a second exemplary data structure used in the taxonomy architecture of the invention.

DESCRIPTION OF THE INVENTION

Appliances and Consumables

Figure 1:
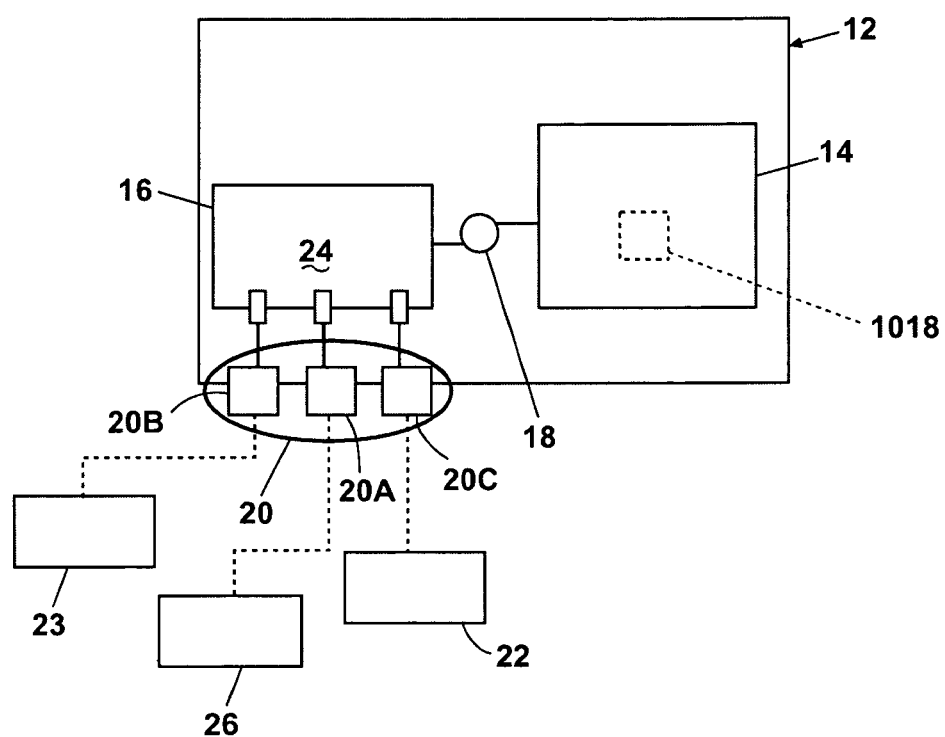
FIG. 1 is a schematic view of an appliance coupled to and comprising a consumable holder according to the invention.

Looking first at FIG. 1, an embodiment of the invention comprises an appliance 12 having a process control apparatus 14 and a consumable holder 16. The appliance 12 is configured to perform an operation on a physical article, such as clothing or food, using a resource such as water, temperature-controlled air (hot or cold), steam, gas, electricity, and the like. The process control apparatus 14 is configured to implement and control a cycle comprising at least one operation.

The process control apparatus 14 can comprise one or more components, such as electronic control boards, wiring and wiring harnesses, power-supplies, sensors integrated with the electronics as digital or analog inputs, and actuators like valves, relays, heaters, and the like, any or all of which can integrate with the electronics as digital or analog outputs. Examples of appliances 12 that perform an operation on a physical article include a wide range of device types, including but not limited to, washers, dryers, ovens, ranges, steam cookers, ice makers, refrigerators, drink makers and the like. Articles are the objects upon which a user intends the appliance to perform its cycle of operation. Typical examples as mentioned above would include food and clothing.

The consumable holder 16 is configured to hold, carry, supply, communicate with, or otherwise interact directly with a consumable 24. When performing a cycle of operation on an article, the appliance 12 will often use at least one consumable 24. A consumable 24 in one sense comprises a substance, device, or other product that would be at least partially consumed or transformed by an appliance during a cycle of operation on an article, such that the consumable must be periodically replaced or replenished. The period after which the consumable must be replaced or replenished can be but is not limited to a single cycle of operation, multiple cycles of operation, an amount of time, or a number of uses. For example, many common washing machines require that a user place a single dose of detergent in a dispenser prior to initiating a cycle of operation. For each subsequent cycle of operation, the user must again place a single dose in the dispenser, as a single dose of detergent is consumed by the washing machine during each cycle of operation.

In some cases, the consumable can be the article on which the appliance 12 performs the cycle of operation, and the consumable can be subsequently consumed by a user. Thus, a consumable 24 also includes anything that would be consumed or otherwise used by a person, such as food, beverages, cosmetics, or medicine. For example, in a cooking or refrigeration appliance, the consumable can be a food item, and the cycle of operation comprises heating or cooling the food.

Consumables are to be distinguished from resources, although resources may in some circumstances be "consumed" during a cycle of operation. Resources are fluid or gas commodities that are continuously available to an appliance, and used by the appliance in its cycles of operation on articles. Typical examples as mentioned above would include water and air. In some cases, a resource may also be considered an article as in a refrigerator that chills and dispenses water. Water in that instance is a resource (continuously available to the refrigerator), but also an article (intended by the user for the refrigerator to act upon). The cycles of operation would include the chilling and dispensing. Things that hold or supply resources such as water supply lines or air conduits are not considered consumable holders 16. They would be "resource holders", which can be supplied by resource providers. In a refrigerator, for example, water supplied to the appliance 12 would be considered a resource and/or an article. If flavoring is mixed with the water supplied to the appliance 12, the flavoring can be considered a consumable 24, and whatever holds/supplies the flavoring to be the consumable holder 16.

Consumables are also to be distinguished from parts in an appliance, although parts wear out and need to be replaced or replenished as do consumables. Parts are devices, without which a cycle of operation by the appliance or a principal function of the appliance would be hampered. Examples include valves, actuators, switches, tubes, lamps, wiring, motors, pumps, seals, gears and the like. Consumables, one the other hand, are not critical to the operation of the appliance, although they provide huge benefits to a user of the appliance. An appliance can typically still operate on an article in some fashion without a consumable.

Other examples further illustrate the foregoing distinctions. Consider using an oven to cook a turkey in a roasting pan where there is a steam dispenser with a basting cartridge for automatic basting. The turkey is the article upon which the appliance (the oven) performs its cycle of operation (cooking). But the turkey is also a consumable in the sense that it is a food item to be consumed by the user. The basting cartridge would be a consumable holder and its contents a consumable. The water used to generate the steam is a resource, making the steam a changed resource. The roasting pan would be a second consumable holder, holding the turkey. In accord with the invention, the appliance or the roasting pan or some other device (such as a performance tag described below) might also hold information about the turkey or how to cook a turkey or how to cook a turkey in different kinds of ovens. Such information would be considered information about a consumable and information about a cycle structure.

Consider also a powdered detergent box with a performance tag configured to communicate with an appliance contemporaneously with the dispensing of the detergent to a washer. The washer is the appliance, the detergent is a consumable, and the box is a consumable holder. The performance tag can hold information about the chemistry of the powder, information about cycle structures, and data about cycle structures wherein the information and data are associated with other information comprising appliance types, fabric types, stain types, and the like so that the data and information can be used alone or combined with the other information to create a cycle of operation in response to the data and the information and the other information and in response to the user and the user preferences about the cycle of operation, the data, the information, and the other information.

Consider also a detergent pellet with an etched or embossed or imprinted cycle structure enabled to communicate with an appliance contemporaneously with being introduced into a washing machine before or during a wash cycle. Here, the washing machine is an appliance and the detergent pellet is a consumable. There is no separate consumable holder. The cycle structure is intended to effect the cycle of operation (washing). Consider also a detergent pellet having a data pod. The detergent pellet is a consumable, but the data pod is a form of performance tag that could communicate with an appliance contemporaneously with being introduced into the use environment for the purpose of effecting the cycle of operation.

In accord with the invention, a consumable or a consumable holder or a performance tag or data pod or anything that can hold and convey information (consumable information holder) might comprise one or more cycle structures. A first cycle structure can be associated with a first appliance or first appliance type and a second cycle structure can be associated with a second appliance or a second appliance type such that the appropriate cycle structures are introduced to the appropriate appliance or appliance type when the consumable or consumable holder is in useful communication with the appliances. For example, a frozen food (a consumable) or a package of frozen food (a consumable holder) might have cycle instructions for freezing, defrosting, or preserving cycles in a refrigerator or freezer appliance, and also might have cycle instructions for defrosting, cooking, or warming cycles for a cooking appliance like an oven or microwave.

A consumable information holder can comprise one or more user interface data sets, with or without cycle structures, which can be communicated to a user interface, such as might be on the appliance. User interface data is considered to include anything that can be rendered to be responsive to a user's senses, such a visual displays, audible sounds, and tactile displays. A first user interface data set can be associated with a first appliance or first appliance type and a second user interface data set can be associated with a second appliance or a second appliance type such that the appropriate user interface data are conveyed to a user interface associated with the appropriate appliance or appliance type when the consumable or consumable holder is in useful communication with the appliances. For example, a frozen food (a consumable) or a package of frozen food (a consumable holder) might convey to a refrigerator an expiration date to be rendered on a user interface on the refrigerator. The frozen food or its package might also convey to an oven serving suggestions to be rendered on a user interface on the oven.

Consumables, consumable holders, performance tags, data pods and the like (consumable information holders) can be enabled not only to provide data, but also can be configured to receive and store information associated with the consumable in accord with the invention. Exemplary information includes data about a consumable, a cycle structure, data about a cycle structure, tracking the number of times a shirt or a dish is washed, the number of cycles and the parameters thereof which have been executed by or in combination with an appliance and consumable holder, the types of consumables introduced into the use environment, information entered into an appliance user interface including cycle selections, usage patterns, user information, user identification, other data associated with the cycle of operation of an appliance, and any data held by a datasource in communication with the holder, tag, or pod which either the datasource writes to the holder, tag, or pod or any data or the holder, tag, and pod reads from the datasource. Such information can be sequentially added to a database on the consumable information holder for later retrieval. For example, a shirt with a performance tag can keep data about how many times it has been washed, about different wash cycles it has been through, and the specific machines it has been washed in.

More specific examples of consumables 24 for use with/by appliances 12 include dispensing additives for laundry washers, dryers, or combination washer/dryer appliances. The additives can include, but are not limited to, normal detergents, gentle detergents, dark clothing detergents, cold water detergents, fabric softeners, chlorine bleaches, color-safe bleaches, and fabric enhancement chemistry. Non-limiting examples of fabric enhancers are additives to provide stain resistance, wrinkle resistance, water repellency, insect repellency, color fastness, fragrances, and anti-microbials.

An additive dispenser in this case would be a consumable holder 16 and can be a single load dispenser that dispenses all of additive contained therein during a single cycle or a bulk dispenser that dispenses only some of the additive contained therein during a single cycle. An appliance comprising a bulk dispenser can meter and dispense the correct amount of additive for each particular load and provide information to the user regarding the remaining amount of additive in the bulk dispenser after dispensing.

Because each additive can have different parameters associated with its use, information about each consumable can be provided with each consumable 24. This information can be provided on the packaging of the consumable 24 (the consumable holder), in the consumable 24, or by any other suitable means (performance tag, data pod, user interface, etc.). For example, different additives can have different concentrations, and the amount of a given additive needed for a particular load will vary depending on the concentration of that additive. The amount of a particular additive needed to complete a cycle of operation will also depend on the amount and type of laundry being treated, as well as the condition of the laundry (e.g. soil and stain level). The amount, type, and condition of the laundry can be determined utilizing information supplied by the user, information gathered by sensors associated with the appliance, or information otherwise obtained during the operation of the appliance 12.

Additional information provided with the consumable can also be used to tailor the cycle of operation to that consumable 24. In a laundry application, the additive will have to be dispensed at the right time during the cycle, such as before, during, or after wash, rinse, spin, or drying. Particular additives can also require that they are dispensed under certain conditions, such as at a given water temperature or air temperature. Additionally, particular additives might require at least one additional step in a cycle for optimal performance. For example, the presence of a particular additive might require that the cycle structure be augmented by inserting an additional ordered collection of steps such as filling at a new temperatures to a new level after spinning, then soaking for an amount of time, then draining, then spinning for a new amount of time at a new spin speed between the original step in the cycle and the last step in the cycle.

The appliance process control apparatus 14 or the consumable holder 16 can determine parameters to be used for the cycle of operation or the structure of the appropriate cycle of operation or changes to an existing cycle of operation for different operations based on the information provided with the consumable 24, user input, and information obtained by sensors associated with the appliance 12. Exemplary types and sources of information are found in the following table:

| Information provided from the consumable or consumable holder | Information provided by the user | Information provided by appliance sensors |
| --- | --- | --- |
| New Order Collection of Cycle Steps, Actions for Each Steps, a plurality of Transition Logic expressions for each step, and the relationships between steps, actions, and logic expressions. | Fabric type | Soil level |
| Additive type | Desired cycle | Load weight |
| When in cycle to dispense | Fabric type | Load absorption |
| Any special cycle parameters | Load size | Additive remaining in dispenser |
| Amount to dispense for a standard load | Fabric condition (soil level, stains, etc.) | Soil level |
| Special dispenser maintenance considerations | Dispensing compartment used | |

Another example of consumables contemplated by the invention includes filters used by an appliance 12. Refrigerators, dryers, washers, and dishwashers are all known to use filters that are consumed in the sense that they must be replaced after a certain amount of time or usage due to wear and dirtying of the filter. Filters, in particular, depending on the embodiment may be construed as a consumable, a consumable holder, or both. For example, if there is a filter assembly holding a filtering material, then the filter assembly may be considered a consumable holder and the filtering material can be considered a consumable because it is disposed of after it usability is consumed; its life and the life of the consumable holder are significantly different. On the other hand, the filter assembly and the filter material can be integrally formed and introduced and removed from the use environment as a unit. In this case, the assembly and the filter material would be considered both a consumable holder and consumable because the assembly and the filter material comprise functionality and attributes of both consumable holders and consumables.

Consumables can also include food, as mentioned above, and articles of clothing. Such consumables may or may not be contained by a consumable holder. However, non-contained consumables can still have consumable holder functionality in that they can comprise information about the consumable that is retrievable by the appliance. For example, a food item can carry information about itself that is contained in edible ink printed on the surface of the food item.

The appliance 12, the consumable holder 16, or both comprise at least one interface 18 to couple the appliance and the consumable holder to each other. The interface 18 can be an internal or external interface and can be configured to receive, connect to, or otherwise couple the consumable holder 16 and the appliance 12. One or more interfaces 20 can couple the appliance 12 and/or the consumable holder 16 to an external source or device, such as a power source, a consumable source and/or a consumable reader. Either interface 18, 20 can comprise any number of coupling points, such as coupling points 18A-18F and 20A-20C for various purposes.

The coupling points in an interface 18, 20 can be configured for coupling to a consumable holder 16, an appliance 12, a component that can facilitate engagement or interaction with a consumable holder 16, or any other source or device to be used with the appliance 12 and/or consumable holder 16. For example, a coupling point 20C can be configured for connection to a consumable reader 22. Alternatively, the consumable reader 22 can be incorporated into the appliance 12, and a sensor can be connected to the appliance 12 and/or the consumable reader 22 via a coupling point 20C. Further, a coupling point 20A can couple the consumable holder 16 to a bulk source 26 of a consumable 24, such as a large bottle of detergent. A coupling point 20B can also couple an external power source 23 to the appliance 12 or to the consumable holder 16.

Preferably, the appliance 12 and the process control apparatus 14 include software architecture 1018 enabling the appliance to discover a consumable holder 16 using network messages. For this purpose, the process control apparatus 14 can comprise at least one functional identifier and can send or receive messages to for the discovery of functionalities, as discussed later. Likewise, the consumable holder 16 can also comprise an instance of the software architecture 1018 and/or an SA Driver 1016, which will be discussed in more detail hereinafter with respect to FIG. 8.

Consumable Holder

The consumable holder 16 comprises a device that holds or contains a consumable 24. Typically the consumable 24 is contained by a receptacle of some sort, such as a container, a dispenser, a cartridge, a dish, a bag, a carton, a conduit, or the like. In some cases, consumable holders 16 can be nested within other consumable holders 16. For example, a cartridge holding a consumable can be disposed in a dispenser, which is another consumable holder 16.

In some cases articles on which the appliance operates—such as clothes, dishes, and food stuffs—may not be contained by receptacles and may not be consumables or consumable holders in the sense herein defined, but rather articles enabled to perform at least some of the inventive functionalities of a consumable 24 and/or consumable holder 16. An example of an article with consumable holder 16 capabilities is a shirt having a bar code thereon containing information that is directly readable by an appliance 12. The bar code can be, for example, on a performance tag. The appliance 12 can use data and/or information represented by the bar code for use in configuring and selecting the cycle of operation of the appliance. The bar code can be read by the appliance 12 while the shirt is being operated on contemporaneous with the cycle of operation.

A performance tag is an information holder either integrally formed or selectively attached to an article and adapted to maintain its integrity over the life of the article. For example, a performance tag for clothing would be adapted to maintain its integrity throughout the repeated processes of washing in a washing machine appliance, drying in a dryer, being cleaned at a dry cleaners, being ironed, being left in the sun, and being subjected to the impacts sustained during usage. Examples of impacts during usage for a shirt might occur during a soccer match where the shirt impacts the earth and other players at considerable speeds and forces repeatedly. Likewise, performance tags for dishes would be subjected to similar impacts, and similar wash and dry cycles from a dishwasher. Performance tags integrally formed with fabric items might be sewn in, glued in, woven in, stamped on, or printed on during the manufacturing of the article or by a home machine adapted to integrate the article and the tag. Performance tags integrally formed with dishware might be glued, stamped, printed, embossed, cast, molded, or otherwise formed during the manufacturing of the article or by a home machine adapted to integrate the article and the tag. Performance tags that are selectively attached to an article could be attached by sewing, gluing, pining, sticking, printing, embossing, or other like methods in the home environment for articles not specifically adapted for receiving a performance tag. Performance tags are constructed of any suitable material which can be used to hold encoded information about a cycle structure, a cycle structure, or information about a consumable, the description of which is contained herein. Examples of materials for holding the information include magnetic strips, bar codes, and images of encoded data including color patterns, shape patterns, plain texts, numeric identifiers, and the like. An appliance having a cycle architecture and being in communication with a performance tag (as for example by using a consumable reader) can optimize the cycle of operation in the appliance for the article in response to the cycle structure, data about a cycle structure, and/or data about a consumable held by the performance tag. Performance tags can either hold information or hold other information about how to find the information. An example of a performance tag that holds other information is a performance tag holding a URL wherein the data returned when invoking the URL is the information. Further, the appliance can alter or optimize the user experience further by providing information on a user interface in response to the cycle structure, data about a cycle structure, and/or data about a consumable.

A consumable holder 16 can be integral with the appliance 12, as for example, installed during manufacture and sold with the appliance, or it can be made and sold separately as an upgrade or addition. It can be disposed inside or outside or on the appliance. The interface 18 can comprise at least one coupling point to couple the consumable holder 16 to the appliance 12, and the interface 20 can comprise at least one coupling point to couple the appliance 12 to an external resource or device, or couple the consumable holder 16 to an external resource or device. A coupling can be a physical coupling or a coupling can be an electrical or wireless coupling. For example, a coupling 20 can comprise a scanner and an image to be scanned, such as a barcode. Any coupling point in the interface 18 can be configured such that the consumable holder 16 can be selectively or permanently coupled to the appliance 12. Coupling points can also be used to couple electronics in a consumable holder to a device such as a sensor or actuator, or to couple electronics in an appliance to a device such as a sensor or actuator. In certain embodiments, electronics in a consumable holder can directly couple the appliance to a device such as a sensor or actuator with the use of a coupling point.

Figure 2:
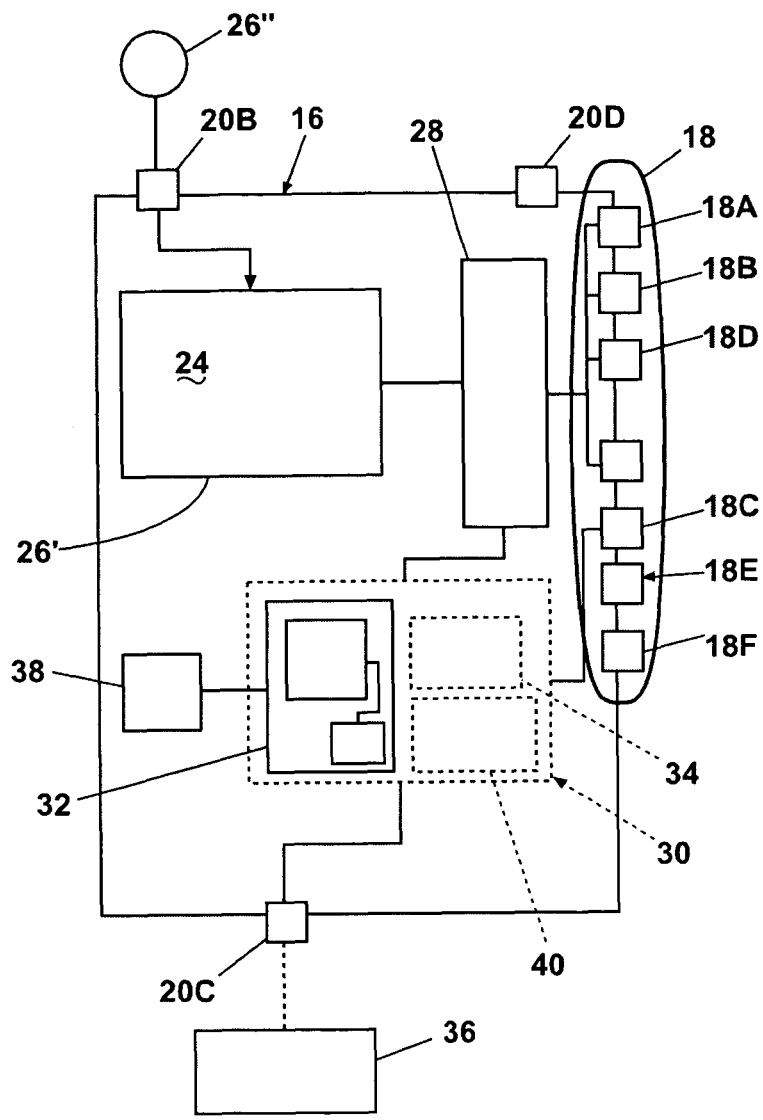
FIG. 2 is a schematic view of a consumable holder according to the invention.

Referring now also to FIG. 2, the consumable holder 16 can be in the appliance as in FIG. 1, or separate from the appliance as contemplated in FIG. 2. Either way, the consumable holder 16 can be connected to the appliance 12 by at least one interface 18 comprising a plurality of coupling points 18A-F. The interface 18 is configured to communicatively couple the consumable holder 16 to the process control apparatus 14 of the appliance 12. Each coupling point can enable a different function. For example, a resource coupling point 18A can facilitate transmission of the resource to a consumable holder 16, a resource coupling point 18B can facilitate transmission of the resource back to the appliance 12, a data coupling point 18C can facilitate data exchange between the appliance 12 and a consumable holder 16, a consumable coupling point 18D can facilitate transmission of a consumable 24 to the appliance 12, and a circuit coupling point 18E can couple a circuit to a consumable holder 16 to trigger an actuator in the consumable holder 16 or in the appliance 12. Resource and consumable transmission between the consumable holder 16 and the appliance 12 will normally require a physical coupling. Data exchange and circuit coupling can require electrical connections, wireless connections, or optical coupling points. In another embodiment, a coupling point 18E can facilitate transmission of a changed resource from the consumable holder 16 to the appliance 12. A changed resource may be one whose properties have been changed by a chemical, thermal, electrical, or other type of process. For example a changed resource may be one that has been heated, cleaned, cooled, mixed with a consumable, or generally treated in such a way that it has at least one property with a different value.

The interface 18 can also include a power coupling point 18F. The coupling point 18F can deliver power to a consumable holder 16 or it can deliver power to the process control apparatus 14. Coupling point 18F can comprise a power connection adapted to transmit power to a consumable holder 16. The power can be conventional AC at 110 V, DC at 12 V, or even less, such as the power that is transmitted by a USB connection. In some cases, the data coupling point 18C or the circuit coupling point 18E can also function as a power source.

Continuing with FIG. 2, the consumable holder 16 has an internal source 26' and/or an external source 26" of a consumable 24, such as a reservoir, bottle, conduit, dispenser or bulk dispenser, cartridge, another appliance, another consumable holder, or a connection to a dispenser. The consumable holder 16 can also have its own holder process control apparatus 28 to control the dispensing or transmission of a consumable 24 from the source 26, 26', or 26".

Figure 21:
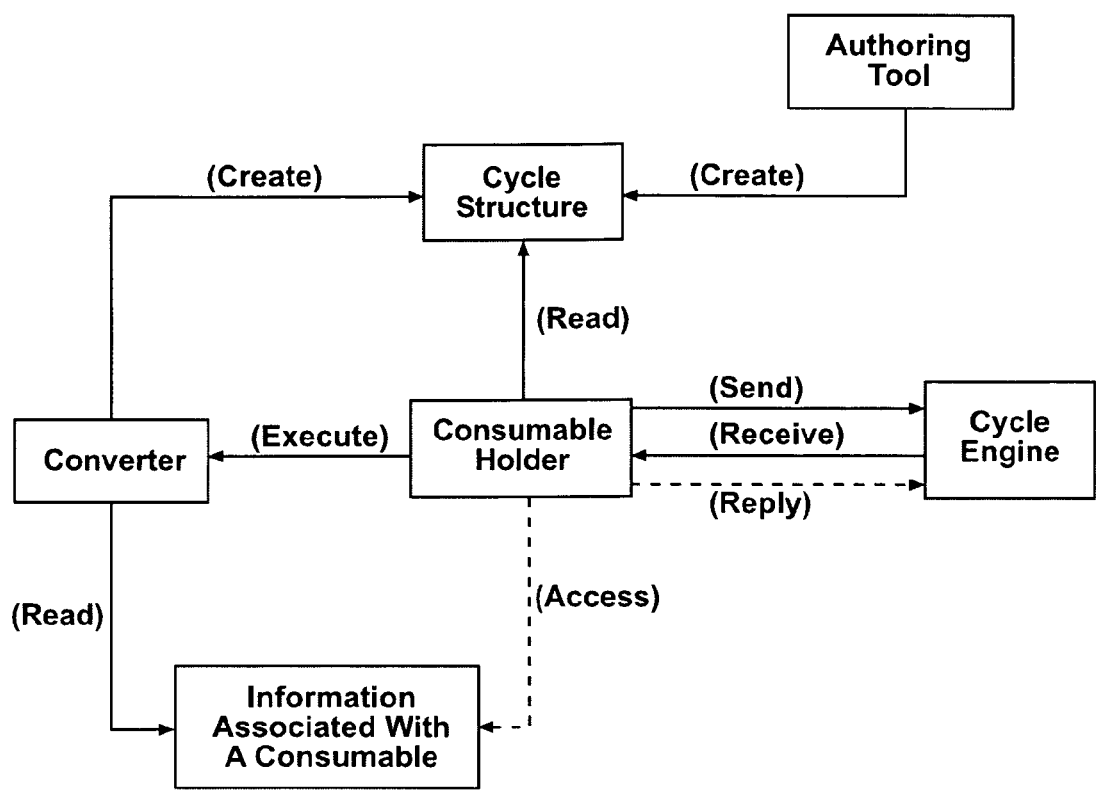
FIG. 21 is a schematic diagram of an example of the creation of a cycle structure for an appliance by way of a consumable holder according to the invention.

As discussed previously, the consumable holder 16 comprises resource coupling points 18A, 18B (which can be assimilated into a single coupling point) configured to exchange a resource with the appliance 12. The appliance 12 is configured to use the consumable 24 and the resource to perform a physical operation on an article. The consumable holder 16 may further comprise electronics 30 configured for communication with the appliance process control apparatus 14. The electronics 30 can affect a resource by communicating with the appliance process control apparatus 14 when the consumable holder 16 is coupled to an appliance 12. The electronics 30 can be configured to deliver a cycle of operation to the appliance 12. Alternatively, the electronics 30 can communicate with the software architecture 1018 for the purposes of observing the cycle of operation and modifying the cycle of operation. The electronics 30 may observe the cycle of operation using any of the data collection schemes (as disclosed in the incorporated WO2006135726) supported by the software architecture 1018. These data collection schemes include but are not limited to requesting data from the software architecture 34, receiving unsolicited events from the cycle of operation 1018, or by creating new events that can be received by communicating with a software architecture having a DAQ (as disclosed in the incorporated WO2006135726) and specifying the events to the DAQ for creation by the DAQ. In addition, the electronics 30 may alter the cycle of operation in response to the observations. In a first embodiment, the electronics 30 can alter the cycle of operation by requesting to the software architecture 1018 that the appliance process control apparatus 14 enter an alternate operating mode enabling the electronics 30 to directly control, partially or wholly, the cycle of operation. In a second embodiment, the electronics can alter the cycle of operation by making specific requests to the software architecture 1018. In a third embodiment, the electronics can selectively alter the cycle structure 71 using any of the techniques described herein (see descriptions of FIG. 5 and FIG. 11) The electronics 30 can include a controller 32 and software architecture 1018 similar to that of the appliance 12 and/or a software architecture driver 1016. The electronics 30 can be powered by the consumable holder 16 or via connection to the appliance 12. The electronics 30 can further comprise a client 40. Client 40 can comprise a plurality of arbitrary software components, the software architecture driver 1016, an instance of the software architecture 1018, a converter as shown in FIG. 21, and any other software and data storage and data access functionality.

The consumable holder 16 can also have a consumable reader 36, similar to the aforementioned consumable reader 22, coupled to the consumable holder 16 by external coupling point 20C. In this case, the consumable reader 36 is communicatively coupled to the controller 32 and to the software architecture 1018. This enables information about the consumable 24 and/or about the consumable holder 16 to be read from a source of information and transferred into the memory of the controller 32 or into the memory at least one control board within the process control apparatus 14 wherein the transferring is preferably accomplished using software architecture 1018.

The consumable holder 16 can further comprise at least one coupling point 20D configured to couple with at least one other corresponding coupling point for resource/consumable transmission. Thus, coupling points can exchange or convey a resource, data, and/or a consumable 24 to an appliance 12 or to another external device. A coupling point can connect to a source of information about the consumable 24 and/or to a consumable reader 22, 36 and/or to a resource separate from the appliance 12.

The consumable holder 16 can have at least one sensor 38 to sense one or more attributes of a consumable 24 and/or its source 26. Attributes can include such things as amount, brand, type, composition, structural form, expiration date, dispensing properties, nutritional information, temperature, pressure, and concentration. To store and inventory such data, the consumable holder 16 can utilize the controller 32. Such information or data can also be conveyed to and/or presented at a user interface in the consumable holder 16 or the appliance 12.

The holder process control apparatus 28 of the consumable holder 16 can be configured to detect functionalities of the appliance 12, modify functionalities of the appliance 12, be controlled by the appliance 12, or otherwise exchange data with the appliance process control apparatus 14 of the appliance 12. The holder process control apparatus 28 can be used to actuate the transmission, dispensing, supplying, or usage of at least one consumable 24 by actuating a mechanical part, such as a valve, conduit, solenoid, sensor, actuator, spring, transmission, motor, or gear. Additionally, the holder process control apparatus 28 can be configured to modify properties of one or more consumables or resources such as temperature or a chemical property. For example, temperature could be raised by actuating a heater, and chemical properties might be changed by controlling a mixture of at least two consumables and/or resources by using a motor and an auger. Additional auxiliary functionalities not directly related to the actuation of consumables 24 can be enabled by the holder process control apparatus 28. The holder process control apparatus 28 can optionally include a mechanism to effect the use of a resource, such as an actuator for a valve.

The consumable holder 16 can receive resources from the appliance 12, act on the resources, and return the modified resources to the appliance. For example, in a washing machine or dishwasher, the consumable holder 16 can receive water from the appliance 12 and return that water to the appliance 12 as grey water or as water mixed with detergent. In this instance, detergent would be a consumable 24. The consumable holder 16 can thus export modified consumables 24 which have either been operated on by the consumable holder 16 or that have been operated on by the introduction of at least one resource. The consumable holder 16 can also dispense the consumable 24 directly to the appliance 12.

The client 40 in the electronics 30 can contain a data set linking the model of the appliance 12 or some other functional identifier such as a class id, or an API ID, type, and/or version to the plurality of consumables 24 that the consumable holder 16 can contain. The data set can further link any of these attributes to a plurality of cycles of operation for the appliance 12. The data set can also link cycle modification or cycle operation data or cycle structure data or data for response to a query message to various combinations of appliances 12, consumables 24, and selected cycles. The data set can alternatively be in the appliance 12. The data in the data set can be modified by a network message sent by a node on the network, such as the consumable holder 16, the consumable 24, or the consumable reader 22, 36.

Software Architecture

The software architecture 1018 enables the consumable holder 16 to discover one or more functionalities of the appliance 12 via messaging. The software architecture 1018 can also enable the consumable holder 16 to respond to discovery messages so that the appliance 12 can discover one or more functionalities of the consumable holder 16 or at least one characteristic of a consumable 24. The software architecture 1018 can be located in the controller 32, hard-wired into the electronics 30, located in a client 40, or accessed separately. The process control apparatus 28 can have at least one functional identifier known by the controller 32 and/or software architecture 1018, enabling the software architecture 1018 to respond to discovery messages with a response that contains data about the consumable holder process control apparatus 28. Generally, a consumable holder with a controller 32 and software architecture 1018 can initiate or respond to a plurality of discovery messages either to find or disclose information to a node on a network about a component associated therewith or the appliance.

By employing a software architecture 1018 that enables facile communication between internal components of an appliance and between an external component and one or more of the internal components of the appliance, various components and accessories, including a consumable holder according to the invention, can communicate with the appliance to expand the capability, functionality, and usability of the appliance, and particularly, an appliance that uses a consumable product during its operation, or otherwise operates on a consumable product. The appliance can be any suitable appliance, such as a household appliance. Examples of household appliances include, but are not limited to, clothes washing machines, clothes dryers, ovens, dishwashers, refrigerators, freezers, microwave ovens, trash compactors, and countertop appliances, such as waffle makers, toasters, blenders, mixers, food processors, coffee makers, air purifiers and dehumidifiers, hot water heaters, water softeners, blenders, and the like.

The appliance can be configured to perform a cycle of operation to complete a physical domestic operation on an article. Examples of the physical domestic operations include a food preparation operation, a food preservation operation, a fluid treatment operation, a cleaning operation, a personal care operation, a fabric treatment operation, an air treatment operation, and a hard surface treatment operation. The air treatment operation can comprise, for example, air purification, air humidification, air dehumidification, air heating, and air cooling. The food preparation operation can comprise, for example, food cleaning, food chopping, food mixing, food heating, food peeling, and food cooling. The food preservation operation can comprise, for example, food cooling, food freezing, and food storage in a specialized atmosphere. The fluid treatment operation can comprise, for example, fluid heating, fluid boiling, fluid cooling, fluid freezing, fluid mixing, fluid whipping, fluid dispensing, fluid filtering, and fluid separation. The cleaning operation can comprise, for example, dishwashing, fabric washing, fabric treatment, fabric drying, hard surface cleaning, hard surface treatment, hard surface drying, carpet cleaning, carpet treatment, and carpet drying. The personal care operation can comprise, for example, hair treatment, nail treatment, body massaging, teeth cleaning, body cleaning, and shaving.

The internal components of the appliances can include any component that participates in the operation of the appliance. Some of the internal components have a corresponding controller (main controller, motor controller, user interface, etc.), which can be a simple microprocessor mounted on a printed circuit board, and other components that have no controller. The components can comprise one or more devices that are controlled by the controller. Typically, the controller components in cooperation, either directly or indirectly, through other components, control the operation of all of the components and the associated devices to implement an operation or cycle for the appliance.

The software architecture can be implemented on and communicated over an internal communications network on the appliance. The internal communications network connects the various internal components of the appliance and can be considered a closed network. One example of the internal communications network used within the appliance is the WIDE network protocol, created by Whirlpool, Inc., the assignee of the present patent application. The internal communications network must at least address the physical layer of the OSI layered network model. Preferably, the internal communications network comprises all appropriate layers of the OSI model. The WIDE network protocol addresses the physical layer and at least some aspects of the Link and Transport layers.

The software architecture expands the communication ability of the appliance by adding upper layer functionalities to the network stack effectively creating a fully functional appliance network incorporating the necessary aspects of the OSI layered network model like fragmentation and message reliability and session management, certain object oriented functionalities like message routing using functional identifiers, discovery, and the like, and certain advanced routing features like message propagation across multiple networks where distributed routing tables are used to facilitate the message propagation across the multiple networks and certain other important functionalities like message binding, authentication of nodes, and message firewalls hereinafter referred to as "network." Within the appliance, the software architecture can, but does not have to, reside on each of the components that have a controller. Those components with the software architecture form a network node that can communicate with the other nodes. In other words a network as it relates to this invention is any system of collaboration between arbitrary software components, whether physical (shown for example in FIG. 8) or virtual (shown for example in FIG. 30).

The software architecture 1018 can perform multiple functions. For example, one function can relate to identifying each of the components corresponding to a node on the network, while another function can relate to identifying capabilities or functions of the identified components on the network. Yet another exemplary function is to identify the status of the components on the network. In this way, the software architecture can function to inform all of the nodes on the network of the presence, capabilities, and status of the other nodes.

The software architecture 1018 can comprise multiple modules, each of which has different functionality. Various combinations of the modules or all of the modules can reside on each of the components. One module having a basic or core functionality resides on all of the components. In one anticipated configuration, all of the modules reside at least on the main controller, which establishes the main controller to function as a primary or main software architecture, with the other nodes functioning in a client relationship to the main software architecture. In such a configuration, all of the nodes can communicate through the main software architecture. The software architecture can be sufficiently robust that it can permit configurations without a main software architecture or with multiple main software architectures. For example, the controllers of the various components can work together to control the operation of the appliance without any one of the appliances functioning as a main controller. Regardless of the configuration, any component with the software architecture can function as a client with respect to the other components.

Because of the software architecture 1018, the internal components of the appliance are not only connected with one another, but the internal components can also be connected to one or more external components or a new internal component through the network. The external component and/or the new internal component has one, some, or all of the software architecture modules in resident. As a result, the external component and/or the new internal component can communicate with the internal components of the appliance and can also communicate with other external components having the software architecture.

The software architecture can be any suitable software architecture that enables communication between the internal components of the appliance and the external component and/or the new internal component or between components external to the appliance. An example of the software architecture is disclosed in Patent Cooperation Treaty Patent Application No. PCT/US2006/022420, titled "SOFTWARE ARCHITECTURE SYSTEM AND METHOD FOR COMMUNICATION WITH, AND MANAGEMENT OF, AT LEAST ONE COMPONENT WITHIN A HOUSEHOLD APPLIANCE," filed Jun. 8, 2006, and incorporated herein by reference in its entirety, as published in WO2006135726. A related example is shown in priority document U.S. Patent Application No. 60/595,148, filed Jun. 9, 2005. All of the communications between components and accessories and/or any combination of components and accessories described in this application can be implemented by the software and network structures disclosed in either of these applications.

The software architecture disclosed in the aforementioned references can be implemented by providing one or more of the software elements of the software architecture at least on each of the components to be controlled and on the accessory. The software architecture is configured to generate a plurality of messages, with at least one of the software elements residing in each of the components and in the accessory and configured to enable transmission of at least one of the plurality of messages between the components and between the accessory and the components. The messages can be transmitted for bi-directional communication between components and/or components and accessory. The messages can include command messages that are used to implement a physical domestic operation cycle of the appliance. It will be understood that the consumable or at least the consumable holder can be considered a component on the network, for use in conjunction with the appliance having the software architecture.

Operation Cycles

An operation cycle comprises a set of physical actions that the appliance 12 executes in response to a cycle architecture for operation of the appliance. For example, a washing machine can have several wash cycles that depend on the type of fabric being washed or a size of a fabric load. Similarly, an oven can have several cooking cycles that depend on the type of food being cooked and the cooking process (e.g., defrosting, baking, self-cleaning). Typically, the appliance when purchased by the user has a set of operation cycles that can permanently reside in the appliance as firmware.

Figure 3:
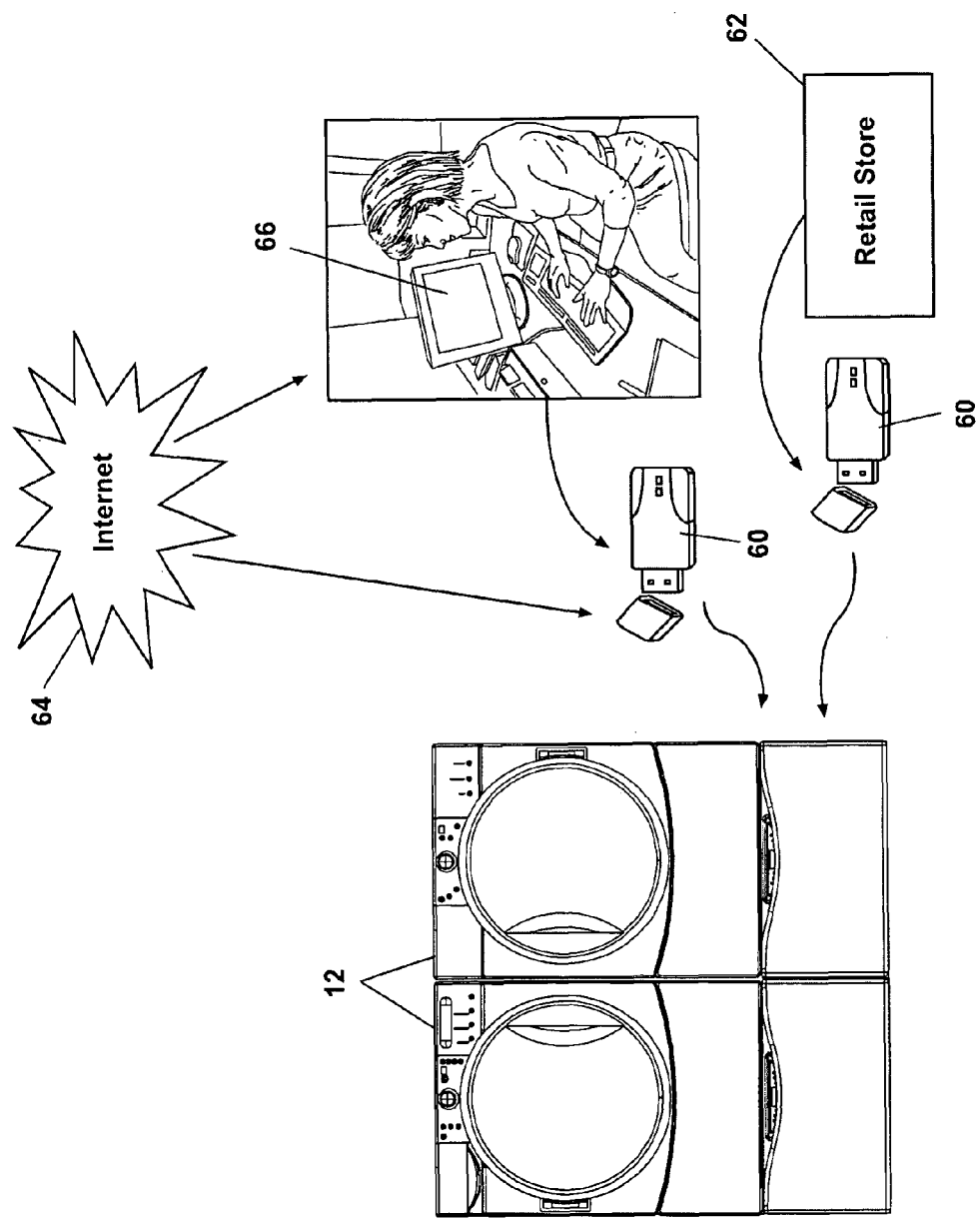
FIG. 3 is a schematic view of an operation cycle component for use with a communicating appliance.

Referring now to FIG. 3, an operation cycle component 60 can store additional operation cycles, changes not originally provided with the appliance 12, or other information upon which a cycle of operation can be changed, and communicate with the appliance 12 such that the appliance can implement new, changed or additional operational cycles. An operation cycle stored by the operation cycle component 60 can also or alternatively include an updated operation cycle. The operation cycle component 60 can be any type of component, such as a hardware device that can plug into the appliance 12.

The operation cycle component 60 can be a smart coupler that can couple with both a personal computer and the appliance 12. See the discussion of smart coupler below. Any other suitable connector and/or communication method can be used. More particularly with respect to a consumable holder 16 according to the invention, the operation cycle component 60 can be the optional client 40 in or connected to the consumable holder 16.

With continued reference to FIG. 3, the additional operation cycles, changes to existing cycles, or other relevant information can be uploaded to the operation cycle component 60 in any suitable manner. For example, the operation cycle component 60 having the relevant data can be purchased at a retail store 62, or the information can be uploaded to the operation cycle component 60 at the retail store. Alternatively, the user can download additional operation cycles, changes, or relevant data via the internet 64. For example, the user can download additional operation cycles through a personal computer 66 and then upload the additional operation cycles to the operation cycle component 60 or the user can wirelessly directly download the operation cycles to the operation cycle component 60. In another embodiment, the user can develop custom additional operation cycles or changes on the personal computer 66 and upload the custom additional operation cycles or changes to the operation cycle component 60. In an alternative embodiment, additional operational cycles can be transmitted wirelessly from the personal computer 66 to the appliance 12 without using a separate operation cycle component 60, in which case the personal computer 66 may itself be considered the operation cycle component. The wirelessly transmitted additional operational cycles can be transmitted to an intermediate storage in the appliance 12. The cycles can also be authenticated by the software architecture or other methods to ensure that they are compatible with and appropriate for the appliance.

The operation cycle component 60 can couple with the appliance 12 in any suitable manner, such as through a direct hardwire connection or a wireless connection. Furthermore, the appliance 12 can implement the additional operation cycles, changes or relevant information directly from the operation cycle component 60 or the relevant data can be transferred from the operation cycle component 60 to the appliance 12 or to the consumable holder 16.

Figure 4:
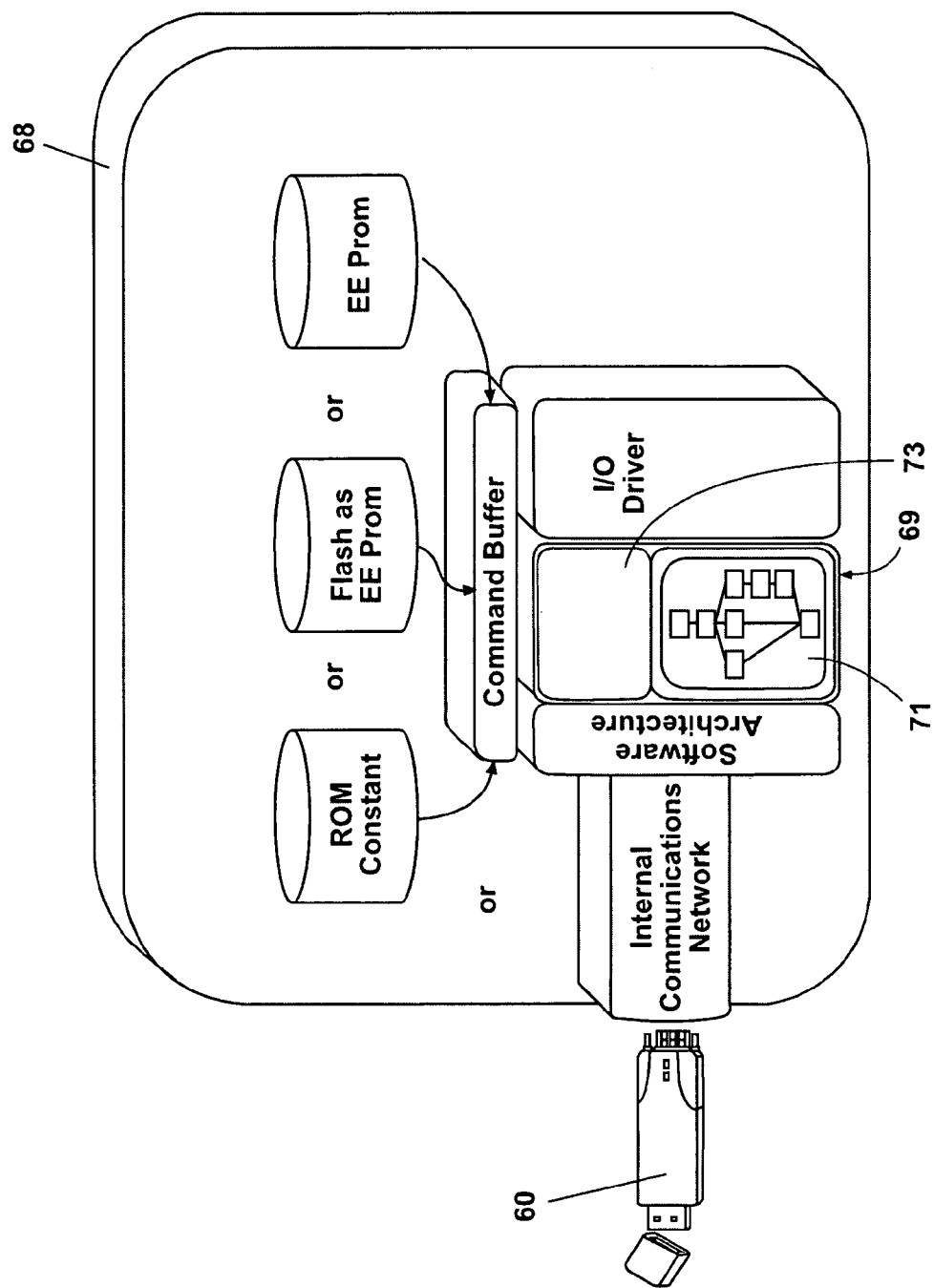
FIG. 4 is a schematic view of an appliance controller with a cycle architecture.
Figure 8:
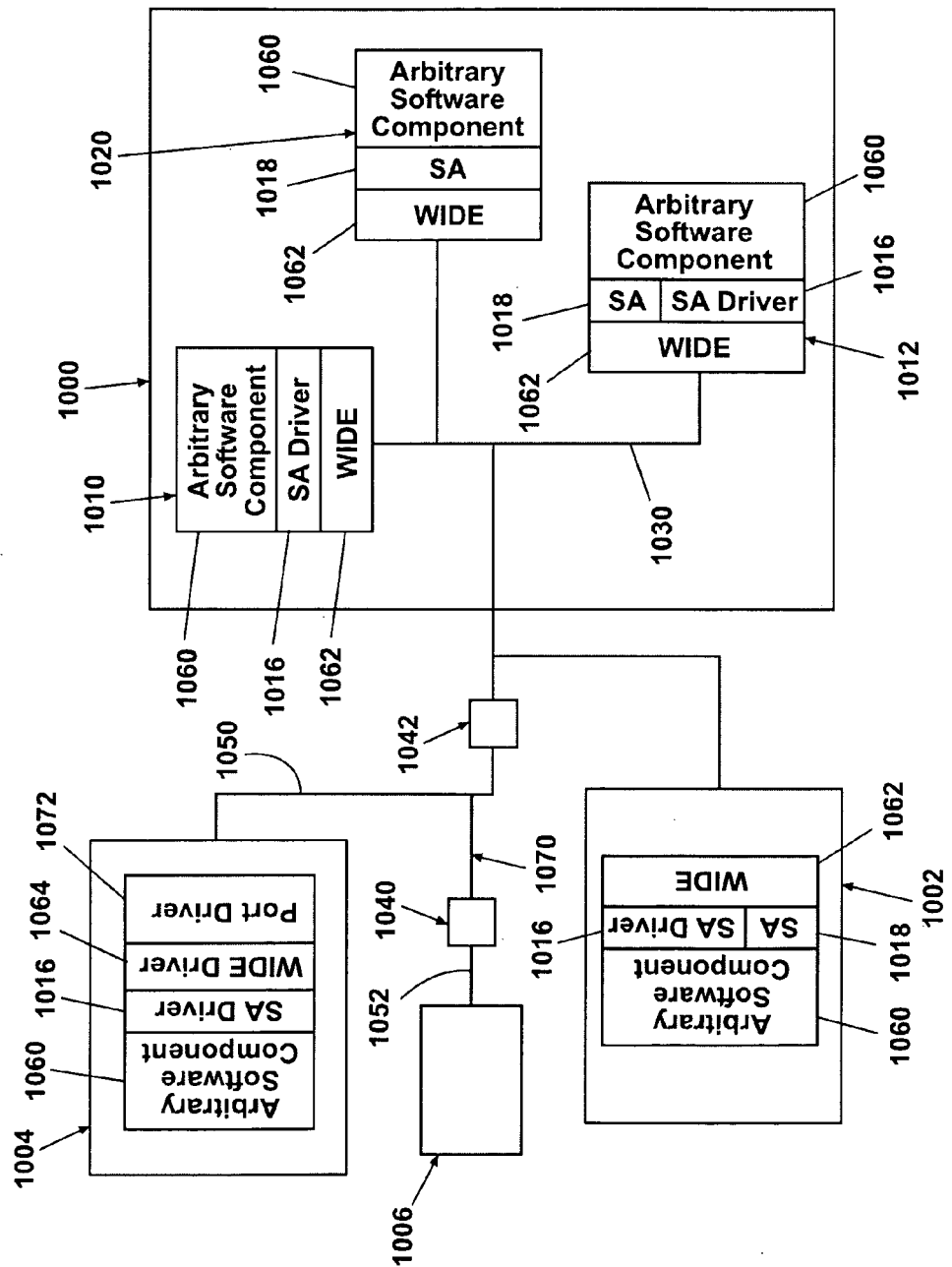
FIG. 8 is a schematic view of a network of appliances and clients connected on multiple networks by couplers.

FIG. 4 illustrates a typical controller 68 or control board of the appliance 12, one or more of which can be connected on a network, and to which additional operation cycles can be provided by an operation cycle component 60. Appliances can have one or more control boards controlling the cycle of operation and the user interface as shown in FIG. 8 items 1010, 1012, and 1020. Among other things, the controller 68 will include a cycle architecture 69. The cycle architecture 69 differs from conventional operational cycle execution software. Conventional operational cycle execution software is determined wholly from compiled source code that cannot easily be separated into constituent parts or portions. The cycle architecture 69 is software that has two distinct portions, a cycle structure 71 and a cycle engine 73. The cycle structure 71 is a data or cycle structure portion representing a plurality of elements or components comprising an ordered collection of steps, separated from each other by transition conditions, with the actions to be taken during each step. Each element or component can have an identifier to enable replacement or merging of elements or components. The transition conditions are the conditions under which a selected step should transition to a next step in the ordered collection of steps. Transition conditions comprise arbitrarily complex logic expressions that must be resolvable to a Boolean value. In one embodiment, the logic of a Transition Condition is a composition of structures comprising operators connected to functions, other operators, variables, or constants and functions connected to other functions, operators, variables, or constants wherein the composition forms a composite which can be resolved to a Boolean during the cycle of operation. For example, a logic expression could start with a structure representing an "AND" wherein the "AND" is connected to one "OR" structure and a function "foo". The "OR" structure is then connected to a function "bar" and a function "domo". During the cycle of operation where a first step was separated from a second step by the Transition Condition, the first step would de-activate and transition to the second step when function "foo" returned a value of true and either functions "bar" and "domo" returned a value of true. Compositions of structures representing logic can be represented in data, which data can be converted into the composition of structures during or before the cycle of operation. Likewise, existing compositions can be modified with additional data. Using this data technique or another technique providing the same flexibility, a cycle architecture comprising a cycle structure further comprising a plurality of step transition logic expressions can be authored by an authoring tool, transmitted via network, encoded into a consumable or consumable holder, and used by a cycle engine to execute a cycle of operation. The cycle engine 73 is software that can be combined with at least one cycle structure 71 in the controller 68 for the execution of an operational cycle.

One advantage of a cycle architecture 69 partitioned into two components is that the cycle engine 73 can reside in a plurality of different appliance types, thereby reducing the cost and increasing the quality of the appliance types. A second advantage is that new appliance models or types can be developed using the cycle engine 73, thus avoiding the development time and cost of conventional operational cycle execution software, which is typically and historically developed specifically for each new appliance model and type.

Another advantage of a cycle architecture 69 is that it can be in communication with a cycle structure 71 over a network or within a runtime environment. This allows the logical architecture of the appliance to vary independently from the physical architecture of the appliance. In one embodiment, an embedded virtual router is used to provide a messaging layer between all components of the cycle architecture including a cycle structure 71 and the cycle engine 73. This allows the manufacture of the appliance process control apparatus 14 increased degrees of freedom with respect to the physical embodiment of the appliance process control apparatus 14 because the cycle architecture 69, when combined with an embedded virtual router, provides an adaptive function allowing the cycle architecture to route messages throughout the networks of the physical architecture without prior knowledge of the physical network or physical architecture.

Another advantage of a cycle architecture 69 using a cycle structure 71 and a separate cycle engine 73 is that the cycle structure 71 is portable, which allows it to be delivered to the cycle architecture 69 over a network, from a remote data source, from a local data source like flash memory, EE memory, or Read-Only Memory, or from an accessory, from a user interface configured to create a cycle structure, or from any source of information about a cycle structure or data about a cycle structure including data about a consumable. One example for delivering a cycle structure 71 is by the use of an operation cycle component 60 as shown in FIG. 3. This advantage provides upgradeability to the appliance operational execution software in a less obtrusive approach than that of conventional operational cycle execution software in that the operational execution software can be changed in whole or in part without a complete re-downloading of the whole execution software running on the controller 68.

Another advantage of a cycle architecture 69 using a cycle structure 71 and a separate cycle engine 73 is that the cycle structure 71 can be altered to any degree even after the appliance is installed and in use. This type of upgradeability can be delivered to the user in a variety of methods such as by authoring tools, cycle accessories, consumables with encoded cycle structures, network downloads, appliance user interface configured data, software patches and the like, or even by an operation cycle component 60. Conventional operational cycle execution software cannot be changed without a complete re-downloading of the whole execution software of controller 68. Further, conventional operational cycle execution software is configured to accept only parameters that vary the magnitudes of time, temperature, speed, and the like, or modify fixed actions within a fixed ordered collection of steps. By contrast, the cycle architecture 69 according to the invention is fully modifiable, allowing for new steps, re-ordered steps, new actions, new or modified transition conditions and the like.

The cycle structure 71 can be represented directly or indirectly. A direct representation of a cycle structure will provide an ordered collection of steps, transition conditions and actions, either logically or in an instructions set that can be interpreted by a cycle engine 73. An indirect representation of a cycle structure 71 will provide a set of instructions that will enable a creator, a converter, a compiler, or the cycle engine itself to build an ordered collection of steps, transition conditions and actions.

Whether direct or indirect, the cycle structure 71 can be represented in a plurality of data embodiments such as key-value pairs, XML, relational data tables, comma separated variable files, a hierarchical composite tree or graph, byte arrays, data packets, command objects, binary encoded data, data encoded as a programming language such as a C header file, text, scripts, serialized objects, and messages. Regardless of the embodiment of the cycle structure 71, the essential meaning and functionality will be interpreted to accomplish the same operational cycle execution on the controller 68. It is envisioned that a cycle structure 71 may be transcribed from one embodiment to another as appropriate during the authoring, distribution, and delivery of the cycle structure to the cycle architecture 69 on controller 68 without loss of meaning or functionality. It will be understood that data embodiments of a cycle structure 71 are transferable between and can be resident in a plurality of memory types including RAM, ROM, and Read-Write types like Flash, EE, RW CDs, floppy disks, hard drives, portable memory thumb drives, external hard drives, and the like.

For an indirect representation of a cycle structure, a cycle structure creator can read a set of instructional messages, for example, and interpret them to build or create a cycle structure. Such instructional messages can be in the form of data packets for messages preferably in accordance with software architecture such as that of the incorporated WO2006135726. For example, the data packets can have routing information such as an enabling identifier, one example of which can be a functional identifier representing things like a cycle structure creator, a state, a transition condition, or an action. As well, the data packets could have a collection of command identifiers that are supported via a collection of Op ("Operation") Codes.

In an additional form of indirect representation, a cycle structure 71 can be the source data for automatically generated compilable source code, or the cycle structure itself may be formatted such that it is directly compilable by a compiler configured to create an executable program appropriate for the controller 68.

Yet another form of indirect representation can be a plurality of cycle parameters like time temperature, speed, fill amount and the like wherein the cycle engine or an arbitrary software component would receive the cycle parameters and convert them to a direct representation of a cycle structure 71 or portion thereof.

In another form of indirect representation, a cycle structure 71 can be represented as a script that is either compilable for the controller 68 or interpretable by a cycle structure creator or converter (see FIG. 21). A script can be created by a script authoring tool for introduction into the use environment in any of the disclosed embodiments. The script in communication with cycle architecture 69 is able to affect and change the state of the appliance control system as described herein.

For a direct representation of a cycle structure where a data packet is used to deliver information about a cycle structure, the data packet can comprise routing information and a direct representation of a cycle structure. The direct representation could be encoded into a byte array. The byte array could then be operated on directly from a cycle engine configured to interpret the byte array by decoding the byte array during the interpretation such that the data in the byte array could be interpreted as an ordered collection of steps separated by transition conditions having transition logic wherein each step comprises a plurality of actions.

Another example of a direct representation is the script is shown below. The script comprises information about the consumable and information about a cycle structure including references to functions, variables, memory locations, APIs and messages directly available or exposed through an embedded virtual router in the appliance controllers 68, information about credentials such as a password (not shown), and information about the script such as a CRC (not shown). The script can also comprise a set of basic instructions like operators like IFLESSTHAN. The cycle engine 73 can validate the script against the references making sure that the appliance controllers 68 can support the references called for by the script. For example GRILL could represent a software class having a set of functions that can be invoked if an instance of the class is available. The script statement $resource grill instructs the cycle engine 73 to associate the variable grill with the instance of GRILL wherein if the object already exist then the associating is one of referencing grill with GRILL and wherein if it does not, to instantiate GRILL and then create the reference from grill to GRILL. If there is no GRILL capability or functionality or there is not a GRILL class available, then the cycle engine 73 would reject the script and notify the user of the rejection using a user interface and prompt the user to manually specify the operating instructions for the appliance 12 using the user interface instead of the script. Other reasons that a script might be rejected include insufficient memory to hold or execute the script, non-existent references (shown as $resource or $var), unreadable script, and script that does not conform to its CRC, or non-credentialed script which is script that can not be authenticated using the credentials of the script. The script comprises functionality enabling it to perform all essential functions as previously described in the embodiment of the cycle structure comprising steps, actions, transition conditions, and transition logic expressions. The statement RESOURCEACTION grill.turnOn is an example of an action. 'IFLESSTHAN time,2000' is an example of transition logic evaluating to a Boolean value. LABEL1 and LABEL2 are examples of steps.

Figure 10:
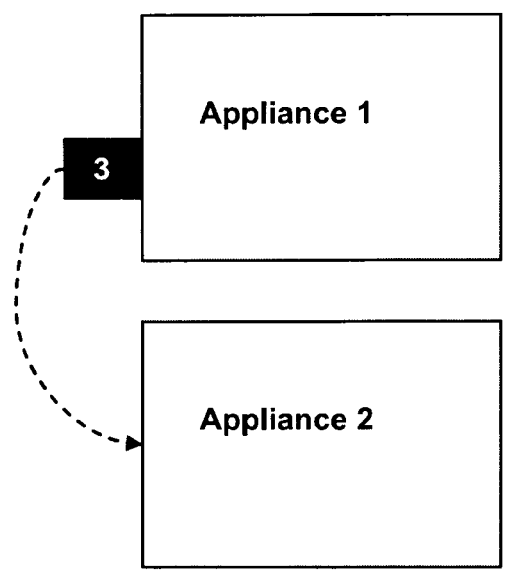
FIG. 10 is a schematic diagram showing the transfer of an operation cycle accessory between two appliances.

Additionally, a script could comprise information identifying the plurality of appliances to which the script could be used so that the cycle accessory shown and described in FIGS. 3 and 10 could hold a plurality of scripts each comprising the information so that the accessory could apply the appropriate script to the cycle architecture 69 when it establishes communication with an appliance.

```
+Header
exp-date: "09/09/2009"
brand: "La Cucina Italiana"
advertising: "The taste of Italy in your mouth"
$var time, 2
$var temp, 2
$resource timer, TIMER1
$resource cookbroil, COOKBROIL
$resource grill, GRILL
$resource temp-oven, TEMPERATUREOVEN
$resource ui, UI
$resource beep, BUZZER
+Behavior
RESOURCE ACTION timer.init,250
RESOURCE ACTION timer.start
RESOURCE ACTION ui.showAdvertsing,brand, advertising
LABEL1:
RESOURCE ACTION timer.getCounter
MOVE time, ANSWERACTION
IFLESSTHAN time, 2000
GOTO LABEL1
RESOURCE ACTION timer.stop
RESOURCE ACTION ui.showCookingScreen, "Cooking Lasagna"
RESOURCE ACTION cookbroil.start, 400 F, 10
LABEL2:
RESOURCEACTION cookbroil.getStatus
MOVE temp, ANSWERACTION
IFNEQUAL temp, FINISHCOOKING
GOTO LABEL 2:
RESOURCEACTION ui.showCooking Screen, "Cooling down"
LABEL3:
RESOURCEACTION temp-oven.getTemp
MOVE temp, ANSWERACTION
IFGREATERTHAN temp, 200
GOTO LABEL3
RESOURCEACTION ui.showCookingScreen, "Making it crispy"
RESOURCE ACTION timer.start
LABEL4:
RESOURCE ACTION timer.getCounter
MOVE time, ANSWERACTION
RESOURCEACTION grill.turnOn
IFLESSTHAN time, 180000
GOTO LABEL4
RESOURCE ACTION timer.stop
RESOURCEACTION grill.turnOff
RESOURCEACTION ui.showCookingScreen, "Your Lasagna is done. Wait for cooling it"
RESOURCEACTION timer.start
LABEL5:
RESOURCEACTION timer.getCounter
MOVE time, ANSWERACTION
IFLESSTHAN time, 120000
GOTO LABEL5
RESOURCEACTION ui.showCookingScreenDone, "Your lasagna is done! Enjoy it"
RESOURCEACTION beep.longBeep
```

Figure 22:
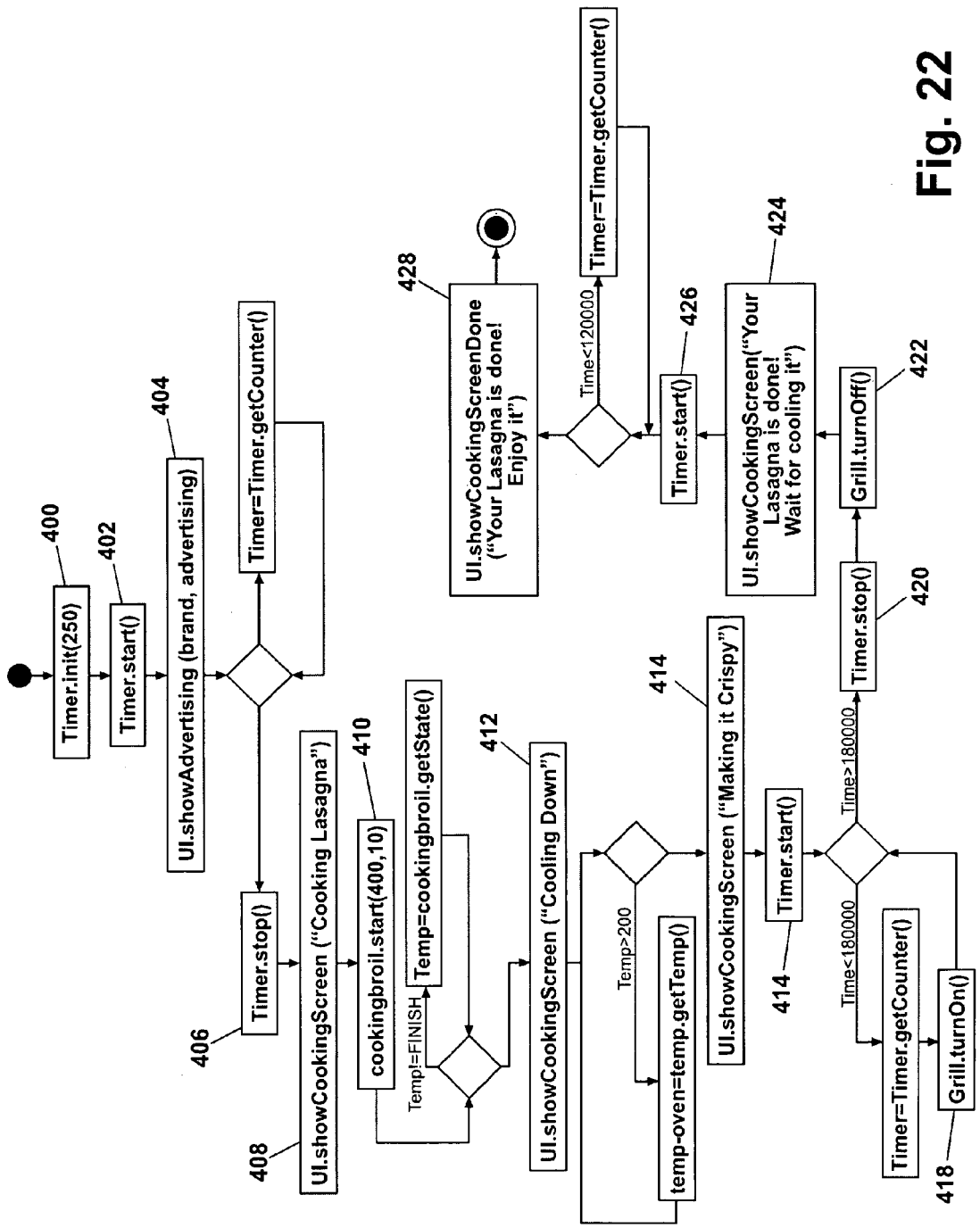
FIG. 22 is a flow chart illustrating the steps implementing a script according to the invention.

The functionality of the script is shown in FIG. 22 and is described herein. At steps 400, 402 and 404, respectively, a timer is set, initiated, and the brand and advertising defined in the script (here, "La Cucina Italiana" "The taste of Italy in your mouth" is displayed on the user interface (UI) for the defined time. At the end of the set time, the timer is stopped at 406, and the UI is instructed to display "Cooking Lasagna" at 408, while a cooking cycle (broiling) commences at 410. At the end of the cooking cycle (ascertained by temperature), the UI is instructed to display "Cooling down" at 412. At the end of the cooling down period (ascertained by temperature), the UI is instructed to display "Making it crispy" at 414 while the timer starts at 416 and the grill is turned on at 418. At the end of the set time, the timer is stopped at 420, and the grill is turned off at 422. The UI is instructed to display "Your Lasagna is done. Wait for cooling it" at 424. The cool down cycle is ascertained by a preset timer at 426, after which the UI is instructed to display "Your lasagna is done! Enjoy it." at 428 and the cycle terminates.

It is contemplated that a cycle architecture 69 can have multiple sources of information about and/or representing a whole, a part of, or a modification to a cycle structure and that each source may either be a direct or indirect representation and that each source may be embodied in a variety of memory types. According to the invention, the information about a cycle structure will be used to change a cycle structure in the appliance and thereby change an operation cycle of the appliance. The term "change the cycle structure" is contemplated to include creating a cycle structure, modifying a cycle structure, or accessing a whole or part of a cycle structure or a representation of a cycle structure.

It is further contemplated that the cycle architecture 69 may publish data about itself, its progress and information about the progress. For example, cycle architecture 69 can publish its current active step, conditions about the transition logic, elapsed time per step, total elapsed time, or sub-states of the steps, or sub-states of an ordered-collection of steps such as fault state, normal state, transitioning state, idle state, etc. The cycle architecture 69 may implement additional functionalities such as a software or network API allowing cycle architecture observers to register for notifications to receive the published data.

In a first embodiment, the cycle engine 73 is compiled software that communicates at runtime with at least one source of indirect or direct representation of a whole or part of a cycle structure 71(*a*) and builds or changes an in-memory cycle structure 71(*b*) where the memory is in communication with the controller 68. Once the in-memory cycle structure 71(*b*) is prepared, the cycle engine 73 finds the initial step, reads the step, executes the actions prescribed by the step, and begins evaluating the transition logic for transitioning to the next step, whereupon the process repeats in subsequent steps.

In a second embodiment, the cycle engine 73 is compiled software that communicates at compile time with at least one source of indirect or direct representation of a whole or part of a cycle structure 71(*a*) and builds or changes downloadable image comprising a cycle structure 71(*b*). Once the compilation is complete and the downloadable image is downloaded to the memory of the controller 68, the cycle engine 73 finds the initial step, reads the step, executes the actions prescribed by the step, and begins evaluating the transition logic for transitioning to the next step, whereupon the process repeats in subsequent steps.

In a third embodiment, the cycle engine 73 is compiled software that communicates at runtime with at least one source of indirect or direct representation of a whole or part of cycle structure 71(*a*) without building or changing a cycle structure 71(*b*). Once in communication, the cycle engine 73 immediately commences execution by continuous communication with the source whereupon it finds the initial step, reads the step, executes the actions prescribed by the step, and begins evaluating the transition logic for transitioning to the next step, whereupon the process repeats in subsequent steps.

In a forth embodiment, the cycle engine 73, uses a fetch and execute technique to conserve memory. In this embodiment, the cycle engine 73 is in communication with a source of information about a cycle structure 71(*a*) where a first memory comprises the source and a second memory comprises the cycle engine 73 so that the cycle engine can fetch portions of the information from the source and convert that portion to a form appropriate for execution by the cycle engine. In one example of this embodiment, the cycle engine 73 would fetch a portion of the information representative of future potential steps, transitions, actions, and transition logic expression or information that represents the information so that the cycle engine can expeditiously transition to the next step based on a step transition because the next step is already in the form appropriate without the latency involved in a memory read or network message. Contemporaneous to the step transition, a next portion will be fetched and the process of fetch and execute repeats.

It should be understood that all communications according to the embodiments may be accomplished using an embedded virtual router, gaining the advantages describe herein.

The cycle architecture 69 can be communicated, as well as be configured to communicate with a client to receive and send messages by routing information such as an enabling identifier, one example of which can be a functional identifier representing things like a cycle structure creator, a state, a transition condition, or an action. As well, the messages could have a collection of command identifiers that are supported via a collection of Op ("Operation") Codes. Preferably, the cycle architecture 69 of any embodiment will receive messages from a client allowing for changes to the cycle structure 71. Changes to a cycle structure may, for example, include the insertion or deletion of steps, additions or deletions to the actions of each step, or changes to the transitional logic between any two given steps. To accomplish such changes, identifiers must be associated with the components of the cycle structure such that the client messages can fully specify the exact desired modifications to the cycle structure.

The actions of the cycle architecture 69 cause the state of the appliance control system to change including, inter alia, changes to the appliance process control apparatus 14, a user interface, appliance software, and other components of the appliance like the screens on an appliance graphical user interface or some graphical component thereon. Other exemplary actions include changing the state of electro-mechanical actuators like relays, valves, and fans, and changing the state of user interface indicators like LEDs, buzzers, light rings, segmented displays, or graphics on a graphical LCD. Additionally actions of the cycle architecture 69 further comprise effects including hiding or making available user interface screens, making elements of screens visible, invisible, enabled, or disabled; changes to fonts, colors, size, or other attribute values of screen elements, changes to menu so that items could be enabled, disabled, added, and deleted, and the like. The devices to which the actions will apply may be represented as identifiable functions with a known controllable interface. As disclosed in the incorporated WO2006135726, physical devices may be modeled or virtually revealed in the software architecture ("SA") by an API ("Application Programming Interface") Id where their control interfaces are represented by a collection of Op Codes, each having associated parameters. This allows controllable devices or software components that control the controllable devices to expose themselves to the actions of a step as a message, such that location of the control software that can operate on a device or the control software providing controllable access to the device does not need to be known by the cycle engine 73. An embedded virtual router (EVR) can provide communications between the cycle architecture 69, controllable devices having a control interface, and software components that control the controllable devices (device drivers) wherein the router provides a messaging interface between the actions of the cycle architecture 69 and the devices and the software components that can implement that action regardless of where the devices or software components reside. This capability allows the cycle architecture 69 to interact with devices, appliances, and software including other cycle architectures that reside on a different controller 68 or in a different appliance 12 or in a different device in communication with the cycle architecture 69 such as any external client 1004 having either the software architecture 1018 or the software architecture driver 1016. "Software components" here means any software, algorithm, or logic directly or indirectly associated with the operational cycle of an appliance. Generally, all logic provides indirect access to the control of a device, but the meaning can extend to include any non-device oriented software like fragmentation algorithms, user instructions, network authentication services, and the like.

Routing information comprises identifiers allowing a sender to send a message to a receiver. Examples of identifiers which enable routing are network node ids which are identifiers identifying the address of either the sending or receiving node on any given network. An example of network node id is shown in the address byte of FIG. 4 (as disclosed in the incorporated WO2006135726). Another example of an identifier which enables routing is a network id uniquely identifying each network within a plurality of networks such that a sender could uniquely identify the destination (or receiver) of a message by with a network id and a network node id thereby allowing the network node ids on each network vary independently while maintaining unique addressability by the combination of network id and network node id. Another example of an identifier which enables routing is an Object ID and Method ID or an API ID and Op Code. These identifiers provide routing from the sending node to the receiving software module or object within the receiving node. These identifiers provide unique addressability within the software operating environment of a node. A routing table comprising a plurality of rows can be constructed having a combination of routing information identifiers in each row where each row represents a route. An additional unique identifier (a route id) can be added to each row identifying each route thereby providing the sender a convenient mechanism for sending information. An example of a routing table is shown here:

| Routing ID | API ID | Sub-Net ID | Sub-Net Node ID |
|---|---|---|---|
| 4 | 35 | 1 | 1 |
| 5 | 46 | 2 | 2 |

Software can be constructed allowing the sender to send information to a route id whereby the software with convert the route id to the appropriate routing identifiers such that the information is sent to the appropriate network and to the appropriate node on the network and to the appropriate receiving software module. In a further example wherein a sender on a first node communicates to a receiver on a third node via a second node, the second node can have a routing table linking, for example, the Object Id to another route id so that the message sent by the first node is appropriately propagated and routed to the third node by software on the $2^{nd}$ node using the routing table of the $2^{nd}$ node. Routing tables can be populated with routing information using the techniques described herein.

Figure 30:
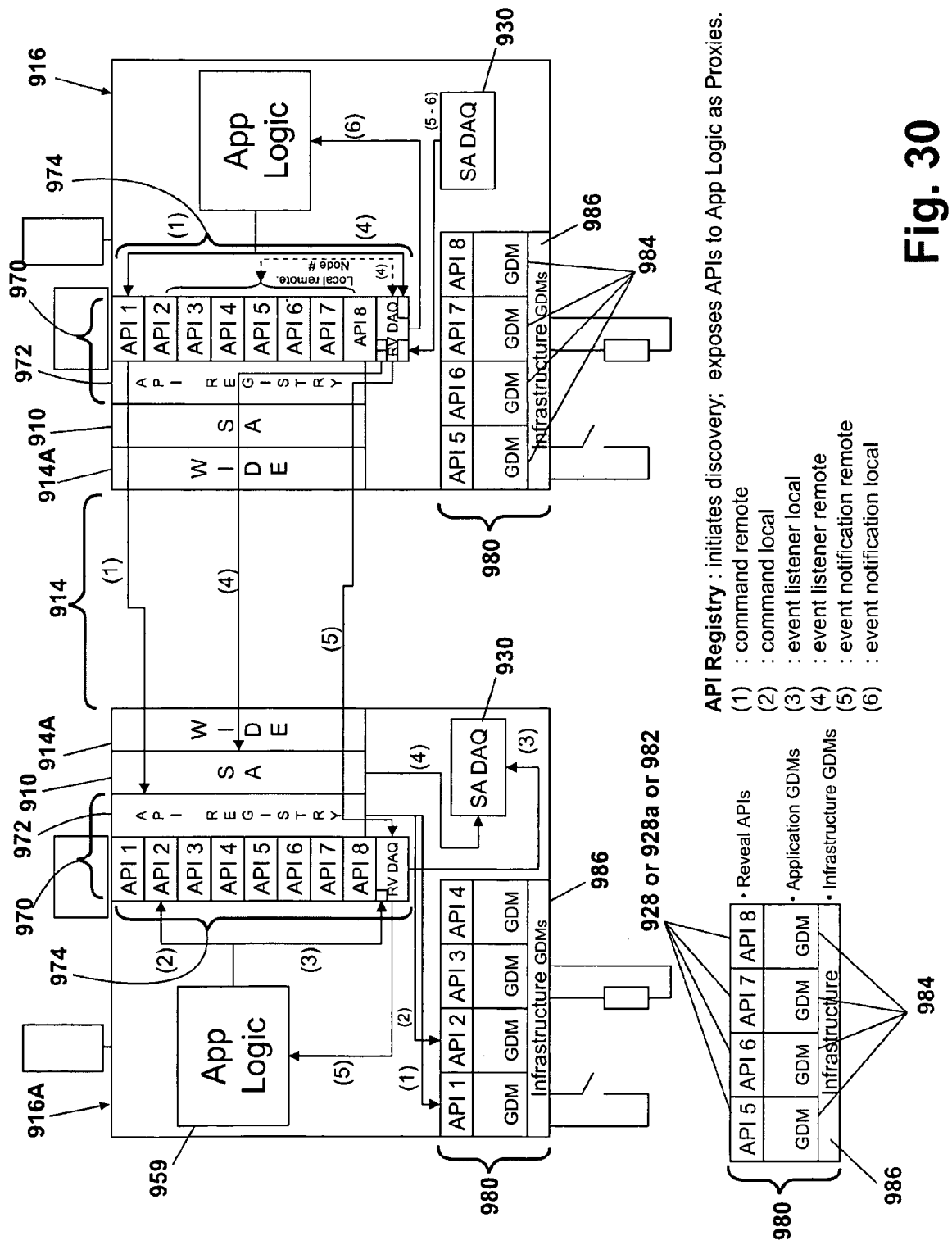
FIG. 30 is a schematic illustration of a pair of software operating environments, each corresponding to a different component with its own SA, and connected by the internal communications network.

The foregoing discussion of cycle structures will be helped by an understanding of an embedded virtual router (EVR) in the invention. FIG. 30 is a schematic illustration of a virtual router showing a mapping between a pair of software architecture implementations. The virtual router of FIG. 30 is a software design which encapsulates the API implementations (objects, see APIs 1-8 in each side of the router of FIG. 30) of the software architecture 10 such that the collaboration between an embedded client (application logic, algorithms, closed loops, sequencers, and state machines) and embedded components (the software architecture 10 API implementation: objects like defrosters, heaters, temp sensors, valves, etc.) is uniform and identical regardless if the entities collaborate over the network or share a runtime environment (the shared runtime collaboration being an example of a virtual network).

FIG. 30 shows six unique collaboration examples labeled as such illustrative of how a pair of software operating environments 916A existing on separate hardware components 916 and connected by a network 914 will use the various software components 916B of the software operating environment 916A to create transparent access between the operating logic of 959 and the software components 916B of both the right hand and the left hand software operating environments.

Prior to describing the collaboration examples, a description of the structure of FIG. 30 should aid in the understanding of the collaboration examples. Each software operating environment 916A contains representations of a sub-set of useful software operating components (916B) contained, including: the software architecture 10, internal communications network layer interface 952, a sub-component of the software architecture 10, the DAQ 930, and a hardware abstraction layer 980.

The hardware abstraction layer 80 comprises: a mechanism therein to encapsulate the particular fixed address of the connected electrical circuits on which the software operating layers of the hardware abstraction layer 980 will operate and software interfaces (928, 928A, or 982) encapsulating occurrences of 916B in the form of one of the following: the packetized representation (an ordered collection of bytes) of a message 928 exchanged by the software architecture 10, the packetized representation (an ordered collection of bytes) of a message exchanged by the software architecture 10 representing only the payload structure 928A (the valid data arguments) expected by the software operating component 984 or 986, or an alternate representation 982 of either 928 or 928A where the intent and data values and resultant actions are functionally identical but not of the form of an order collection of bytes. A unique software function 982 has arguments represented by individual named variables whose value is derived from 928A or represented by an ordered collection of bytes derived from 928A.

Application GDMs 984 are variants of 916B known as global design modules which are standard software operating components having been subjected to a standard development process including functional and non-functional requirements, testing, documentation, and implementation guidelines. Application GDMs 984 address appliance specific concerns such as defrosters, heaters, and door closure. Application GDMs 984 can be classified into at least two types of variants. The first variant contains specific application logic apart from the application logic 959 that is used to govern the behavior and gather information from a collection of other software operating components including a plurality of other GDMs 984, 986. The second variant contains specific application logic apart from the application logic 59 that is used to govern the behavior and gather information from a specific electro-mechanical device or sensor such as a heater, evaporator, motor, valve, solenoid, relay, pressure or temperature sensor. The second variant can be configured to address specific concerns made relevant by the specific manufacturer's variant of the device, by the particular configuration of the device based on the usage mode determined by the application requirements (i.e. scaling values), or by a confluence of factors which create specific concerns not mentioned heretofore.

Infrastructure GDMs 986 address specific recurring concerns which are independent of the application of the system architecture. They can be re-used across a plurality of appliances, examples of which include but are not limited to refrigerators, cooktops, dishwasher, dryers, and clothes washers. Infrastructure GDMs 986 can be classified into at least two variants. The first variant is associated with a particular concern resulting from a recurring combination of electrical components or electrical constraints. Some examples are: manufacturer interface constraints, device duty cycles, electrical load characteristics (such as inrush and steady state current limits), or other constraints such as the mode of analog-to-digital conversion such as 4-20 mA current loops vs. 0-5 Vdc analog voltage feedbacks. The second variant is associated with appliance- and application-independent software components known as utility functions. They provide logic used by other 916B components including 959 and 980. The second variant can contain or use references to the first variant of the infrastructure GDM 986. Examples include timers, zero cross detection, and other useful software components whose purpose is more utilitarian than driven by application or electro-mechanical requirements.

An embedded virtual router 970 provides an encapsulating layer by which architectural dependencies (the method by which one software component 916B is accessed by or exposed to another 916B (examples of 916B are 930, 984, 986) within or between at least two software operating environments connected by the network 914 alone or a combination of network 914 and other networks) between the application logic 959 (of the software operating layer 916A of the component 916) and the components comprised by the hardware abstraction layer 980, DAQ 930, another instance of application logic 959 or component therein, or any other useful component 916B are minimized or eliminated.

A software component 972 can be used by other software components 916B to obtain references to any other software components 916B where the obtained 916B may be part of a software operating environment 916A existing in or on: the same hardware component 916, a different hardware component 916 connected by 914, a different hardware component 922 connected by a combination of network segments including 914, or a different hardware component 916 of a different appliance 12 connected by 914, a combination of different network segments between the two occurrences of 12, and the 914 of the first appliance 12.

The software component 972 also provides the mechanisms for other software components residing within the same software operating environment 916A to publish the necessary identification and/or routing information into the memory of 972 to enable the aforementioned enumerated uses of the software component 972. The identification and routing information may be associated with components residing within the same software operating environment. Alternatively, the identification and routing information can be associated with components apart from the components residing within the same software operating environment but that are known by components residing within the same software operating environment.

Structures 974 in the memory of 970 are able to receive messages or provide functions for invocation of messages and are able to send messages or provide callback functions for the distribution of information. These structures have an access definition of a packet structure 928, a payload structure 928A, or 982 corresponding to an occurrence of a software component such as components within the hardware abstraction layer 980, application logic 959, or any other useful software component located in the aforementioned enumerations of 972 and the capability to route the information to that software component or to an appropriate intermediate software component having the same or similar purpose of 974.

Looking now at the possible collaboration examples, it is expected that the structures 974 of 970 will be created and populated based on discovery queries containing requests for access to specific software components 916B which are both identifiable and routable, invocations implying said access, or by software components 916B which are able to invoke on 970 on behalf of themselves or other components 916B resulting in creation and population of structures 974.

Collaboration 1: a command is issued by software component 959 of the right-hand software operating environment 916A and received by a software component contained in the collection of 974 with an identifier of API 1 within component 970 of the same software operating environment. Using the identification and routing information contained within 970, the component identified by API 1 transmits the received information through the other local software operating layers 10 and 952, and finally transmitted over 914 and received by 952 of left hand software operating environment. The message is then handled by software architecture 10 and routed to the appropriate component within 974 of the left hand software operating environment. The appropriate 974 of the left hand software operating component using identification and routing information contained within 970 of the same software operating component then invokes on or sends the message to the local implementation of API 1 contained in the left hand software operating environments hardware abstraction layer 980. Thus the application logic within software component 959 of the right hand software operating environment invoked a function implemented in the software operating environment of the left hand side without information contained therein for the realization of said invocation. Therefore, the value of the design implied by FIG. 30 is that application logic 959 is re-useable with respect to the location of the of the other software operating components 916B within a plurality of software operating environments 916A connected by a network 914 or a plurality of network segments which may include 914.

Collaboration 2: In this case, the initiation of the message is from 959 of the left hand software operating environment 916A. Illustrated is the case where the final invocation is on a software component (in this case API 2) within the same software operating environment using the same methodology described in greater detail in Collaboration 1. Therefore, in Collaboration 2, an alternative architectural disposition between an occurrence of Application logic 959 to some other useful software component (API 2 of hardware abstraction layer 980) is shown to have no effect on the implementation of either. And furthermore, it is the purpose of software component 970, also being able to comply with the Identification and interface requirements imposed by the software architecture 10, to provide this capability.

Collaborations 3-6 show additional uses for the embedded virtual router 970. The mechanisms used to accomplish these variants are the same as described in Collaborations 1 and 2. They are included to illustrate the usefulness of the design and the expected additional message patterns to be available with respect to the DAQ 930. Local event listeners (3) and remote event listeners (4) of application logic 959 are provided with an interconnection to a representation of the DAQ engine 930 providing not only a connection to the DAQ in the local software operating environment, but also to the DAQ(s) which reside in remote operating environments. DAQ generated messages based on the occurrence of DAQ events can be transmitted locally (6) and remotely (5) through mechanisms available in 970.

In addition to the six collaboration examples, a seventh collaboration example includes first and second arbitrary software components comprised within the application logic 959 where both the first and second arbitrary software components have identifiers and can be identified within the structures 974, which can comprise the routing table. In this collaboration, the first arbitrary software component sends a message to the second arbitrary software component by invoking a software function linked to a plurality of function pointers within the routing table (another example of using a virtual network, i.e. a collaboration between arbitrary software components within a shared runtime environment). One of the function pointers of the plurality of function pointers links the message to at least the second arbitrary software component. Likewise, if there is a second instance of the second arbitrary software component residing in the application logic of 916, the first arbitrary software component function invocation may not change. In this case, the plurality of function pointers would include a pointer linking the invocation to routing information contained in the routing table. The routing information is necessary for enabling the message to be routed from the invocation to the receiving second instance of the second arbitrary software component.

It is preferred that the routing tables are populated by one of at least discovery confirmation messages, propagated discovery confirmation messages, manual configuration, semi-manual configuration, hard coded configuration software, and the software compilation process. It should be noted that using discovery messages to populate routing tables is the preferred embodiment. However, routing tables can also be populated using conventional configuration methods involving a manual or semi-manual configuration process, such as with the use of a visual configurator (see, for example, FIGS. 28 and 29 used for another purpose). In addition, a manual or semi-manual configuration process can be used in addition to discovery generated routing tables. In this approach, the discovery process or the configuration process can incrementally add or delete routing information within a routing table.

The various techniques described above with respect to the use of the embedded virtual router 70 can also be applied in a variety of other network configurations in order to enable communication between objects in the system. Examples include but are not limited to enabling communication between two different arbitrary software components within an application logic 959, an arbitrary software component of an application logic 959 and an arbitrary software component of a hardware abstraction layer 980, any arbitrary software component of a first processor and any arbitrary software component of a second processor on the same component 916, any arbitrary software component of a first processor and any arbitrary software component of a second processor on different components 916 within an appliance 12, any arbitrary software component of a first processor and any arbitrary software component of a second processor on different components 916 in different appliances, any arbitrary software component of a first processor and any arbitrary software component of a second processor on different computers where the computers can be dislocated from one another but coupled via a network.

It should be understood that the arbitrary software components above are preferably associated with an identifier associated with the functionality of the software component (a class) and with an arbitrary identifier used as an object handle. A comprehensive namespace can contain unique identifiers for each arbitrary software component on the system. An exemplary namespace can create identifiers comprising a class ID including an API ID, an instance ID, and a type ID; and an object ID comprising a node ID and an instance ID. In another exemplary scheme, model number ID and serial number ID can also be identifiers in a namespace. Other namespace schemes can use any desired combination of identifiers to give each arbitrary software component a unique identifier.

Figure 31:
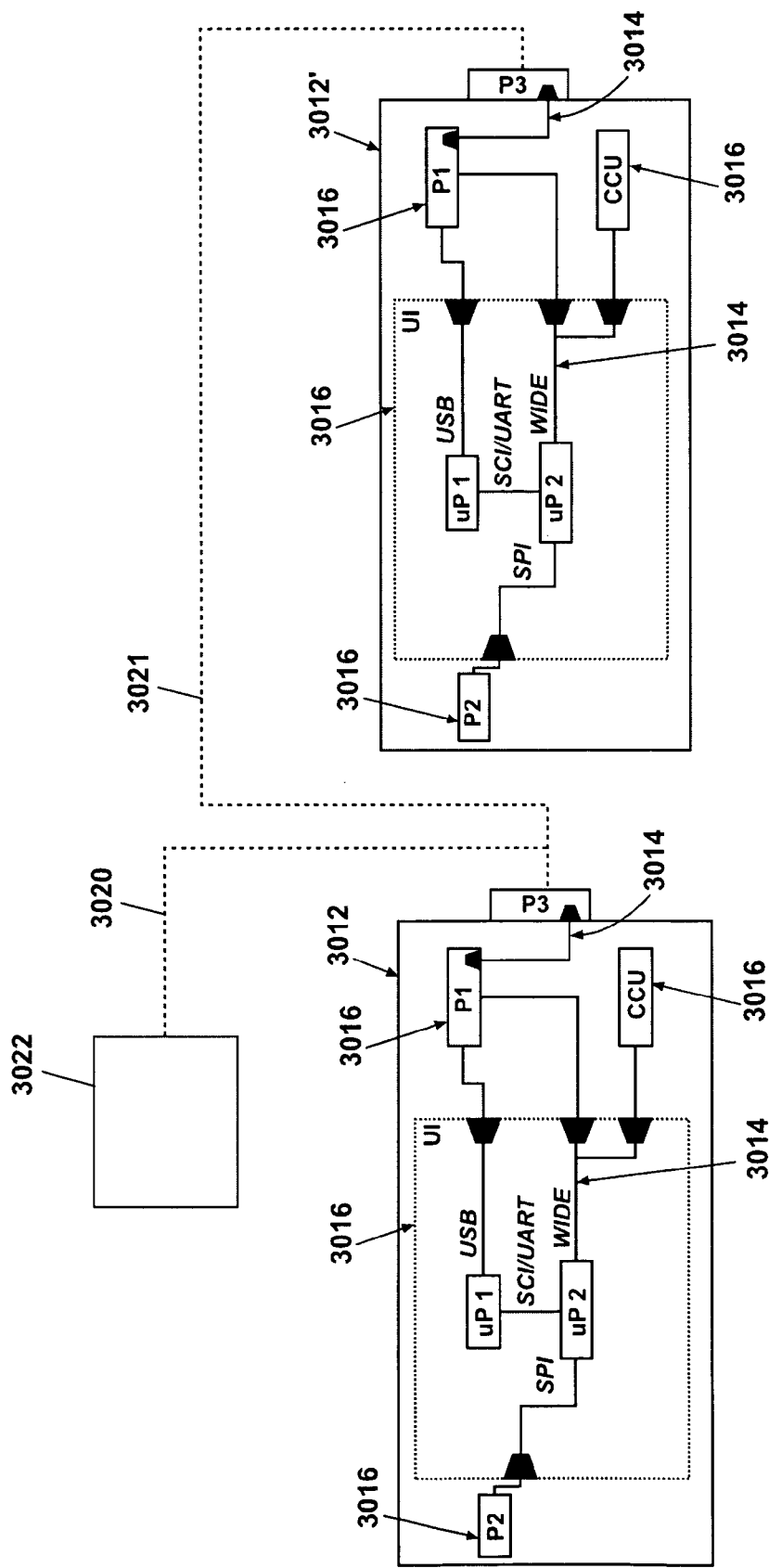
FIG. 31 is a schematic view of a network of appliances and clients connected on multiple networks by couplers.

FIG. 31 illustrates a network architecture comprising two appliances 3012, 3012' and a third party device 3022 of the type shown in FIG. 1. Each appliance has a plurality of nodes 3016 comprising, in this embodiment, a CCU, a user interface UI, and several peripherals P1, P2, and P3 in communication with each other by a local network 3014. Each peripheral can be a circuit board which may or may not have at least one microprocessor. On the UI board, there are shown two microprocessors uP1 and uP2, connected by a serial communication bus which is different from 3014. The UI board typically has multiple network connections on USB, WIDE, and SPI networks. The third party device 3022 may be able to send messages. Alternately, the third party device 3022 may send messages in the form of a taxonomy dataset. In the latter case, the peripheral P3 could contain a taxonomy architecture which could create well formed commands. The appliances 3012, 3012' communicate with each other over network 3021 and the third party device 3022 communicates with the appliances over network 3020.

Figure 32:
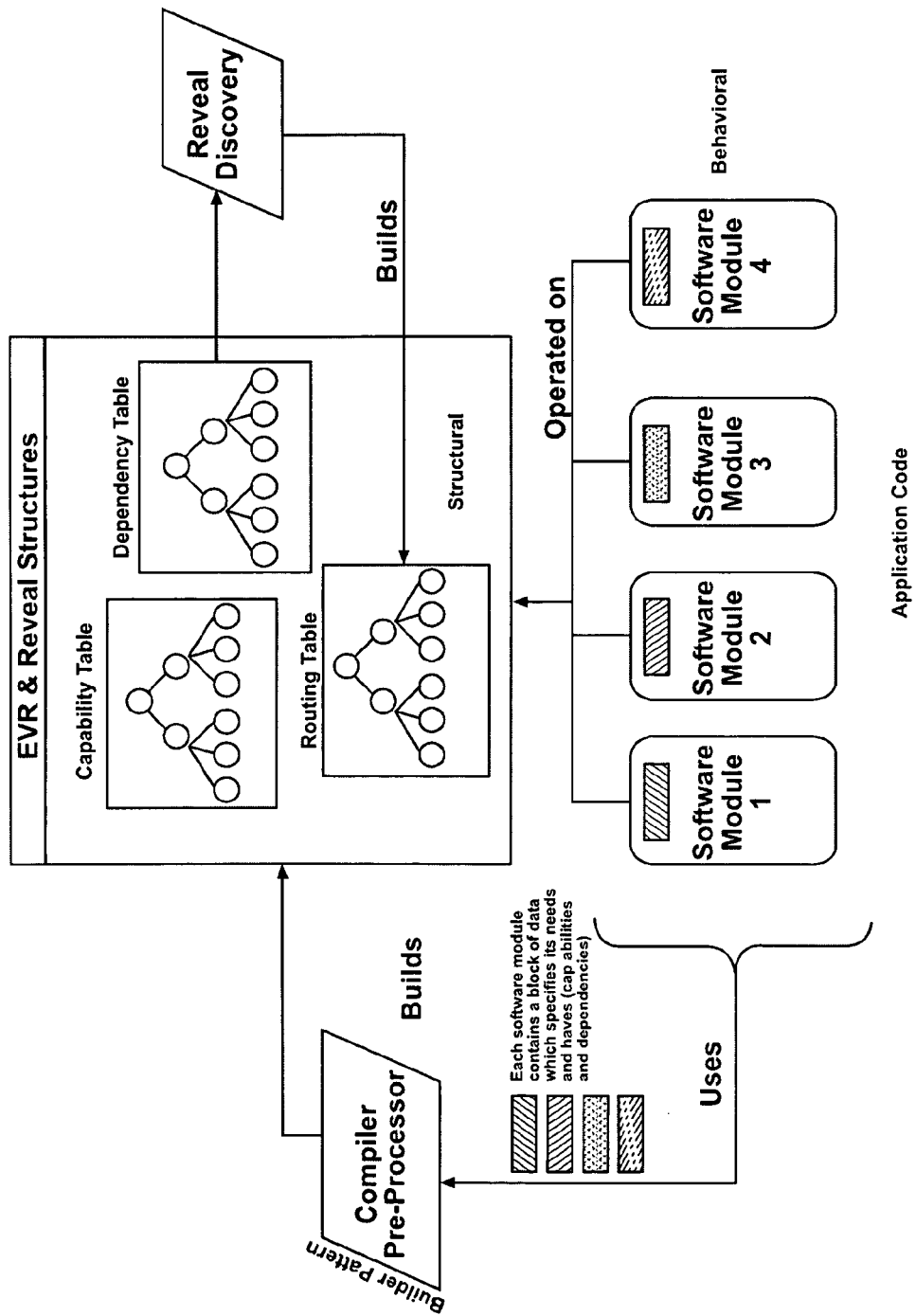
FIG. 32 is a schematic view of a process of creating main structures of an embedded virtual router.

It will be seen in FIG. 32 that messaging can occur among micro processors on the same board connected on a network different from 3014. As well, messaging can occur between boards 3016 on at least two networks where the networks are not of the same type. Further, messaging can occur between appliances 3012, 3012' between boards 3016 carried on at least three networks where at least one of the three networks is a network external to the appliance. Yet further, the third party device 3022 can communicate with nodes implementing SA or nodes that can route messages to a node implementing SA in accord with the invention.

It will be understood that the architectural characteristics of a network configuration normally impact the implementation of the arbitrary software components which communicate within the architecture. By "architectural characteristics", we refer to the distinctive features of individual networks, the way the various boards 3016 are interconnected, and the combinations of network routes interposed between connected boards 3016. An embedded virtual router in a processor on a board 3016 in accord with the invention will enable the arbitrary software components in that board 3016 to communicate independently of the architectural characteristics of the associated networks.

An advantage of an embedded virtual router according to the invention can be seen in an appliance having a plurality of useful arbitrary software components, each providing at least one useful consumer benefit. Since different consumers typically prefer different combinations of features, it has been a long standing problem in the appliance industry to be able to supply only the sub-set of specific features that an individual consumer would prefer. Typical approaches include (1) providing multiple appliance models or SKUs, each with a unique feature set, and (2) providing an appliance with the superset of features insuring that the customer can have all the available features. Both are costly because arbitrary software components in appliances are hardware dependent; at a minimum, software for a board controlling a device in an appliance must be reworked for use in a different appliance, even if it is the same or similar device. This invention provides a third, more cost-effective alternative. With the use of an embedded virtual router according to the invention, all arbitrary software components are independent of one another with respect to their architectural location. An appliance manufacturer can thus provide a user-specific capability for an appliance at much lowest cost by providing an external client having any combination of arbitrary software components that can be purchased separately as part of an external accessory, but with full capacity to participate in all forms of useful communication with other arbitrary software components within the appliance because of the embedded virtual router.

Assume, for example, an appliance with three possible features: (a) a door switch, (b) an LED, and (c) an LCD, either or both of the LED and the LCD to indicate the state of the door switch. All versions of the appliance will have a door switch. But some will have only an LED, some will have LCD, and some may have both an LED and an LCD. With the prior art, the manufacturer has to provide three software architectures: one for communication between the door switch and the LED, one for communication between the door switch and the LCD, and one for communication among the door switch, the LED and the LCD. With an embedded virtual router according to the invention, designer need only have software architecture for the door switch and an embedded virtual router. An accessory can enable the door switch in any version of the appliance having an embedded virtual router to handle communication with any combination of LED and LCD, without further software architecture.

For another example, assume an appliance with three controller circuit boards, each having a feature. If a manufacturer sought to save costs by combining two features on a single board, any costs savings would have be adjusted by the added cost of reconfiguring the software architecture on the third board. A software architecture with an embedded virtual router according to the invention would enable such a change without the necessity of reconfiguring the software architecture.

Figure 33:
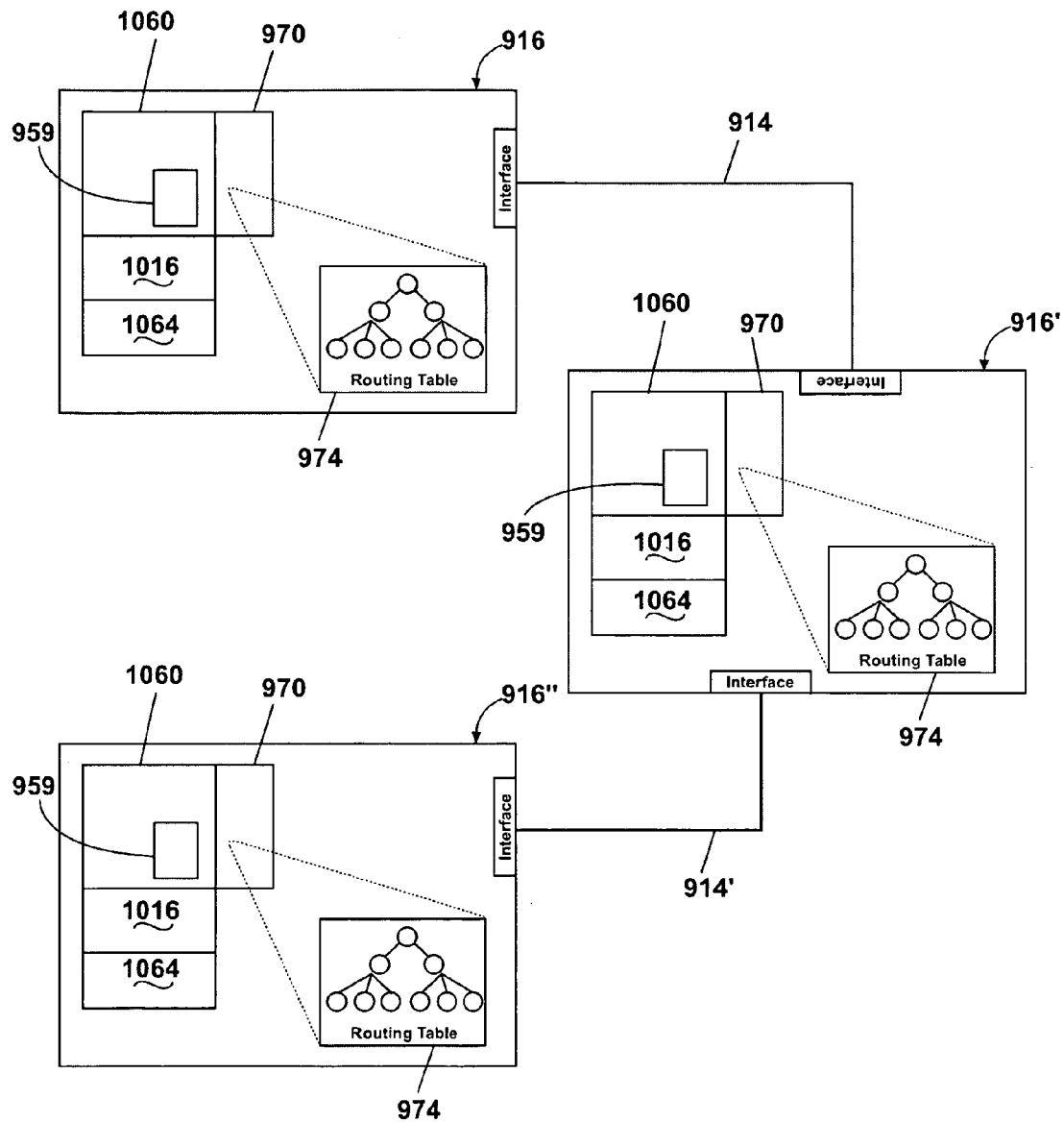
FIG. 33 is a schematic view of a plurality of hardware components that are communicatively connected using chaining.

FIG. 33 illustrates the process of creating the main structures 974 of the embedded virtual router 970 (see FIG. 30). The three main structures 974 comprise a capability table, a dependency table, and a routing table. Each software module operating over the appliance network or among appliances and accessories contains its own capability and dependency information. The compiler pre-processor executes a set of EVR builder macros at compile time to create a capability table and a dependency table (that may be in composite form) for the downloadable software image. Reveal Discovery completes the process by populating the routing table. Although FIG. 32 shows the creation of the dependency and capability table on compiling, all can be created at runtime. The routing tables simply inform the application layer how to 'get to' other software specified in its dependency list. Routing tables are populated based on a first set of software modules stating a set of "needs" in the dependency table and a second set of software modules stating a set of "haves" in the capability table. For "needs, the implementer specifies what software modules (classes) are needed by this software module. For "haves", the implementer specifies what software modules (classes) are available.

FIG. 33 illustrates how the embedded virtual router 970 can enable different hardware components 916, 916', 916" to be virtually chained together. This virtual chaining enables messages to be sent from the application logic 959 of a first hardware component 916 to the application logic 959 of a third hardware component 916" without the first hardware component 916 having to know anything about the route that a message will have to take by using structures 974 contained in each component's embedded virtual router 970. Each hardware component 916 916', 916" includes at least one arbitrary software component, e.g., software components 1060 (see FIG. 8). Each hardware component 916, 916', 916" also includes an SA driver 1016 and a WIDE driver 1064 (see FIG. 8). Network 914 connects the first hardware component 916 to the second hardware component 916', and network 914', which is a different network from network 914, connects the second hardware component 916' to the third hardware component 916". Routing tables comprising the information on the structures contained in the memory of the first hardware component 916 and of the second hardware component 916' of FIG. 32 are used to encapsulate the complete route from the first hardware component 916 to the third hardware component 916". This enables a message to be sent from the first hardware component 916 to the third hardware component 916" without the first hardware component 916 having knowledge of the route between the second hardware component 916' and the third hardware component 916". The message can be propagated such that a first message is sent from the first hardware component 916 to the second hardware component 916' while a second message is sent from the second hardware component 916' to the third hardware component 916". In this manner, the routing information necessary to route the message from the first hardware component 916 to the third hardware component 916" is contained in part within each of the first and second messages.

Figure 34:
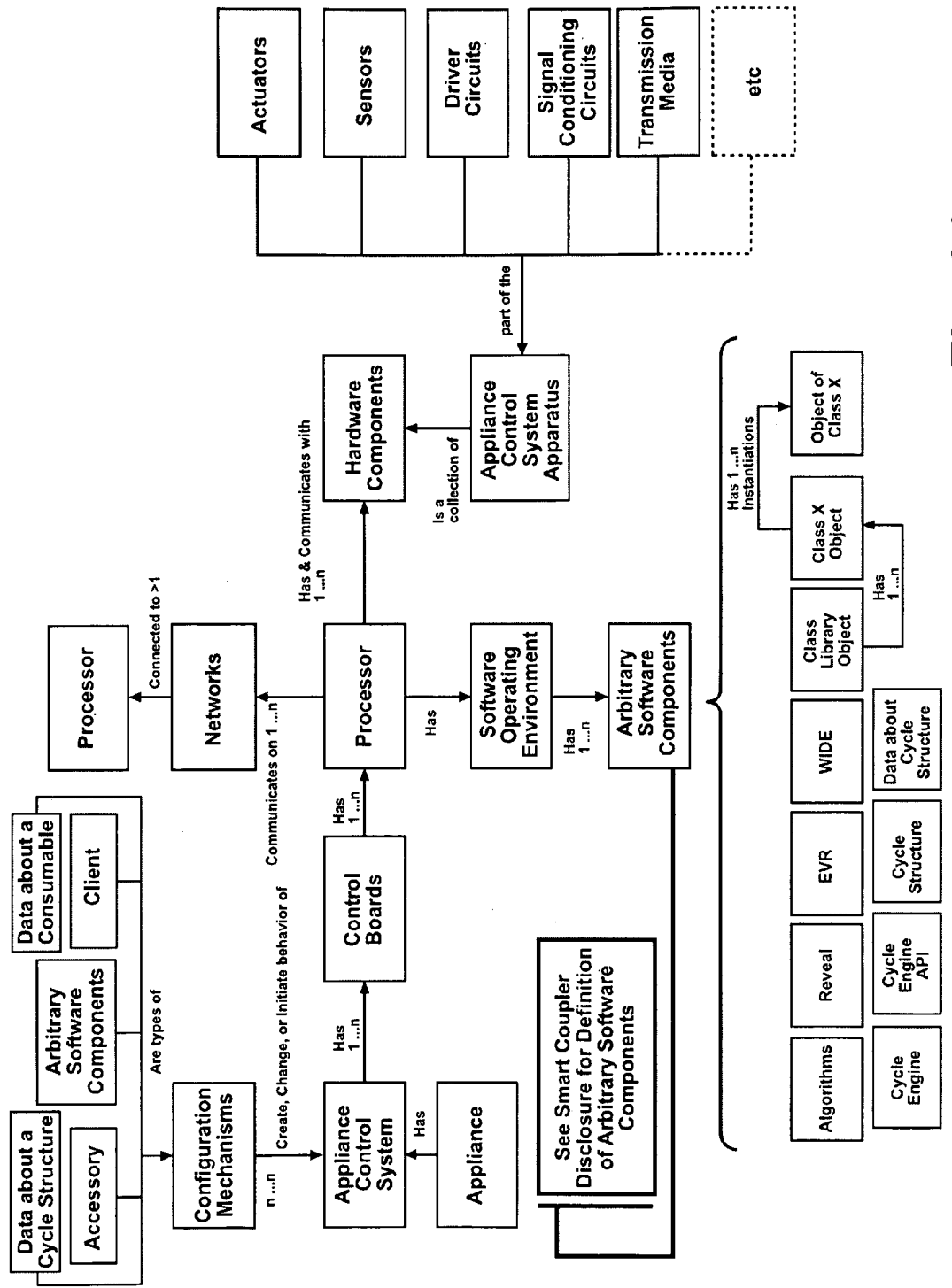
FIG. 34 is a schematic view of relationship between structural components within an appliance control system.

FIG. 34 exemplifies the relationships between the structural components within an appliance control system. The appliance has at least one control board which is well known in the art. The control board has at least one processor able to execute software (also known sometimes as firmware) and control some part of the appliance control system apparatus. Control is defined to mean the changing of the state of one of the hardware components to which the processor is attached. For example, a valve may be changed from a closed state to an open state. This represents the control of the valve by the processor. The processor may effect this change of state by changing the state of one of its IO Pins which is in effective communication with the hardware component or by sending a network message where the network is in effective communication with the hardware component. Effective communication refers to the ability to send and receive messages with meaningful information without defining the exact means by which communication is achieved. The software which a processor executes can be broken into a plurality of arbitrary software components. This breakdown has several advantages. They include: manageability, readability, portability, re-usability, e.t.c. It is well known in the art of software design to break-up software into modules or components for these reasons.

The invention introduces new components to the appliance control system which will enable the appliance control system to be effectively built from re-usable components and to be dynamically configured by a variety of configuration mechanisms. Further the invention will deliver the benefit of re-usability and configurability.

Re-Use

It is known in the art that object oriented techniques promote and enable software re-use. A first component enabling re-use is the class library. Class library contains a plurality of class definitions. A class definition comprises an interface with a plurality of method definitions and a plurality of field definitions.

Field definitions are named variables which have a known data type. The value of a field definition must be a value corresponding to the field's data-type. Example: Field x is an unsigned integer. The value of x can be a number within the range of 0 to 65535. Field definitions can also have a data-type corresponding to another class definition.

A method definition is a function with a name and a description, a return value, and a set of arguments. Each argument of the method can also have a name and a description. Each argument can also have a data-type and a set of valid values. The data-type can also be a class definition.

Each method definition further comprises executable software which can use the arguments in conjunction with the executable software so that the executable software returns a result and/or executes the behavior corresponding to the logic of the executable software and the values of the argument received in the set of arguments. A method definition can further comprise invocations onto other method definitions of its containing class or to method definitions which it has visibility to. The approach to gaining visibility to other classes' methods is known in the art. The return values from the other method definitions can be used by the executable software of the first method either to influence the return value of the method or to influence the behavior of the logic of the executable software.

Preferably, a class definition is confined to a single logical purpose to which the plurality of methods contributes the enablement thereof. A class library can be governed independently of the Appliance Control Systems to which it is applied. Class Library governance includes deployment, documentation, development, testing, bug fixes, revision control and the like.

Class definitions are made executable in two ways. The first way is via a method known as static. When a class is executing statically, all executions of the methods of the class are occurring within the same memory of the processor. This means that if there are two executions occurring simultaneously, the methods of the class must be designed such that any state information used within the execution and stored in memory by a first execution is guarded against inadvertent use by a second execution.

Two factors giving rise to the second way are that 1) it is advantageous for methods to store state information in memory for later use and 2) to enable the 1), it is required to index that state information to a particular execution or execution context so that when there are multiple executions or execution contexts that the method can retrieve the appropriate state information.

Therefore, the second way a class definition is made executable is by instancing a class into an object thereby creating the mechanisms to assign an instance of a class to a particular execution or execution context. Instantiation refers to the allocation and assignment of memory sufficient to hold a unique collection of information associated with a unique object instance and defined by the field and method definitions of the class definition.

Instantiation is the mechanism which allows a class's state information and references to other objects to be encapsulated together and associated with a particular execution or execution context and to expose that instantiated memory to other objects via some type of memory pointer or unique identifier.

An object has the ability to store information associated with its execution context and in its fields. When an object has a field of a data-type that corresponds to a class, the value of the field can be an object. In this way, objects can be composed of their own fields of data and methods and of a plurality of other objects.

Dynamic Configuration

As previously stated, objects can be composed of a plurality of other objects according to the objects field definitions. If an object comprises a method which has executable software to set the value of a field defined to hold an object, then that object can be reconfigured by changing the value of the a field from a first object to a second object. This reconfiguration can then result in a different composite or overall appliance control system behavior. There are many useful purposes for an appliance control system whose behavior can be changed by changing the values in a first objects field to a third object from a second object. For example, a cycle accessory could use this technique to change a cycle structure. Likewise, both a consumables reader and a recipe book wand could use these techniques to customize the behavior of the appliance control system according to the data about the cycle, the data about a consumable, and the like.

There are many mechanisms which can initiate and manage the dynamic configuration of an appliance control system. However, these mechanisms (see FIG. 34) will need a common design framework with which to accomplish the dynamic configuration. And some portions of the dynamic configuration can be accomplished during the compile process while other portions may be accomplished at post-compile time (also known as runtime).

Figure 5:
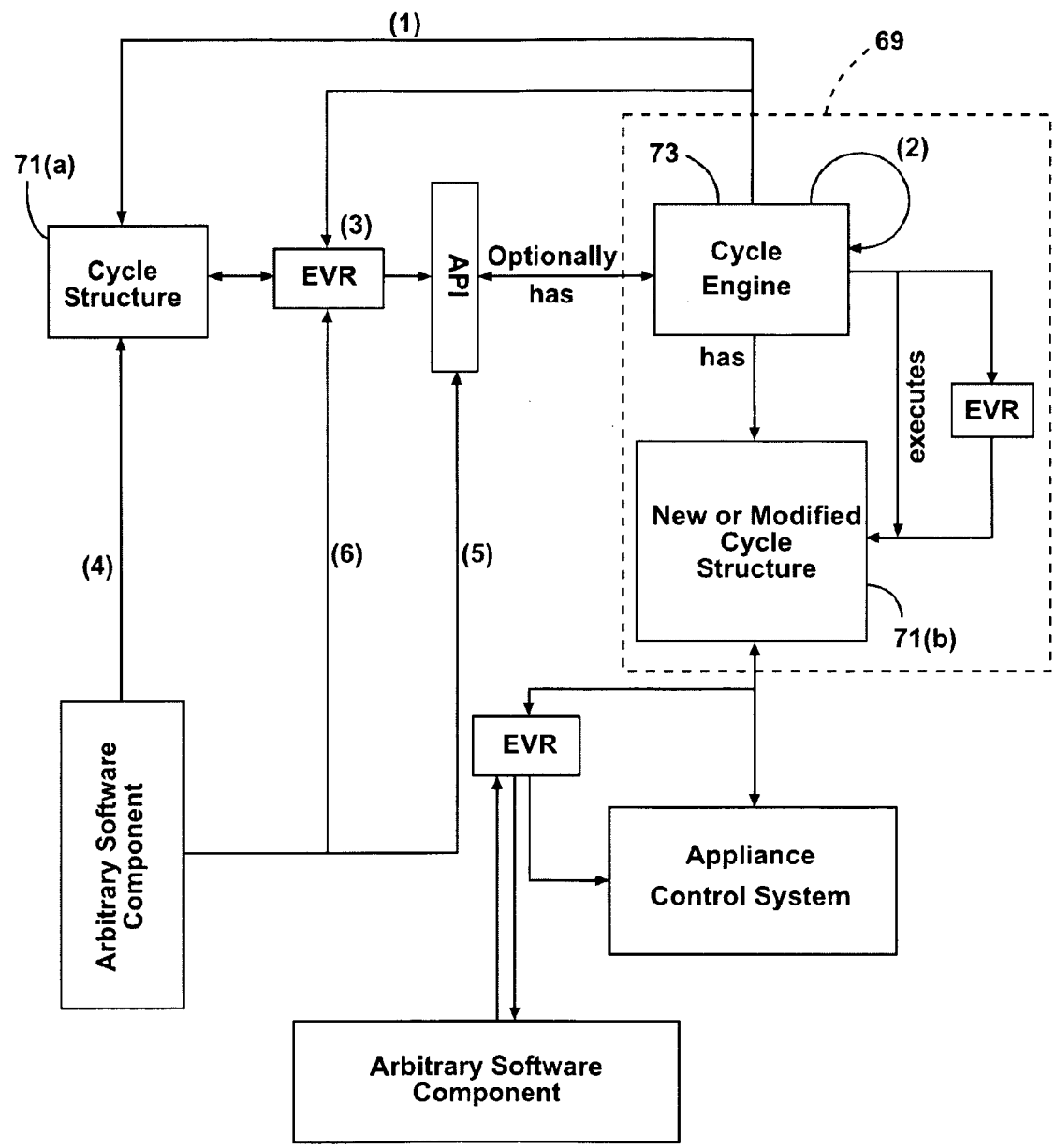
FIG. 5 is a schematic diagram showing the communications controlling the operation of an appliance.

FIG. 5 illustrates at least two embodiments of communications controlling the operation of an appliance according to the invention by information related to a cycle structure 71. Here, cycle structure 71(a) represents changes to be communicated to the cycle engine 73 (e.g. a new cycle structure or modifications to an existing cycle structure) or information about a cycle structure 71, and cycle structure 71(b) represents a cycle structure after change by the cycle engine 73. Messaging (1) communicating a cycle structure 71(a) to the cycle architecture 69 enables the cycle engine 73 to discover information related to a cycle structure 71, data about a cycle structure 71, or a cycle structure 71(b) to be created or modified. The cycle engine 73 proceeds to build a new or modified cycle structure 71(b) at (2). Optionally all messages can be routed through an embedded virtual router at (3) resulting in the cycle engine 73 using its own configuration API for building the new or modified cycle structure 71(b). As well the execution by the cycle engine 73 to create or modify the cycle structure 71(b) can be accomplished through an EVR.

Alternatively, any client having an arbitrary software component, such as a client 40 in the consumable holder 16, can find or discover the cycle structure or data about a cycle structure 71 at (4). Then, the arbitrary software component can build a new or modified cycle structure in conjunction with the cycle engine 73 configured to receive configuration messages as at (5).

Thus, it is seen that the creator of a new or modified cycle structure 71 is the cycle engine 73 or an arbitrary software component in communication with the cycle architecture 69. The arbitrary software component can reside in a variety of locations with respect to the controller 68 comprising the cycle architecture 69. See the discussion below with respect to FIG. 7. Hence, all messages between the arbitrary software component and the cycle architecture 69 can be optionally routed through an EVR as at (6). As well, the cycle architecture 69 can optionally communicate with the appliance control system through an EVR.

Using the aforementioned cycle engine architecture 69, an operational cycle accessory can be added to the network of an appliance, discover the cycle architecture 69, and send it configuration messages to affect its structure and ultimately its execution. In this case, the operational cycle accessory would typically include a combination of software and data to accomplish the configuration of the cycle architecture 69. Alternately, the aforementioned cycle architecture might send a discovery message seeking identification of all sources of the cycle structure. Sources of the cycle structure may be in ROM, Flash, EE Prom, an operational cycle component, and/or an external source connected via a network different from the control network (See, for example, FIG. 7). Once the cycle structures 71(*a*) are located and retrieved, the cycle engine 73 can commence modifying its own cycle structures 71(*b*) according to the new cycle structure data.

In another embodiment of a cycle architecture 69, a first portion of the cycle structure 71(*a*) is compiled and a second portion is made available at runtime. The second portion can include a plurality of cycle structure data, either in direct or indirect form, which can be combined with the first portion such that the cycle engine 73 operates on the aggregate of the first and second portions for a new operational cycle execution software. The second portion may represent differences in the first portion where differences may be additions, deletions, or modifications to elements, their relative orders, or their relative relationships within the cycle structure. The cycle engine 73 could appropriately apply the differences represented in the second portion by looking at the identifiers of the elements of the first portion of the cycle structure 71(*a*) and the identifiers of the elements of the second portion of the cycle structure 71(*a*). The advantage of this embodiment of a cycle architecture 69 is that changes to the aggregate cycle structure can be made while preserving the first portion such that subsequent corruption or absence of the second portion would not effect the integrity of the first portion, thus enabling the operation cycle execution software to revert to compiled default state, such as might be supplied at the factory. A second advantage of this embodiment is that specialized variants of the first portion can be designed which can accommodate the constraints presented by the appliance process control apparatus 14 and more specifically the controllers 68 such as limited memory and also provide capability for receiving and adapting to a second portion providing flexibility and configurability within the constraints for the cost of the specialized variants. For appliances, this can be an important requirement in some cases.

Alternatively, when an operation cycle accessory is disconnected from the cycle engine 73, the data of the second portion can be optionally removed by the cycle engine 73 causing a reversion to the factory default state. This is a form of anti-piracy protection in that the operation cycle accessory must be present for the additional functionality represented by the accessory to be available to the appliance. Optionally, the connection between the appliance and the operation cycle accessory can include a transfer of the first portion into a memory in the appliance. In this case, additional operation cycles can be retained without the permanent presence of the operational cycle accessory. It should also be noted that an operation cycle accessory can be virtual in that the software and data and ability to communicate with the cycle engine may reside on an external device connected to the cycle engine 73 via at least one network and not physically attached to the containing appliance 12.

It is to be noted that an operational cycle component 60 can have other elements that are not the aforementioned operation cycles or constituent data and complied portions. For example, the operational cycle component 60 can include software code to configure a cycle engine 73 for communication and other functions or code to put software architecture into an alternate mode for the purpose of diagnostics or changing memory.

An appliance cycle of operation performed by the appliance process control apparatus 14 can be optimized by information associated with the consumables 24 on which the appliance process control apparatus is operating. For example, the cycle structure 71 could be built specifically to accommodate some properties or attributes of the consumable 24 or to accommodate some properties or attributes of the consumable holder 16. The body or bodies that comprise information, identifiers of functionalities, properties, attributes, and property and attribute values related to consumables 24 can be referred to as sources of information about a consumable or "consumable information holders." Examples of consumable information holders include the consumable itself, a data pod, the consumable holder 16, a user interface, and a tag. The consumable holder can be a sensing consumable holder that might use a lid sensor, for example, for sensing attributes about the consumable contained therein. These attributes could then be used by the electronics 30 to further refine operation of the consumable holder. For example, if the consumable holder were to dispense 2 ounces, a lid with an amount sensor could be configured with an analog circuit coupled to the electronics 30 to provide a level or volume feedback so that the electronics 30 can dispense exactly 2 ounces rather than a time-based approximation.

Information associated with a consumable can include amount and/or composition or other attributes that would characterize the magnitude of the usefulness of the consumable. In this case, the cycle architecture 69 may adapt itself based on the information. For example, if the consumable 24 were a dishwashing rinse aid and the consumable holder 16 had only 90% of the standard dose, the cycle architecture 69 might adapt itself to this condition by increasing the time of the rinse phase to compensate for the lack of rinse aid. Information associated with a consumable can also include parameters of an operating cycle such as personal preferences of a user (e.g., doneness or crispiness preferences), and data about the consumable holder 16, the appliance 12, or other accessories or components thereof.

In a laundry example, the appliance process control apparatus 14 may provide information to the cycle architecture 69 about process variables like soil level, load size, soil type, etc. Based on this information associated with a consumable, including the process variable information, the cycle architecture 69 or an arbitrary software component in conjunction with a cycle engine 73 can reconfigure the cycle structure 71 to adapt to the process variable information. The consumable holder 16 may comprise the arbitrary software component and be able to reconfigure the cycle structure 71 to adapt to the process variable information. As shown in FIG. 5, reconfiguration can be accomplished in at least two ways. In one way, the arbitrary software component can read the cycle structure 71 and communicate with the cycle engine 73. In a second way, arbitrary software component can be preconfigured and communicate that configuration to or instruct the cycle engine 73 about the configuration.

One example of commands associated with an operating cycle is a collection of key value pairs. Keys comprise parameter names having a meaning, wherein the meaning is known by the cycle engine 73 such that values associated with the keys are thereby associated with the meanings. This enables the values to be used in the contexts of the meanings to modify and/or control the cycle of operation of the appliance.

Another example of commands associated with an operating cycle is a byte array representing a message packet for a network. In one embodiment of this example, the byte array could be arranged according to the packet definition disclosed in WO2006135726 comprising a functional identifier, an op code, and a payload, wherein the identifier and op code relate to an executable function or method implemented by the cycle engine and or cycle engine API. Further, the arguments or parameters of the function or method correspond to the data elements contained in the payload of the message packet.

The consumable holder 16, therefore, can contain all the functionality of and participate in all the embodiments that an operational cycle accessory in communication with an appliance 12 having a cycle architecture 69 can. Therefore in one embodiment, a consumable holder 16 is an operation cycle accessory that further physically contains and may also further be enabled to directly actuate the introduction of a consumable 24 into an appliance 12.

Consumable Reader

Looking again at FIG. 1, a consumable reader, such as that represented at 22, is any device capable of retrieving data or information associated with a consumable 24 directly from a consumable information holder (see discussion below) and exchange data concerning the information by sending and receiving data. A consumable reader 22 can inform memory in the consumable holder 16 of the type of detergent being held therein, for example. The use of this information could effect the operation of client software held in the consumable holder's optional client 40. Example effects could be dispensing quantities, frequency, or timing as controlled by the optional client software in communication with the consumable holder's process control apparatus 28 (having at least an actuator to control dispensing). Other example effects include communications between the optional client 40 and the controller 68 of the appliance 12 which could affect the structure and execution of the cycle architecture 69. See the earlier discussion of operational cycles. The optional client 40 will typically comprise electronics including a processor able to communicate with the communicating control nodes within the appliance process control apparatus 14 and the process control apparatus 28 in the consumable holder 16. The optional client 40 in some cases might be an arbitrary software component (as shown in FIG. 5) in communication with a consumable reader.

Information associated with a consumable, such as an operating cycle, a cycle structure, data about a cycle structure, data that can create or be interpreted to create a cycle structure, usage directions, cooking instructions, preparation instructions, dosage information, nutritional information, promotional and sale information, information about replenishment, offers for replenishment, reminders for replenishment, images and messages for user interface screens, and washing/drying instructions can persist, for example, within the consumable itself, in the packaging for the consumable, or in auxiliary materials, such as user manuals and performance tags, provided with the consumable. The consumable reader 22 is a component that can accept the information associated with the consumable and transmit it elsewhere, such as to the controller 68 of the appliance 12. The consumable reader 22 can be a device integrated with the appliance 12 or with the consumable holder 16, or a separate device that can be coupled, either by a hardwire connection or wireless connection, to the appliance or consumable holder for communication. Examples of consumable readers include, but are not limited to, bar code scanners, radio frequency identification (RFID) tag readers, imaging systems, cameras, intelligent vision systems, devices capable of communications using NFC (near field communications), and magnetic strip readers, enabled to send and receive data.

In another embodiment, an external device such as a phone, PDA, computer, camera, and any external client 1004/1002 able to read and decode the information from the consumable and communicate the information to an appliance is an example of a consumable reader. In this embodiment, the device could communicate the information directly if the device were in communication with the appliance network 1030 or the device could communicate the information using propagated messages on other networks such as 1052, 1070, or 1050.

The consumable reader 22 communicates the information associated with the consumable 24 to the appliance 12 so that the appliance can optimize its performance for the consumable. An example of employing the consumable 24 and consumable reader 22 is provided in the schematic illustration of FIG. 6. In this example, a food provider 70 determines cooking instructions (a cycle structure 71) for a consumable 24 in the form of a frozen meal 71 and encodes the packaging, which is a consumable holder 16, for the consumable 72 with the cooking instructions. A user can place the consumable holder 16 in the vicinity of the appliance 12, which in this instance is an oven, and a consumable reader 22 of the appliance 12 reads the encoded cycle structure 71 (cooking instructions) from the consumable holder 16 and communicates the cycle structure directly to the appliance 12. The cycle architecture 69 in the appliance 12 can then either execute the cycle structure 71 for preparing the frozen meal directly, or create a new or modify an existing cycle structure in the appliance 12 without need for additional information from another source and without need for consumable-related lookup tables. The information associated with the consumable can be self-executing.

The aforementioned example should not be limited to a food provider. Any consumable provider with an authoring tool should be able to develop information about a consumable, preferably in a form appropriate for the creation of an optimum cycle structure 71 and user interaction with the appliance user interface, and encode the information into the consumable or onto the consumable holder so that when the consumable is introduced into the use environment, the optimum cycle structure and the optimal user interaction can be created within the cycle architecture 69 so the user will have an optimum experience. An authoring tool comprises a computer with appropriate software, a driver 1016, an appliance with software architecture 1018, a network connecting the computer to the appliance for communication, and a data store for storing information about a consumable preferably comprising information about a cycle structure and information for use on a user interface and preferably with at least one identifier identifying at least one appliance.

It is contemplated that information associated with consumables will be available from a data source that contains or can acquire the information associated with consumables. The information can include at least one cycle structure corresponding to a preferred operating cycle for the consumable 24. In the case of a food item, the cycle structure 71 might be used to realize a complete cooking cycle definition for the food item. In this embodiment, the cooking appliance 12 can comprise at least one instance of the cycle architecture 69 so that the introduction of the cycle structure 71 into the vicinity of the cooking appliance 12 results in the creation or modification of a cycle structure 71, and initiation of a preferred operating cycle corresponding to the particular combination of the food item 24, the cooking appliance 12, and other attributes, such as the geographic location the cooking appliance 12 and its altitude. Moreover, the food supplier or any consumable or article provider might also encode cycle information comprising a sound, graphics, ring tone or other licensable information enabling the cycle architecture 69 to render the licensable information visually or audibly on behalf of the food or consumable provider.

It will be understood that information associated with consumables can comprise data about a consumable, such as identifiers of functionalities, properties, attributes, and property and attribute values that describe or characterize something about a consumable 24 or its consumable holder 16. The data about a consumable can manifest itself in any type of data structure appropriate for useful storage and retrieval. Examples of appropriate data structures are key-value pairs, XML, relational data tables, comma separated variable files, byte arrays, data packets, command objects, serialized objects, messages, and the like. The data about a consumable may reside entirely within or upon the sources of information about a consumable or consumable holder as will be discussed in more detail hereinafter. Alternatively, the data about a consumable may be created by a second arbitrary software component using a combination of a cycle structure 71 and information associated with consumables. In either case, the data about a consumable is constructed from information associated with a consumable or consumable holder retrieved from a source of information about a consumable or consumable holder.

Information associated with consumables can also comprise user preferences to further refine the creation or modification of the cycle structure 71 to correspond to the preference of the user of the cooking appliance 12. The consumable 24 and/or consumable holder 16 can also be enabled to identify the appliance 12 and provide an appliance-specific operating cycle. One manner of implementing this is for the consumable 24 and/or consumable holder 16 to have operating cycles corresponding to a particular appliance or class of appliance 12. The appliance 12 in which the consumable 24 and/or consumable holder 16 is used identifies and implements the relevant operating cycle. Another manner of implementation is for the consumable 24 and/or consumable holder 16 to have an identifier, and the appliance 12 has stored or access to a database or table of operating cycles for different consumables 24 and/or consumable holders 16. The appliance 12 takes the consumable identifier and looks up the corresponding operating cycle for the consumable.

Information associated with consumables can be in any suitable form. In one embodiment, the information can be a communication packet that can be directly transmitted to the software architecture 1018, thereby eliminating a need for a central storage of consumables data. In another embodiment, the information can be a key that can be used to direct the appliance 12 to stored consumables data.

The consumables 24 can be supplied by a third-party provider, as in the case of store-bought frozen meals and wash aids for laundry appliances and/or dishwashers, or provided by the user. Leftovers and cooked and uncooked prepared foods are examples of consumables 24 that can be provided by the user. The leftovers and the prepared foods can be placed in a storage container (consumable holder 16) encoded with information related to the leftovers and prepared foods. For example, the information can include re-heat or cooking instructions and an expiration date (i.e., throw away date). When the information includes the expiration date, the appliance 12, such as the oven or microwave oven, can refuse to re-heat or cook the food if the current date is past the expiration date. Optionally, the appliance 12 can be configured to receive an override command from the user when the user desires to re-heat or cook the food despite the expiration date.

Any suitable material can be used to encode the information, and examples include, but are not limited to, plastic wrap, aluminum foil, pots, pans, microwave-safe containers, container lids, and an adhesive or magnetic strip that can be placed on the storage container. The information can be configured by the person who originally prepared the leftovers and the prepared foods and encoded using any suitable means, such as a personal computer, a magnetic strip writer, or a handheld encoding device. With this configuration, the user can configure the information on the consumable 24 as desired. In this manner, the consumable holder 16 facilitates the acquisition of the data associated with consumables 24 from a data source.

Taxonomy

A taxonomy architecture is employed to avoid duplication of software logic (sometimes called business logic) between two interacting software components in a controlling device and a controlled appliance. It is beneficial when the controlling device is a consumable holder. In particular taxonomy permits a command generator in a controlling device to readily control an appliance without any information about the appliance being controlled except the control taxonomy itself. This can increase the flexibility of introducing "generic" control devices to control new appliances, adapting control devices to newly available cycles or functionalities which have been added to an appliance, and switching appliances between modes of operation where different operating cycles or functionalities are available. It also makes control of appliances easier for users since they need only be presented with choices which are currently available from the appliance.

A structured taxonomy dataset can efficiently communicate to the controlling device, e.g. a consumable holder, just that information which the controlling device needs in order to generate a well formed command for the appliance or other device such as a user interface. As used herein, a well formed command is a command which has meaning and is performable by the appliance or other device such as a user interface. The information conveyed by the dataset includes a hierarchy of options and data inputs required to form the well formed command. In one embodiment, it also includes semantic or contextual information to communicate in word or iconic form the available options so that a user can understand the available choices and enter the appropriate data. This is preferably accomplished by labels within the dataset that are associated with arbitrary or non-user friendly identification elements. This allows the logic of the software componentry which must interpret and process the Taxonomy to be decoupled from the presentation of the Taxonomy on a user interface.

Figure 23:
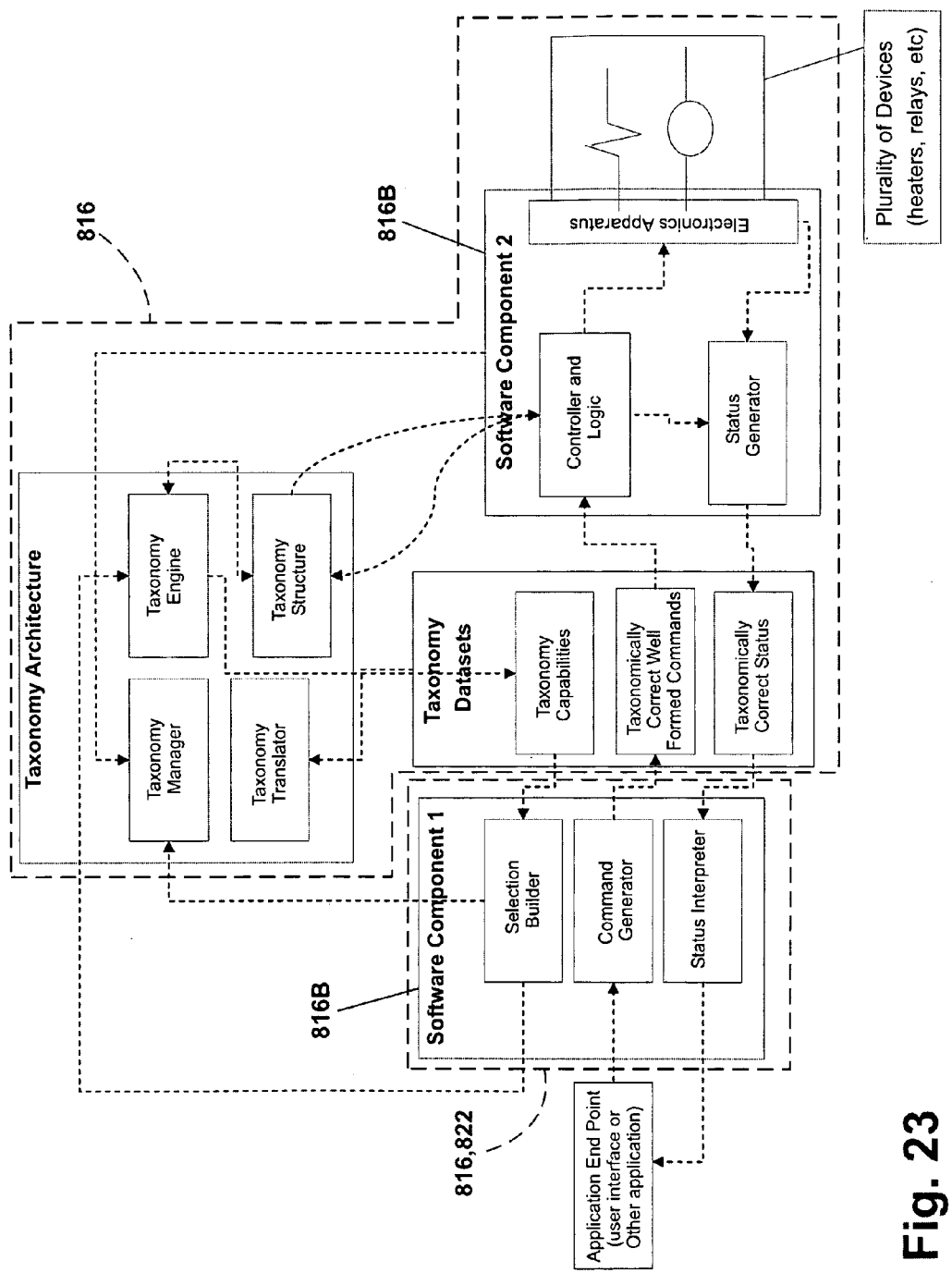
FIG. 23 schematically illustrates a taxonomy control using a taxonomy dataset in combination with the software architecture to control the operation of one or more components within the appliance without direct knowledge of the functions for the component.

Referring now to the FIG. 23, generally, the appliance 12 being controlled has a software component 816B having an appliance controller and a status generator. The controlling device 816, 822 (e.g., the consumable holder, consumable reader, or other client) used to control the appliance has a software component 816B with a command generator, a selection builder and a status interpreter. The controlling device 816, 822 may be a programmable user interface such as a PDA, web tablet, a cell phone, an LCD attached to the appliance or a client device.

The taxonomy architecture, shown disposed in the appliance controller 816 and logic, can be disposed in a remote location, such as in a controlling device or on the internet. The taxonomy architecture includes a taxonomy generator, a taxonomy engine, a taxonomy translator and a taxonomy structure. The taxonomy architecture generates a taxonomy dataset defining taxonomy capabilities facilitating the creation, by the software component 1 816B, of well formed commands that can be executed by software component 2 816B. Each of these components and their interrelationships are described in greater detail below.

Creation of the Taxonomy Dataset

The taxonomy dataset is derived from the operational capabilities of the appliance controller 816 structured in a manner to allow the command generator in the software component 1 to interpret the dataset to accomplish several results. More particularly, from time to time the taxonomy engine uses the taxonomy structure and the state aware information to generate a taxonomy dataset reflective of the subset of the universe of options for commands that would be available from an appliance to those that are currently available from the appliance.

For example, the taxonomy dataset describes the available functions supported by a software component 16B, each functions argument, and the valid values of each argument in a data structure. In addition, taxonomy dataset defines the valid values of feedback variables. Since this in a data structure, it can be transmitted and re-transmitted to clients 816 or 822 as required. Changes to taxonomy dataset occur as the cycles of operation progress and the available commands or the valid values of their arguments change. Moreover, additional commands may become available or may become invalid as a cycle of operation progresses.

More particularly, the selection builder registers with the taxonomy manager to receive notifications for new taxonomy engines. In response, the taxonomy manager passes references to all known taxonomy engines back to the selection builder. The selection builder then requests from each taxonomy engine a taxonomy capabilities data set. The taxonomy engine evaluates a taxonomy structure comprised by the controller logic of software component 2 or alternatively a document to generate a taxonomy capabilities dataset. The selection builder then populates a set of pseudo command structures appropriate for an application end point (examples of application end points are user interfaces for control or service or other intermediate application layers like an energy controller or home automation mode like vacation or goodnight.) and passes those structures to the application end point allowing the application end point to be configured. Alternatively, the selection builder may directly configure the application end point.

Communication and Use of the Dataset.

When a controlling device is networked with the appliance, the taxonomy manager establishes a relationship between the software component 1 and the taxonomy architecture allowing the command generator to query for the existence of taxonomy datasets, providing the software component 1 access to a taxonomy dataset, and allowing the command generator and status interpreter to subscribe to taxonomy dataset updates. The taxonomy translator is an optional component that translates the taxonomy datasets between software components 1 and 2.

The taxonomy dataset is communicated to the controller of software component 2 and to the selection builder of software component 1. Optionally, the taxonomy translator translates the taxonomy dataset to a different schematic definition of the command generator.

The command generator uses the taxonomy dataset to construct and populate a set commands structures available for selection by a user interface or other client applications comprising a set of valid commands, their valid arguments, and each arguments valid values. More particularly, the command generator uses the taxonomy dataset to construct one or more well formed commands which can then be transmitted to the controller. Since the taxonomy dataset can be reset and sent at different times by the taxonomy engine, or the dataset can be updated by revisions from the taxonomy engine, the command generator can have a current set of command structures then available for selection by a user interface or other client application.

Thus, in essence, through use of the taxonomy architecture, the software component 2 or its proxy (the taxonomy translator) communicates to software component 1 a rule set that can be interpreted by software component 1 so that software component 1 does not request something of software component 2 which software component 2 cannot accommodate and does not operate on a state variable which is set to an invalid value.

Before the application end point is able to commence execution, it will request or register for status updates with a Status Interpreter. This will allow the application end point to be populated with valid state variables from the controller before logic is executed and before user interface componentry is rendered. The status interpreter will process taxonomically correct status datasets and validate those datasets against the taxonomy capabilities data set. The status interpreter request or register for status updates from the status generator of software component 2 via the taxonomy engine. Upon receipt of a taxonomically correct status, the status interpreter will provide new status values to the application end point.

The application end point executes resulting in a rendering of the current status of software component 2 and a rendering of selectable pseudo command structures. Each time a selection is made from the pseudo command structure, the selection builder populates a set of valid sub-commands appropriate for the selection for further selection by the application end point. When a complete selection is made, a structure containing all pseudo commands are passed to the command generator.

The command generator will construct a taxonomically correct well formed command and optionally via the taxonomy translator, invoke the command onto the controller of software component 2 via the taxonomy engine.

Execution

The well formed command is delivered to the controller of the appliance and executed by the appliance.

Typically, the command will result in a state change to the associated memory of software component 2 which will trigger a status update created by the status generator and resulting in new renderings of state to the application end point. This change in state will result in a new capabilities taxonomy or a partial capabilities taxonomy which can replace portions of the original capabilities taxonomy. The new capabilities taxonomy resulting in a different set of valid selections for controlling the cycles of operation of software component 2.

Validation

The status interpreter uses the taxonomy dataset to validate status updates from the controller or taxonomy translator. The dataset contains information structured in such a way to allow the controller to fully validate incoming commands according the structure without additional logic outside of the dataset. For example, the dataset can be conceptually thought of as one or multiple decision trees, with each level of the taxonomy forming a different decision branch, with each of the options and/or data inputs can form a different level. The key presses on the user interface required to select the options and/or data inputs in forming the well formed command can be compared against the decision tree to confirm that each key press is found within a common branch on the decision tree. If the key presses are not found, then it is an indication that the command contains an error. The taxonomy structure thus serves to populate the user interface with available options and data inputs for a given state of the appliance and also serve as the logic for validating the resulting command.

The taxonomy dataset can be thought of as all available options and settings for an appliance at the current state. For example, the appliance comprises multiple components interconnected by the internal network. Each of the components can have one or more devices. Each of the devices has one or more functionalities, which has one or more settings. All of the functionalities for all of the devices will not necessarily be available during each state of the appliance. As such, the taxonomy dataset will comprise all options and data inputs for all devices that are currently available.

Consider a microwave oven with a top level of the hierarchy showing the options of COOK, JET DEFROST, BAKED POTATO, STEAM COOK, AUTO REHEAT, AND DINNER PLATE, as illustrative examples. The user must select one of the options from the top level.

A detailed example of the creation of the taxonomy dataset and the well formed command should prove useful. The creation of the taxonomy dataset for the microwave with multiple cooking cycles was constructed by the visual configuration utility (see FIG. 27) from the taxonomy capabilities dataset as is illustrated in XML as follows:

```
<device id="microwave" label="Microwave Oven">
    <device id="ovenCavity" label="Microwave Oven">
        <char name="cycle" label="Cycle" default="timedCook">
            <setting name="timedCook" label="COOK" />
                <char name="turntable" label="Turntable"
                    default="on">
                    <setting name="on" label="ON" />
                    <setting name="off" label="OFF" />
                </char>
                <range name="duration" label="Duration"
                    default="30" units="seconds" max="6039"
                    min="60" inc="1" />
                <range name="power" label="Power Level"
                    default="100" units="%" max="100"
                    min="50" inc="10" />
            </setting>
            <setting name="jetdefrost" label="Jet Defrost"/>
                <char name =foodType label ="Food Type"/>
                    <setting name="poultry" label="POULTRY" />
                    <setting name="meat" label="MEAT" />
                    <setting name="fish" label="FISH" />
                </char>
            </setting>
            |
            |
            |
            etc
        </char>
    </device>
</device>
```

If the user of the microwave chooses to Cook for 30 seconds at 90% power with the Turntable On, a well formed command of the taxonomy dataset would be transmitted optionally to the Taxonomy Translator and to the Taxonomy. The command would be of the form:

```
<command id=" microwave ">
    <device id="ovenCavity">
        <sequence>
            <step id="21">
                <char name="cycle" setting="bake"/>
                <char name="power" setting="90"/>
        <char name="duration" setting="30"/>
        <char name="turntable" setting="on"/>
            </step>
        <step id="22">
                <char name="power" setting="70"/>
        <char name="duration" setting="40"/>
        <char name="turntable" setting="off"/>
            </step>
        </sequence>
    </device>
</command>
```

The taxonomy engine would then traverse the taxonomy structure to transform the well formed command of the taxonomy dataset to a well formed command of the controller of software component 2 of a packet structure 828. The taxonomy structure is a superset of the taxonomy capabilities dataset. For each specifiable command element above (e.g., cycle, power, duration, and turntable) an additional collection of key words and values necessary to form payload 828A would be associated within the taxonomy structure. These key words would include API ID, Op Code, and Position Index into the payload 828A where position index could be a byte offset or a bit offset.

The taxonomy dataset could be constructed to directly represent the universe of possible commands of the APIs of software architecture 10 providing useful functionality for a service, factory, or laboratory engineer or technician.

Figure 24:
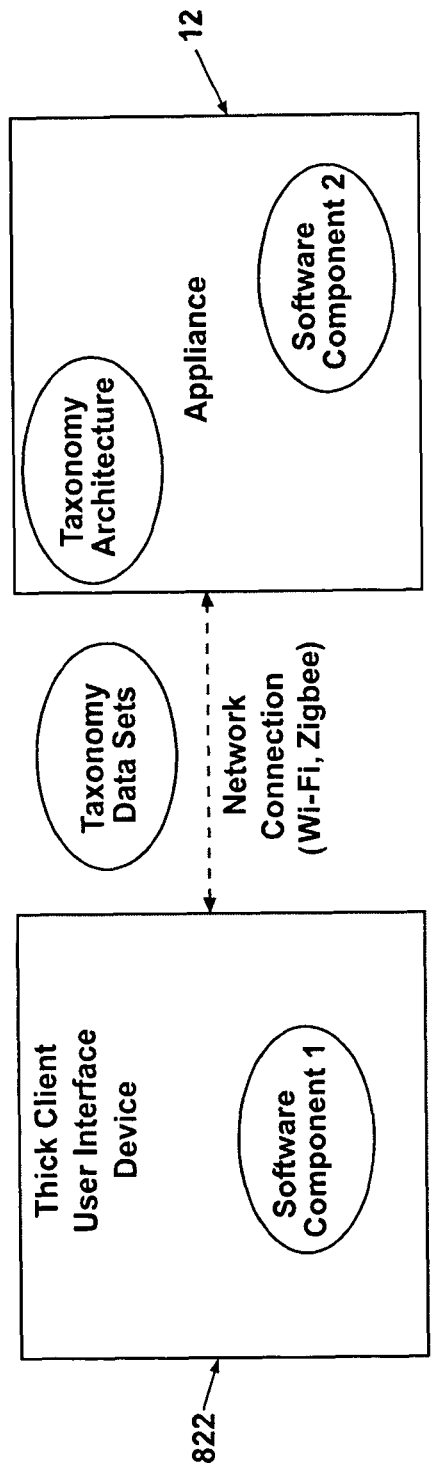
FIG. 24 schematically illustrates one embodiment of a taxonomy architecture according to the invention.
Figure 25:
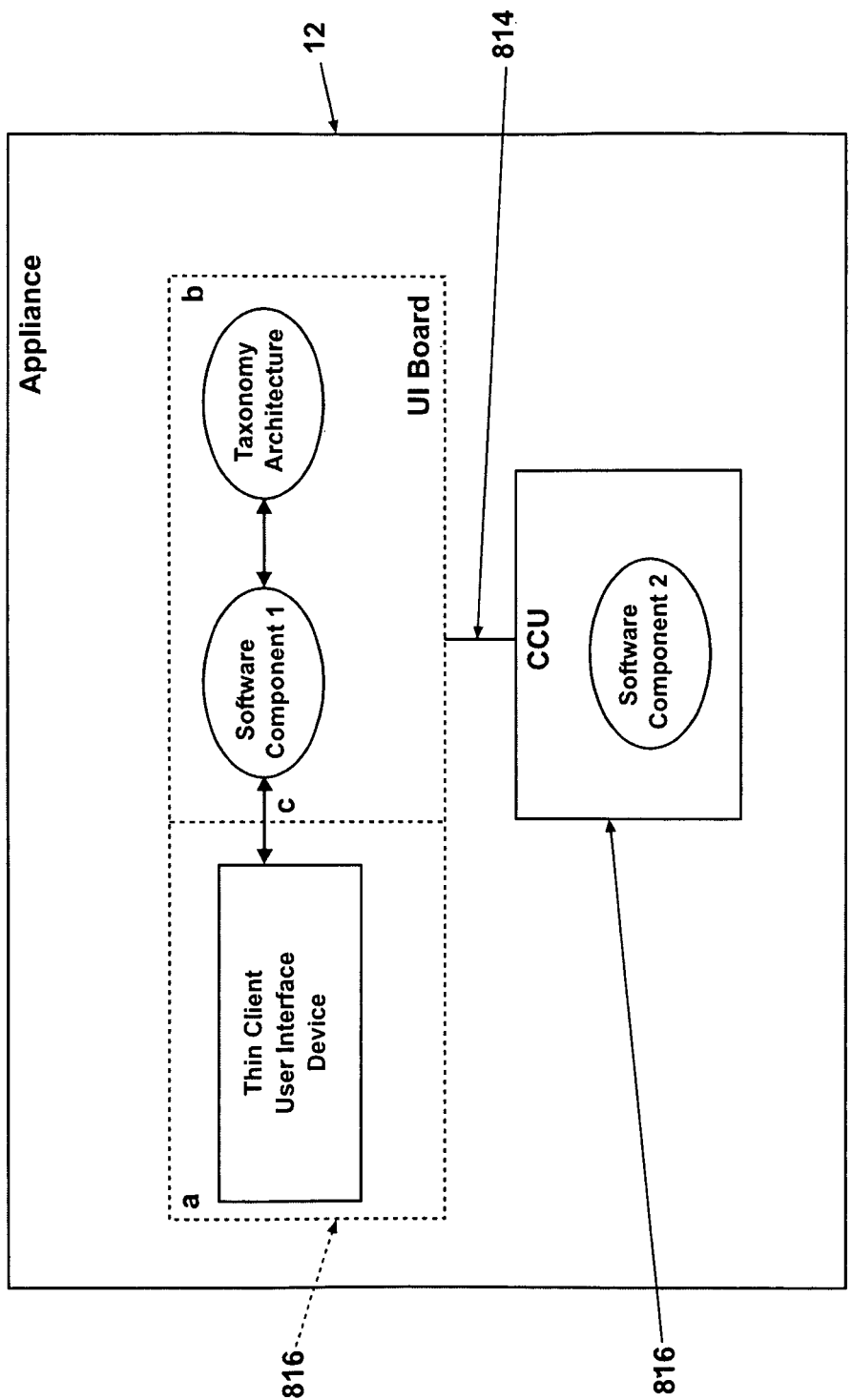
FIG. 25 schematically illustrates a second embodiment of a taxonomy architecture according to the invention.

It will be understood that the structure illustrated in FIG. 23 is more conceptual than physical. FIGS. 24 and 25 show embodiments of the taxonomy architecture of FIG. 23, partitioned according to the physical architecture of an appliance or an appliance network.

The software component 1 (816B in FIG. 23) is represented as being within a remote client 822, such as a remote controller with a user interface. Consequently, the sub-components of software component 1 816B (the selection builder, the command generator, and the status interpreter) are specialized for this user interface application. FIG. 24 shows software component 1 in such a user interface device, identified here as a "thick client." A thick client would have the ability to parse a data structure such as an XML document, interpret its meaning, and implement the 'Selection Builder' functionality. Software component 2 and the taxonomy architecture reside in the appliance 12.

FIG. 25 depicts a second embodiment of the taxonomy control architecture where all components are included within an appliance 12. In the structure of FIG. 25 the taxonomy architecture uses a taxonomy translator (not necessary in the embodiment of FIG. 24), thereby rendering the status interpreter of software component 1 to the reduced functionality of an input handler. The UI board in this case comprises an "a" side and a "b" side, each with is own processor. Both sides are connected to each other, preferably by a serial communication "c". The UI board is connected by another connection 814 to a CCU with software component 2, where the connection 814 can be the same type as connection "c", or it can be different. The "a" side is preferably an LCD controller that exposes a low level API, and lacks the full capabilities of a thick client. Hence, the "a" side can be referred to as a "thin client." The "b" side comprises the taxonomy architecture and software component 1.

Figure 26:
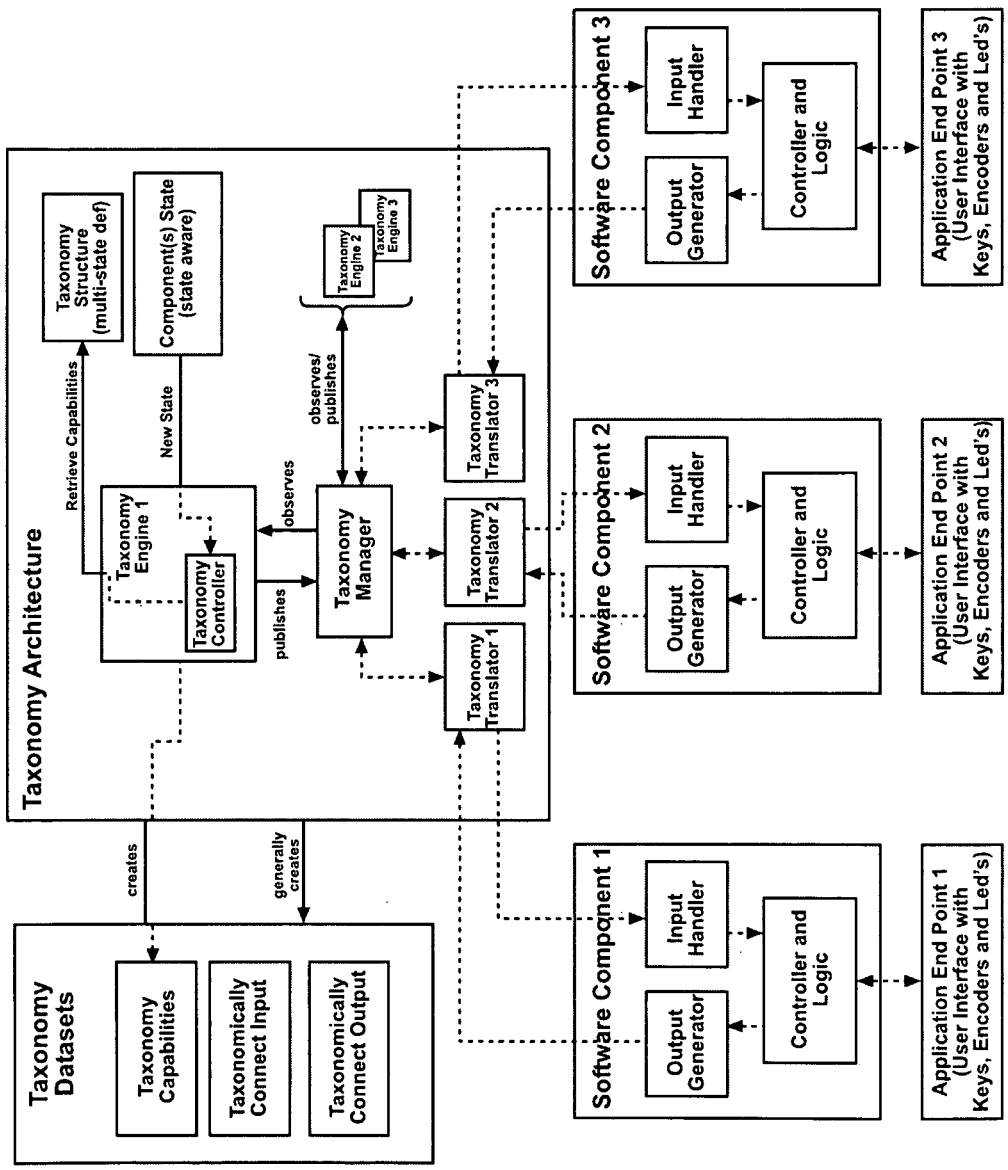
FIG. 26 is a modified version of the software architecture of FIG. 23 for another operating environment.
Figure 26A:
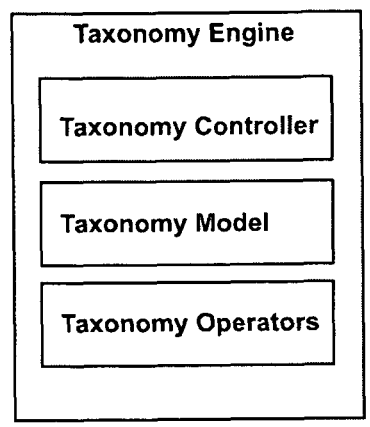
FIG. 26A is a detailed portion of the taxonomy engine of FIG. 26.

FIG. 26 is a more generalized block diagram of the architecture of FIG. 23 with elements rearranged for clarity and to show a less specialized configuration. In FIG. 26*a*, it can be seen that The taxonomy engine comprises a taxonomy controller, a model, and a collection of operators. The taxonomy controller is aware of the state of the componentry for which it is controlling, and is responsible to retrieve from the taxonomy structure the state appropriate taxonomy model and inform the taxonomy engine of the change. This action provides an event to the appropriate taxonomy operator to examine the new taxonomy model and generate a new taxonomy capabilities data set. The taxonomy engine then publishes the new capabilities to the taxonomy manager, who then distributes the new information to the appropriate translators or other software components that have registered for notification.

It will be apparent from FIG. 26 that the selection builder, the status interpreter, and the command generator found in the software component 1 of FIG. 23 is now in the taxonomy translator. Taxonomy translator 2 comprises the selection builder and is responsible for the conversion of taxonomy datasets to software component specific interfaces. Therefore, in this example the software components are not comprised with the functionality of interpretation or generation of taxonomy datasets. Rather, they are comprised with handling inputs from the translator and sending outputs to the translator.

It is contemplated that a taxonomy architecture, through the use of multiple translators, can simultaneously connect to software components similar to software component 1 of FIG. 23 and software component 2 of FIG. 26.

Figure 27:
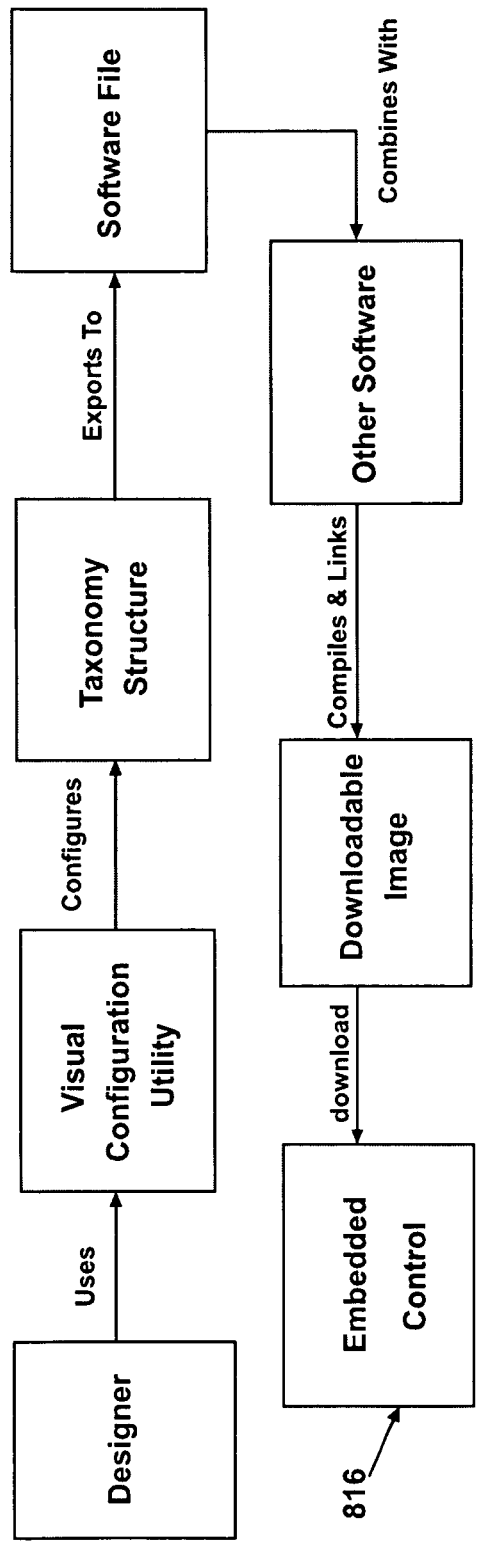
FIG. 27 schematically illustrates a method utilizing the taxonomy architecture according to the invention.

Looking now at FIG. 27, it is generally known that complex data structures have tremendous advantages because they can be easily varied and re-used with a single complied source code. But this complexity can be troublesome to understand, create, troubleshoot, debug, explain, and generally manage. Object oriented languages provide some level of hiding complexity relative to non-object oriented languages such as C. Similarly, XML data structures are human-readable, in contrast to byte arrays, and therefore can eliminate complexity. But it is currently cost prohibitive to implement technology such as XML or Java in most appliances for domestic use. The invention offers a visual configuration utility that simplifies handling complex data structures at much less cost than known systems.

Following the flow of FIG. 27, a designer in step 1 starts the visual configuration utility. A designer can be someone who does the role of product or feature planning, user experience, or user interface design, engineering, or anyone else with a need to retrieve value from or provide value to the information contained by an instance of a configuration held within the memory of the visual configuration utility. In step 2, the designer uses the configuration utility. In this step, the design will load a configuration file from a persistent store such as a hard drive or database or web site. Alternatively, it may be checked out from a document version control system such as visual source save.

In step 3, the designer creates a new configuration comprising a taxonomy structure or begins editing an existing configuration comprising a taxonomy structure. The editing process includes steps like adding new taxonomy elements, deleting taxonomy elements, moving taxonomy elements, or modifying the properties of a taxonomy element. Other substeps of step 3 may include binding taxonomy elements to message identifiers or functional identifiers of arbitrary software components of which taxonomy elements either relate to or represent. In step 4, the designer will save the taxonomy configuration appropriately and notify the appropriate office mates such that if one of the office mates is the appropriate controls development engineer, he may immediately acquire the saved taxonomy configuration file and begin step 5. In step 5, an appliance controls development engineer will generate a software and software data file appropriately configured such that a compiler can be invoked preferably from the Visual Configuration Utility to create a downloadable image appropriate for execution by a processor. Further, the controls development engineer will combine the generated software and software data file with a plurality of other arbitrary software components. Preferably, the Visual Configuration Utility can accomplish this task. In step 6, the appliance controls development engineer will invoke the compiler on the combined file and the compiler will generate a downloadable image. And in step 7, the appliance controls development engineer will download the downloadable image to the embedded appliance control processor and test the result. At any step in the process, the process actor may stop activities and move another step taking appropriate action to mitigate the incomplete step and/or the potential re-ordering of steps.

FIGS. 28 and 29 depict an application built using a proprietary application framework. The taxonomy visual configurator of FIG. 28 would be used as a rule set to develop taxonomy structures. Once the taxonomy structure is configured visually, it can be transformed and exported into a functionally equivalent complex embedded data structure. (See step 3 of FIG. 27) Note how the taxonomy structure comprises multiple taxonomy structures, each associated with a unique appliance state. Examples of unique appliance states are found in FIG. 7.

Looking more closely at the example of FIG. 28, it can be seen that there is no wash phase definition. This is because wash phase is not a valid feedback until the appliance is in running state. In FIG. 29, there is no cycle definition. This is because during running, the cycle definition cannot be changed.

The data structure of FIGS. 28 and 29 is very powerful and is the heart of the taxonomy architecture. It consists of a nested tree of elements where each element of the tree has a type where that type dictates to the taxonomy operators of FIG. 26 how to properly traverse and extract information from the Tree. Attributes should have corresponding Active Values which are one of the child Values of the plurality of child Values. Attributes contain a plurality of child Values which represent the valid selections of the Attribute. A Value which contains a plurality of Attributes is a Value which must be further specified by having each contained Attribute be defined by its contained active or selected Value. When a child Value is selected or active, the taxonomy operator looks to see if the child Value contains children of the Attribute Type. If so, the taxonomy operator continues the tree traversal repeating the function of the taxonomy operator on the next level of the tree. Ranges are children of Attributes and are equivalent to a plurality of Values which can be mathematically derived from the values of Min, Max, and Inc.

The information contained in the data structures of FIGS. 28 and 29 is therefore more useful than one would at first realize. For example, taxonomy operators can be written to do a variety of useful functions across a number of the elements of the taxonomy architecture, especially when there is a graphical user interface or an external client. A first taxonomy operator could use the data structure to determine what content should appear on a user interface. As a user makes selections on the user interface, the first taxonomy operator could re-examine the current active selections of the user and repopulate the user interface with the new valid user selections and the valid options of each. A second taxonomy operator could be informed of changes to the appliance state. Upon change to the state of an appliance, the second taxonomy operator could retrieve a new taxonomy capabilities dataset so that the user interface could be repopulated based on the new valid selections and or new valid operators for each. A third taxonomy operator can be configured to receive taxonomically correct inputs and check to see that the input corresponds to a valid well-formed command. The third taxonomy operator would accomplish this by walking the taxonomy structure in the taxonomy architecture of FIG. 26. The third taxonomy operator would evaluate all of the potential roots of the taxonomy structure and find a corresponding root identifier in the taxonomically correct input structure. From the root, the third taxonomy operator would begin to recourse down the tree, determining which branches of the tree to continue down by finding a corresponding identifier in the taxonomically correct input structure. When the third taxonomy operator reaches the end of the tree or alternatively exhausts the elements in the taxonomically correct input structure having used all of them at least once, a valid taxonomically correct input structure is determined if both there are no other un-accounted for elements in the taxonomically correct input structure, and there are no child elements remaining un-walked in the taxonomy data structure. This third operation is the equivalent of portable state-based business logic enabling the thin client 22 of FIG. 24 to be completely devoid of any logic associated with the operation of the appliance. The benefit of this is that user interfaces and all external clients with proper communication and taxonomy dataset interpretation operators can be developed with only knowledge of how to interoperate with taxonomy datasets, and therefore can be devoid of all knowledge of the connected device with which it is in operable communication.

With further consideration of a consumable holder introduced to an appliance having a service interface, the consumable holder could comprise, in addition to data about a cycle structure and data about itself and data about a consumable, a new taxonomy structure representing an incremental change to the appliance taxonomy structure or reflecting a new net per state operational capabilities of the appliance and/or the consumable holder. Additionally, the incremental change and the new net per state operational capabilities could affect the user interface of the appliance in response to a new taxonomy capabilities dataset at the user interface. The new taxonomy capabilities dataset is a subset of the new taxonomy structure. Example changes appearing in the user interface include new default attribute values, new cycles, new options, changes to cycles, changes to options, the selectable and non selectable valid values thereof, etc.

A plurality of well formed commands can be derived from a taxonomy dataset derived from the operational capabilities of an appliance. In this case, the taxonomy structure of FIGS. 27-29 could be created by an authoring tool such as a visual configuration utility shown in FIGS. 27-29 and provided as a data source to the consumable provider so that the consumable provider could extract a plurality of well formed commands for associating with the consumable and/or article such that a consumable information holder could provide the plurality of well formed commands to the cycle architecture 69 contemporaneous with its introduction into the use environment so that the cycle of operation of the appliance 12 and the user interaction with the appliance 12 through the user interface such as one shown in FIG. 7 item 110 can be effected by the commands.

User Interface

Figure 7:
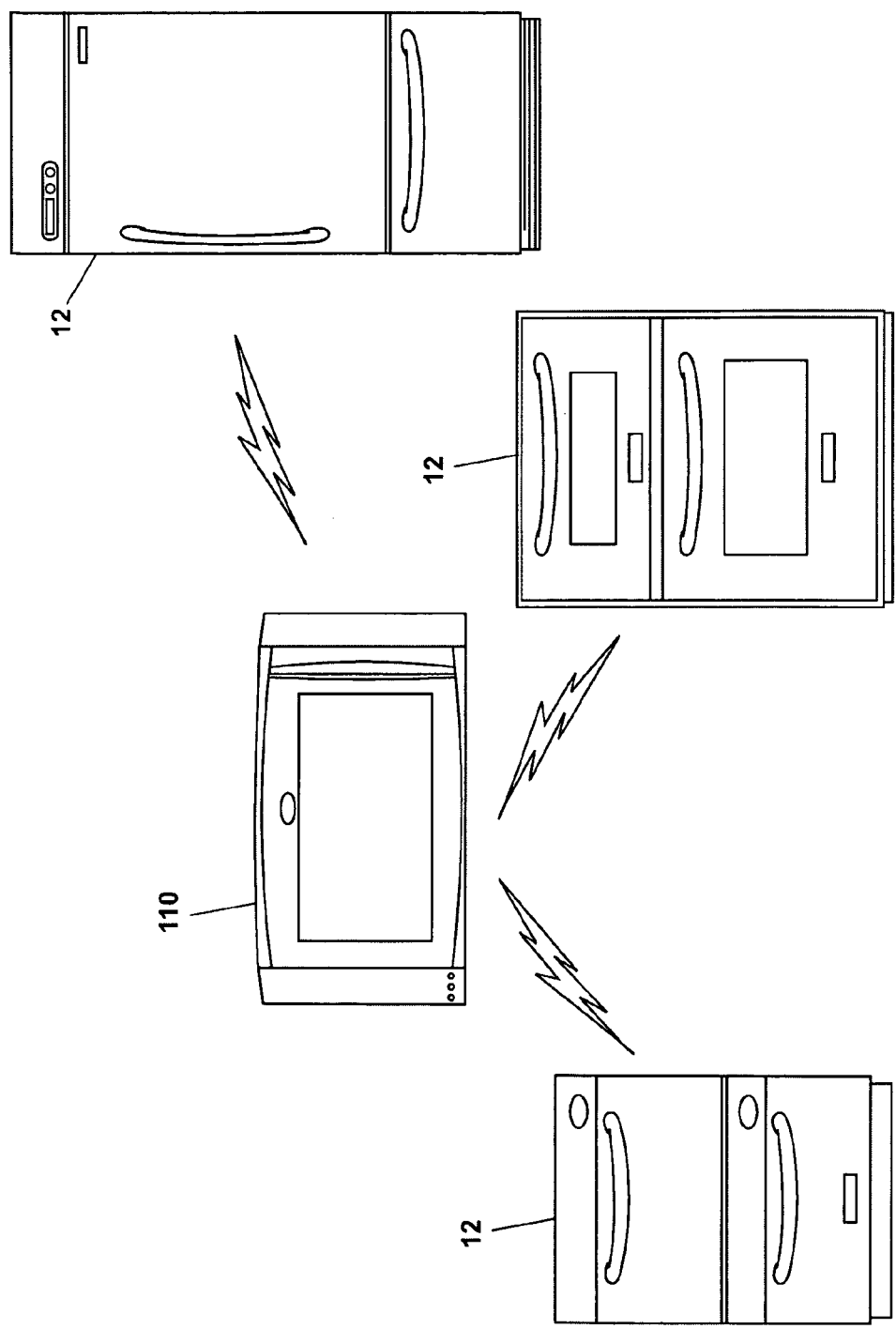
FIG. 7 is a schematic view of a remote user interface according to one embodiment of the invention for use with a communicating appliance.

FIG. 7 shows a user interface 110 that can be used with the consumable holder 16 according to the invention. The user interface 110 is a user interface that can communicate with one or more appliances 12. Preferably, the user interface is a graphical user interface or GUI. The user interface 110 can be integral to an appliance 12, or the user interface 110 can be positioned remotely from the appliances 12, such as is illustrated in FIG. 7. For example, the user interface 110 can be positioned in a central location in the home or can be portable within the home. The user interface can provide many, if not all, of the functions associated with a traditional user interface of the appliance 12 and can include additional functionalities. The user interface 110 can have any suitable form, such as a monitor, including a touch panel monitor. Other examples of the user interface 110 can include, but are not limited to, a remote keypad, a phone, a personal computer, a voice recognition device, a voice generation device, a sound generation and recognition device, a remote control, a user interface of a home automation system, a user interface of a component different from the components of the appliance, a television, a device that plays recorded music, a device that plays recorded video, and a personal digital assistant. According to one embodiment, the user interface 110 can be employed in addition to the traditional user interfaces on the appliances associated with the remote user interface. Alternatively, the appliances associated with the user interface 110 do not include a separate user interface that physically resides on the appliances. Furthermore, the user interface 110 can be used in conjunction with the above-described combination appliance/home automation system.

The user interface can be a source of information associated with a consumable 24, including information about or consumable holder 16 or about an article with consumable holder capabilities. As discussed previously, the appliance 12 can include sensing, meta-data, discovery protocols, databases and the like and any combination thereof and other forms of identification of information associated with a consumable 24, a consumable holder 16, or an article with consumable holder capabilities. The appliance 12 can also enable the user to manually input information associated with a consumable 24, including data about a consumable 24 or a consumable holder 16. In this case, the GUI prompts or the user navigates to a screen to input information about a consumable 24 or consumable holder 16 or an article with consumable holder capabilities. This could be in the form of questions that the user answers. For example, the GUI might show the user pictures of consumables, consumable holders, cartridges, bulk dispensers and the like and have them select the appropriate picture. This selection would then be translated into information about a consumable or consumable holder. In a second example, the GUI would provide a form to fill out with standard drop down boxes, radio buttons, text input fields, and the like so that the user could fully construct and input the information about a consumable or consumable holder into the GUI.

Information associated with consumables can be displayed on a user interface that is operably connected to the network. Further, a user interface 110 can send a first network message, resulting in a network message on the network being received by a consumable holder 16. The network message can be the first network message or a second network message in response to the first network message wherein the network message can effect the configuration, enablement, functionality, or operation of the consumable holder 16 or the appliance 12. In one example of information received by a user interface effecting the functionality of a consumable holder 16, shown in FIG. 15, the user enters, in message 8, the chemistry option selection and in message 6 the user enters the cycle options. In message 17 and 18, the consumable holder determines the dispensing amount using the chemistry option selection. In a second example, an arbitrary software component residing in the consumable holder might require user credentials to authenticate the user whereby the authentication may be a pre-requisite to the enablement of the consumable holder 16. In a third example where a consumable holder 16 is also functioning as a smart coupler as shown in FIG. 8, 1042 a user interface could receive network configuration information such as a node id from a user enabling the smart coupler 1042 to participate on network 1070.

A user interface 110 can also play a role in the linking of user preference data to the data associated with the combination of operational cycles and appliances so that the user can create or modify operational cycle data, optionally associate the data with at least one appliance, and link the data to user preference data. An example of user preference data would be a name like "Maria's Cookie Recipe.", "Sarah's Brownies", or "Williams Beef Stew". The preference data can be stored and an identifier linking the preference data to at least one operational cycle and to at least one combination of operational cycle and an associated appliance. Subsequent to the storage, the user interface 110 can display the user preference data for selection by a user or remember the preference data for subsequent use and infer the selection of preference data via user recognition.

Additionally, a user interface acting as an external client 1004, 1002 (see FIG. 8) can connect to a consumable reader and send information about a consumable to any appliance on an appliance network as shown in FIG. 8 for the purposes previously explained. In this way, the cost of the consumable reader is spread over the appliances on the network. Alternatively, any appliance with a consumable reader and an optional LCD screen could send information about consumables or information about cycle structures to other appliances on an appliance network. Discovery and Propagated messages can be used to associate appliances on a network with the appliance having a consumable reader. Likewise, an appliance having an LCD screen could receive information allowing the association. In this way, a first appliance could send to a second appliance information associated with a consumable to effect a cycle of operation of the second appliance.

Further, a user interface in communication with a source of information about a consumable, e.g. a consumable holder, performance tag, or data pod, could display messages from the consumable. Messages could comprise warnings such as static warnings included with the source of information about a consumable and dynamic warnings based on other information, such as information about an appliance, information reported by an appliance cycle of operation, a user, a user selection, and the use environment, or information associated with a consumable. For example, a warning could be that too much detergent was introduced into the wash for the cycle selections of small loads and delicate fabric. This kind of warning could be generated by the consumable holder or the other controllers 68 and displayed on the user interface and sent as a network message to any node in communication with the consumable holder or appliance.

The user interface can be configured to render multi-media information in its communication of information to the user. Such multi-media information includes representations other than text. Examples of multi media information include sound clips, ring tones, songs, images, pictures, graphics, video clips, animations, office documents, PowerPoint slides, stylized text, boldness, size, and color, lines, shapes, symbols, and clip art.

User Instructions about a Cycle Structure in a Consumable Information Holder

Consumers want superior performance from their appliances. Superior performance is often judged according to the condition of article on which the appliance cycle of operation operates during or after the cycle of operation. Appliance performance, as perceived by the user, can be drastically affected by steps the user may take to adequately prepare the article for the cycle of operation, steps the user may take to handle the article during the cycle of operation, and steps the user may take once the cycle of operation is complete. These steps can include activities associated with any combination of the article, one or more consumables, one or more appliances, one or more appliance accessories, one or more consumable holders, and the configuration of one or more arbitrary software components. Examples of preparation steps include pre-wash for dishes, pre-treatment for clothes stains, defrosting frozen foods, applying ingredients like spices, oils, or condiments to food, shaking a liquid additive like a turkey baste solution, boiling a pot of water, removing a food item from a package and placing it in a micro-wave sleeve, mixing an egg with the contents of a box, checking inventory of needed ingredients, ordering ingredients, shopping for ingredients pushing certain buttons, making a selection on a user interface, rearranging articles in the appliance, checking the appliance, and the like. Examples of handling steps during a cycle of operation include removing the article from the appliance for stirring, turning, flipping, applying ingredients like spices, oils, or condiments, and the like, adding a consumable or ingredient to the appliance, pushing certain buttons, making a selection on a user interface, rearranging articles in the appliance, closing and opening doors or lids, and the like. Examples of steps to be taken after the cycle of operation is complete include cooling, applying ingredients like spices, oils, frostings or condiments, mixing with other foodstuffs, hanging up, hanging out, ironing, folding, initiating new preparation steps for another cycle of operation of an appliance for the article, consuming the article, arranging the article, drying the article, appropriately storing the article or preserving the article (as in refrigerating or freezing within an appropriate container for an appropriate amount of time), examining the article, replacing the article, replenishing the article or purchasing a new article, replenishing, ordering, or purchasing the consumables used in association with the article, subscribing to subscriptions associated with the article or the consumables used in association with the article, pushing certain buttons, making a selection on a user interface, rearranging articles in the appliance, cleaning surfaces, and the like.

If accurate information could be readily available which would properly instruct the user as to the proper steps of preparation, handling, and post handling (steps after the cycle of operation is complete) to take in accordance with the article or the use of at least one consumable with an article and could be practically conveyed to the user, perceived performance could be drastically improved.

Presently, accurate information, if it exists, must be read by the user from printed instructions on such things as boxes, tags, books, and the internet.

A consumable information holder associated with any of a consumable, a consumable holder, an article, or an article holder could comprise data associated with proper steps of preparation, regulation, and post regulation (steps after the cycle of operation is complete) to take in accordance with the article or the use of at least one consumable with an article. The data could be practically rendered on a user interface in communication with the consumable information holder. An article could have more than one consumable information holder, and multiple articles, each having one or more consumable information holders, can be operated on by an appliance at the same time. A device such as consumable reader can perceive the information from the consumable information holders and render the information to a user interface. The user interface can be interactive so that the user can be guided by the user interface to perform an ordered collection of steps comprising one or more preparation steps, handling steps and post handling steps. On an interactive user interface, the user can enter data affecting the ordered collection, including acknowledgement of the completion of steps, changing steps, actions and transition conditions in a cycle of operation, seeking help, asking inquiries, and the like.

Credentials

The software architecture 1018 can be configured such that the consumable 24 or consumable holder 16 must present electronic credentials (i.e., authentication) before communicating with the appliance 12. Requiring electronic credentials prevents unauthorized communication between the consumable 24 or consumable holder 16 and the appliance 12, thereby avoiding undesirable control of the appliance 12 by the consumable 24 or consumable holder 16. The security techniques disclosed by incorporated WO2006135726, including a firewall, work well for the software architecture 1018. Other possible authentication mechanisms can be used to gain access through the firewall. These can include but are not limited to a hardware signal, a sequence of messages, a handshaking algorithm, or a standard encryption algorithm. Any standard authentication method can be used to gain access to communication capabilities, as long as it is possible to verify that a particular consumable 24 or consumable holder 16 is authorized to gain access.

In addition, the disclosed three basic levels of access to the firewall (access, deny, and temporary access) can be expanded as necessary to enable different levels of access to different consumables 24 and consumable holders 16. These access levels can each have a unique authentication, such as a unique password, and can be associated with different user roles. Different user roles can include but are not limited to a service technician, factory tester, developer, or consumer. Different levels of access allow different sets of commands to be executed or prompted by the consumable 24 or consumable holder 16. These levels can be temporary and time bound, or permanent once authentication is successfully completed.

The implementation of the firewall can vary as needed. The disclosed implementation uses a table of protected commands to validate against different clients, including consumables 24 and consumable holder 16. Any number of data structures can be used to validate a user with the allowed commands for an access level of the firewall. In the end, a firewall must only allow access to commands to the appropriate clients that have successfully been authenticated.

Smart Couplers

FIG. 8 illustrates an appliance 1000 similar to appliance 12 connected to external clients 1002, 1004 and a second appliance 1006, which is also similar to appliance 12, by a plurality of networks. A first network 1030 comprises a first internal client 1010, a second internal client 1012 and the external client 1002. A second network 1050 comprises the external client 1004. And a third network 1052 comprises the second appliance 1006. Each client is characterized as a node on the respective network. Local clients are clients that communicate with nodes on the same network. Remote clients are clients not directly coupled to the same network as the node to which they are communicating. In this embodiment, external client 1004 would be a remote client of the nodes on the first network 1030, such as client 40 in a consumable holder 16.

Each client node 1002, 1004, 1010, 1012 comprises a software architecture driver (SA driver) 1016 for exchanging messages with any node having a software architecture (SA) 1018, which is similar to software architecture 1018, thereon. The nodes on any given network are in operable communication with the other nodes in that network and are optionally in communication with the nodes present on other networks.

The appliance 1000 further comprises at least one node 1020 having the SA thereon. The second appliance 1006 will also likely have a node with the SA on it, and may have one or more clients as well. The first network 1030 also comprises the node 1020.

Couplers 1040, 1042 are special devices that connect to the appliance and/or to a network and/or to two or more networks and communicate therebetween. Each coupler can comprise all the functionality of a node, and each node can comprise all of the functionality of a coupler. In this embodiment, the coupler 1040 couples the second network 1050 to the third network 1052, and can function as a node on each network. The coupler 1042 couples the second network 1050 to the first network 1030. It could also be considered as coupled to the appliance 1000.

Either of the couplers 1040, 1042 can propagate discovery messages issued by the SA or an SA driver across the networks in order to enable the SA and SA drivers or their coupled arbitrary software components to develop references to identifiers of functionality for the different nodes. Each coupler 1040, 1042 can have a routing table stored in a memory for enabling communication between nodes on different networks. The memory can also store identifiers identifying the functionality of each node. The identifiers can be linked to the routing information held within the routing tables so that when a message comprising an identifier is sent to either of the couplers 1040, 1042, the coupler receiving the message can send the message to the appropriate next node.

Each node can comprise a unique combination of software elements. The software elements on any given node include at least one of the SA and an SA driver. The SA driver enables a node to communicate with the SA. The SA inherently includes an SA driver or a variant of the SA Driver. Each node comprising the SA can communicate with other nodes comprising the SA. However, a node can have both the SA and separate SA driver thereon. Each node must also include a suitable communication protocol or communication protocol driver for the respective network type to which it is coupled. An exemplary protocol is the WIDE network protocol 1062 discussed previously herein, a proprietary appliance network protocol utilized by Whirlpool Corporation. For a client not having WIDE network protocol that needs to communicate WIDE messages (e.g., external client 1004), a WIDE driver 1064 can be used. A port driver 1072 couples the external client 1004 to the network 1050.

Each node can also comprise an arbitrary software component 1060. The couplers 1040, 1042, for example, may not. The SA driver 1016 is a software element configured to allow an arbitrary software component to communicate with the SA 1018 over at least one network. An arbitrary software component is any software component or subcomponent that performs a useful function. Examples include, but are not limited to, a communication driver, an application, a user interface, a control algorithm, message routing, a control for an operational cycle, message handling, data storage, data transformation, data referencing, and software that instructs other software. The SA driver 1016 can receive and at least partially interpret messages from the SA and/or from another SA driver, which are specified as feedback events. In some instances, the SA driver 1016 can also send command messages to the SA 1018. In this respect, the external clients 1002, 1004 can have full capability act as an accessory to communicate with and to enhance or alter the operation of the appliance.

It will be understood that any or all of the external clients 1002, 1004, the couplers 1040, 1042, and the internal clients 1010, 1012 can be physical devices that have a processor, a memory, software, circuitry, and some source of power. In the general sense, they are coupled to transmission media and are preferably configured to take information from the memory and with the processor and the circuitry, produce a signal representing that information in the transmission media. When the information includes an identifier in memory, the node or client is discoverable by other nodes connected via the transmission media.

The consumable holder 16 can contain all the functionality and components of a smart coupler 1040, 1042 and participate in all the embodiments of a smart coupler in communication with an appliance 1000, 12. Therefore in one embodiment, a consumable holder 16 is a smart coupler which further physically contains a consumable 24 and that can also be enabled to directly actuate the introduction of a consumable 24 into an appliance. Similarly, the consumable holder 16 can be a client (internal as at 1010, external as at 1002, or remote on a different network as at 1004) and communicate with an appliance 1000, 12, 1006, either directly or via a smart coupler 1042, 1040.

Likewise, the consumable reader 22 can contain all the functionality and components of a smart coupler 1040, 1042 and participate in all the embodiments of a smart coupler in communication with an appliance 1000, 12, 1006. Therefore in one embodiment, a consumable reader 22 is a smart coupler which further retrieves information about a consumable 24 and communicates that information to an appliance. Similarly, the consumable reader 22 can be a client (internal as at 1010, external as at 1002, or remote on a different network as at 1004) and communicate with an appliance 1000, 12, 1006, either directly or via a smart coupler 1042, 1040.

Discovery

Discovery is a process by which a first node in communication with at least one coupled network sends discovery messages to the network or networks. Discovery messages generally comprise at least some query information specifying what the sender of the discovery message seeks. The information sought can be information such as another node, an appliance, a client, an arbitrary software component, a device comprising a node, a coupler, or one or more of a plurality of software elements on any node.

A discovery confirmation message is a reply message sent to the sender of a discovery message. Discovery reply messages typically comprise confirmation information and identification information. The confirmation information is an acknowledgment in the form of a positive or a negative response. The identification information is information enabling the sender to send subsequent messages to that which has been discovered.

Where more than one network is connected by a coupler, such as couplers 1040, 1042, a message received by the coupler from one network can be propagated and sent to the second network. The coupler may create a second separate message with the same information compatible for a second network, but together, the first and the second messages are considered a single propagated message, even though they may be literally two messages. A propagated discovery message, then, is a discovery message that is propagated to a receiver. A coupler may be configured to inspect propagated messages to prevent propagation of a circular message, i.e., a sent message that is also unknowingly received by the sender on a second network to which the sender is coupled. At least the coupler 1040 may have a routing table including proxy identifiers of the functionalities of the second node. As well, the coupler 1042 may have a routing table including proxy identifiers. A discovery message sent by the node 1020 is received by the coupler 1042, which evaluates the message in accord with the routing table and propagates the message to the next node, coupler 1040. Similarly, the coupler 1040, evaluates the propagated message in light of the routing table, and propagates the message to the next node in line, which may be the second node.

Figure 9:
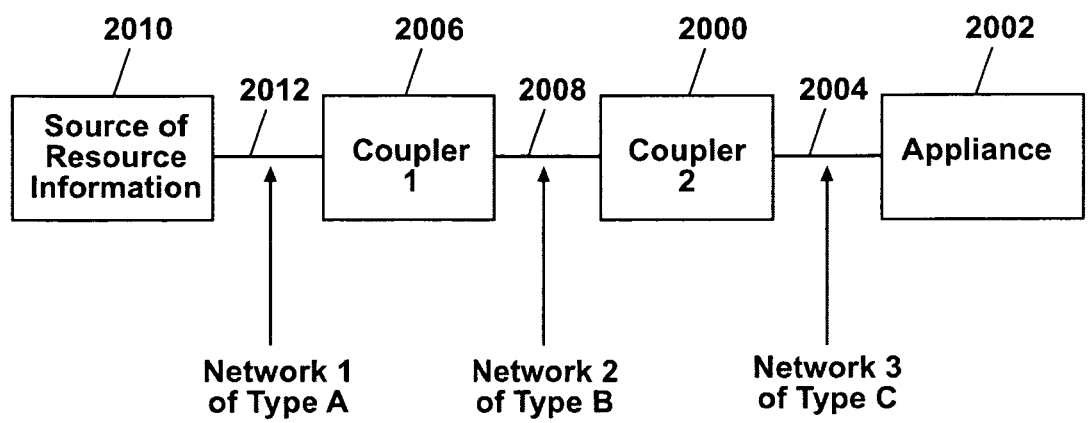
FIG. 9 is a schematic view of a source of information about resources connected to an appliance through two couplers.

See, for example, FIG. 9 illustrating a system where resources in an appliance can be monitored, managed, or changed. A likely scenario has a coupler 2000 connected to an appliance 2002 similar to appliance 12 by a network 2004. The coupler 2000 also connects to a coupler 2006 via network 2008 that may be a different type of network from network 2004. Coupler 2006 connects to a source 2010 of information about resources used or generated by the appliance 2002 by a third network 2012 that may be a different type of network from either network 2004 or network 2008. Assume that the source 2010 wants to send information about the resource to the appliance 2002. The invention enables a node in the source 2010 on network 2012 to communicate with a second node, having SA for example, which may be among several on the appliance 2002. We assume that the source 2010 has at least an appropriate communication driver, or one of the couplers has software to translate any message from the source to the communication protocols of the incorporated WO2006135726, for example.

In this scenario, the source 2010 sends a discovery message over the network 2012 seeking any consumer of resources to which the source wants to send information. The coupler 2006 receives the discovery message, translates the message, if necessary, and propagates the discovery message to the next nodes over the network 2008, including coupler 2000. Coupler 2000 receives the discovery message, translates the message, if necessary, and propagates the discovery message to the next nodes over the network, including the appliance 2002. The relevant nodes in the appliance 2002 evaluate the message and determine a discovery reply message, and send respective replies. Here, we assume at least one reply is positive.

The discovery reply message is received by the coupler 2000, which populates its routing table and sends it to the coupler 2006, which populates its routing table and sends it to the source 2010 in accord with the foregoing process. Each node retains the relevant identifiers so that subsequent message can be communicated without repeating the discovery sequence. As well, those nodes with memory, such as the couplers, can be configured to save messages.

With this structure, a source of information about a resource such as electricity, hot water, gray water, gas, water, replaceable parts, or other consumables, can request a change in the operation of the appliance based on the information. For example, if an electric utility is facing a brownout, a source of information about the electricity can request that an electric dryer not commence an operation for a period of time. Similarly, a source of consumables, such as filters or spare parts, can ascertain from an appliance the status of the consumable and send information about the timing and availability of replacement.

Likewise, the consumable holder 16 can effect the cycle of operation of the appliance connected thereto in response to information from a source of consumables or to information from a source of information about a resource. The consumable holder 16 can also initiate, respond to, and/or propagate discovery messages. Further, the consumable holder 16 can create and or comprise network routing information.

FIG. 10 illustrates the transfer of an operation cycle accessory between two appliances, Appliance 1 and Appliance 2. A removably coupled operational cycle accessory 3 has, as part of its data portion, data which is associated with an identifier of a particular appliance. In this way, when the cycle engine 73 in either Appliance 1 or 2 seeks data, it can include in its request an identifier that will determine the correspondence of the data retrieved from the data portion table for the identifier. With this capability, the operational cycle accessory 3 can be removably coupled with more than one appliance and is operable with as many appliances at the data portion table has identification support for.

Likewise, when an arbitrary software component configures the cycle engine 73 through communications, the arbitrary software component can first interrogate, through useful communications, the appliance to ascertain its identification whereby that identification is used with the data portion table to retrieve the appropriate data about the cycle structure to be built. The arbitrary software component can then send messages to the API of the cycle engine 73 to build the appropriate cycle structure 71 for the appliance.

Consumable Reader as a Smart Coupler

Figure 11:
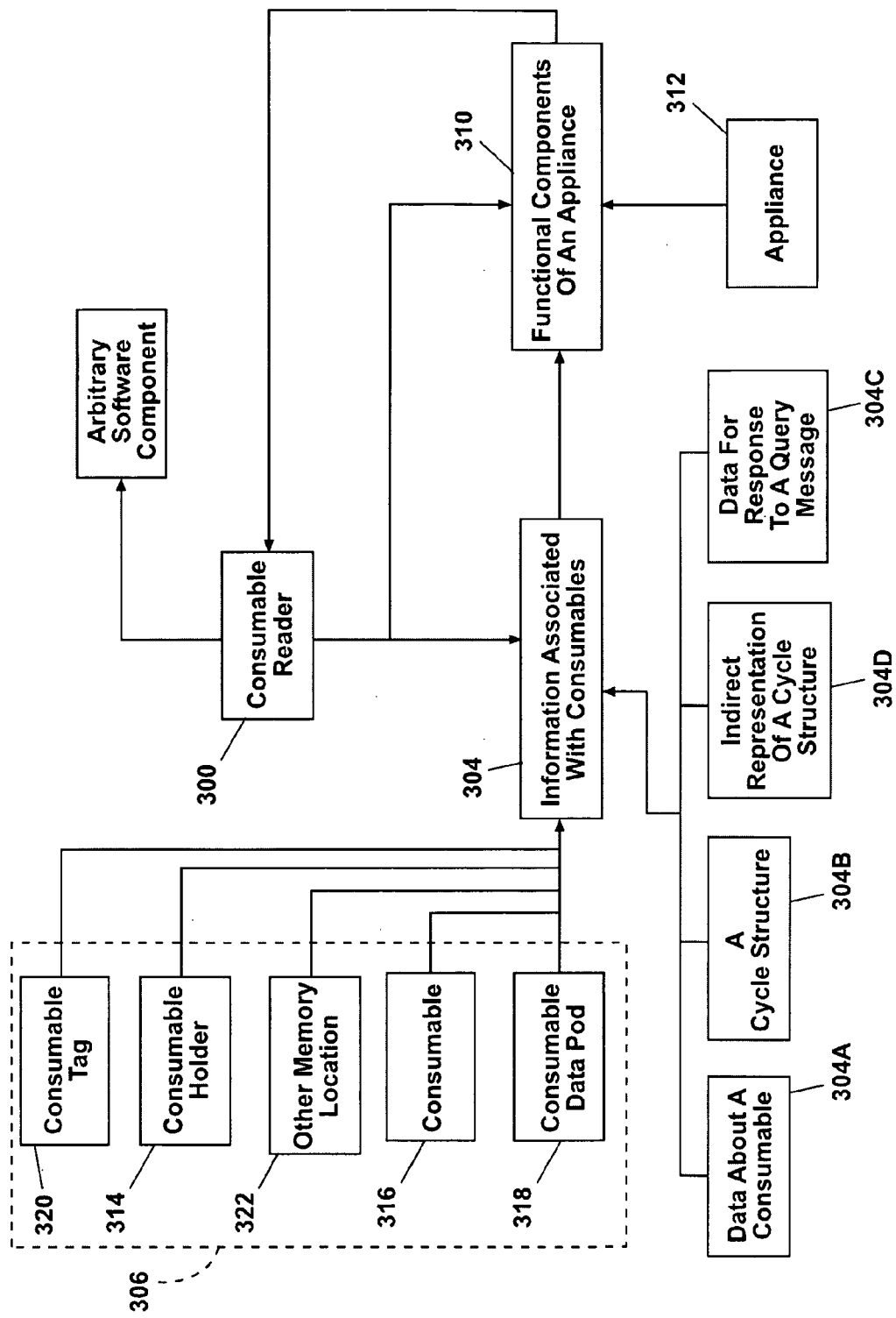
FIG. 11 is a schematic diagram showing the operation of consumable reader with an appliance that is affected by information associated with a consumable.

Looking now at FIG. 11, a consumable reader 300 is configured to obtain information associated with consumables 304. One or more consumables 304 may be contained in one or more consumable holders 314 similar to the aforementioned consumable holder 16. The consumable reader 300 can be a form of a smart coupler as in FIGS. 8 and 9. In such case, one purpose of the consumable reader 300 comprises obtaining information associated with consumables 304 and communicating all or a portion of that information to at least one functional component 310 of an appliance 312 resulting in an effect to a cycle of operation in the appliance 312 or in the consumable holder 314. As discussed previously, the consumable 24 can be an article. In one embodiment, the appliance 312 comprises at least one instance of a cycle architecture 69 and an optional cycle operations accessory or functional component 310. Typically, an appliance 312 similar to appliance 12 comprises the functional component 310. The information associated with consumables 304 obtained by the consumable reader 300 can thus include not only data about a consumable 304A, but also a cycle structure 304B, data for a response to a query message from a functional component 304C, and indirect representations of a cycle structure 304D. Any or all of the data can optionally be in the form of at least one well formed message according to a packet structure or a portion thereof. One example of a packet structure is the SA packet structure disclosed in the incorporated WO2006135726. As mentioned earlier, data about a cycle structure 304D can include direct commands to the functional component 310 or parameters about operating cycles, including user preferences or environmental parameters.

More examples of information associated with consumables 304 include the quantity of consumable pieces, quantity by volume or by weight, date of manufacture, manufacturer, data about its transit from manufacture, distributor, market, and consumer, data about the temperature during transit, nutritional information like calories, fat grams, percent daily allowance of essential vitamins and minerals, a list of medical conditions under which a consumable should not be consumed, data about the relationship between the consumable and known diets, known medical conditions, and known reactions to known medications, and the like. The information associated with consumables 304 can further include appliance or component identifier data in accord with the messaging protocol of the software architecture. Yet further, information associated with consumables 304 can include condition of the consumable, initial conditions for the consumable, data relating to a fill process for the consumable holder, an attribute of the consumable, an attribute of a sensor, an attribute of the consumable holder, a notification trigger rule associated with the consumable, historical information about the consumable, usage instruction relating to the consumable, dietary and allergenic information relating to the consumable, purchasing information, advertising information, recipe information, supply chain information, ingredient information, usage information relating to the consumable, country of origin for at least one of a plurality of ingredients in a consumable, energy consumption attributed to the making and delivering, information relating to carbon emissions in the making and delivering, information relating to the un-natural agents used in the making and delivering, information relating to the environmentally friendly agents used in the making and delivering, information about the treatment of animals in the making and delivering, information relating to the working conditions used in the making and delivering, and information relating to the toxic agents used in the making and delivering. Information about un-natural agents associated with a consumable can include such things as data about pesticides, steroids, and fertilizers associated with the manufacture, delivery or composition of the consumable.

As mentioned earlier, information associated with consumables 304 will be in a consumable information holder 306 that will typically be a memory location somewhere. That memory location can be in the consumable holder 314, or on a surface on a consumable holder 314, which can be one of a bag, a box, a carton, a bottle, a can, a bowl, a dish, a plate, or any other rigid or semi-rigid body suitable to contain a substance. Information can be stored on a removably coupled article comprising memory attached to the surface of the consumable holder 314, such as a performance tag 320. Information can also reside on a consumable 316 itself if the consumable were enabled to store retrievable information as by etching, embossing, or imprinting. An example of a consumable 316 enabled to store retrievable information would be food with information directly printed on or etched into the food using edible ink. Another option is a consumable data pod 318, which is an article comprising memory enabled to store retrievable information about a consumable. An example of a consumable data pod is an article containing data about a consumable potentially further comprising consumable meta data. Consumable meta data can be such data as quantity of consumable pieces, quantity by volume or by weight, date of manufacture, manufacturer, data about its transit from manufacture, distributor, market, and consumer, data about the temperature during transit, nutritional information like calories, fat grams, % daily allowance of essential vitamins and minerals, a list of medical conditions under which a consumable should not be consumed, data about the relationship between the consumable meta data and known diets, known medical conditions, and known reactions to known medications, and the like. The consumable data pod 318 is preferably consumed by the appliance cycle of operation that also operates on the consumable without degradation to the consumable or to the overall objective of the process operating on the consumable. Information can also reside on a performance tag 320 attached or affixed to an article, as in the case of an RFID tag applied to a laundry article.

As well, information can be stored in any other memory location 322, such as memory within a node in the appliance 312 or within the consumable reader 300 itself. The information associated with consumables 304 can be stored in removably coupled memory within the consumable reader 300. It should be understood that, in all cases, information associated with consumables 304 can further include appliance identifier data enabling the functional component to receive the most appropriate data about a consumable according to the connected appliance 312.

In one embodiment, the functional component 310 detects the coupling of the consumable reader 300, queries the consumable reader for information associated with consumables 304, and a cycle structure 71' (see FIG. 5) is created according to the data about the consumable.

In another embodiment, the consumable reader 300 is given or infers a 'start command' in which it selectively retrieves data about an operating cycle, changes the mode of a software operating layer of the appliance, and commands an alternate software layer of the appliance according to the data about an operating cycle. The consumable reader 300 can then retrieve data about an operating cycle, establish communication with the functional component 310, and create a cycle structure. In one variation, the cycle structure is created in the memory of the consumable reader 300 and the consumable reader uses the technique of the first embodiment to perform the cycle of operation.

The consumable reader 300 can further comprise an arbitrary software component 324 of the functional component which creates the cycle structure by communication with the API of the cycle engine, preferably using an embedded virtual router and discovery messages to establish a reference to the cycle engine's API. See FIG. 5.

In certain embodiments, at least one cycle structure is present in the memory of the consumable reader 300, and at least one cycle structure is present in the memory of at least one appliance functional component 310. The cycle structures can be functionally aggregated such that the cycle architecture is disposed to selectively operate in response to either cycle data structure. In this case, a user interface can be used to aggregate information about an appliance operating cycle from more than one component for display, modification, or selection by a user.

The functional component 310 can selectively detect the coupling of the consumable reader 300 to an appliance 312, and the consumable reader is given or infers a 'start command'. Upon the selected event, the cycle of operation of the appliance 312 can obtain and communicate with the information associated with consumables 304. This direct communication with the information associated with consumables 304 is facilitated by the consumable reader 300 acting as a smart coupler. Alternatively, direct communication is facilitated by memory within a node in communication with an executing operation cycle previously populated by the consumable reader that is acting as a smart coupler.

The consumable holder 16, 314 can include or can be coupled to a consumable reader 22, 36, 300. When a consumable holder further comprises a controller such as controller 32 (see FIG. 2) in operable communication with a network, the consumable holder 16 is a smart coupler in that it is the mechanism to transfer data from the consumable information holder 306 to a node on the network. The consumable holder 16 can also be a consumable reader 300 in that from the perspective of a first node of the network, the consumable holder 16 is the node on the network that supplies the functionality of the consumable reader 300. Therefore in one embodiment, a consumable holder is at least one of a smart coupler and a consumable reader that further physically contains a consumable and can also be enabled to directly actuate the introduction of a consumable into an appliance.

Message Binding

Further explanation of message binding may be helpful with respect to the incorporated disclosure of WO2006135726 and the messaging of a fully enabled consumable holder according to the invention. The software architecture can preferably support and promote both asynchronous and synchronous data collection. Asynchronous memory polling, for example, is available in the Core API (API ID=1). There are at least two available embodiments of synchronous data collection.

Understanding the invention related to synchronous data collection is helped by an understanding of the concept of bounded updates. Bounded updates are events that are grouped together as a snapshot of the appliance state taken during the same scan of the host microprocessor's main loop execution. The appliance control main loop will allow for an iterative update of feedback variables that are registered with an appliance eventing engine. Each registered variable is monitored and only those that change value according to their memory monitor change operator are broadcast as updates to the client. When updates are in the process of being broadcast, no new updates are allowed in order to preserve the snapshot in time.

In the first embodiment, a snapshot is communicated to the client using the MMP flag in Byte 2 of the software architecture header as shown in the application protocol as shown in FIG. 4 of WO2006135726. While the MMP is true, more messages are pending for the snapshot. When MMP is false, the current message is the last message in the snapshot. Therefore, if the first message of a snapshot is the only message in that snapshot, MMP will be false.

The example in FIG. 9 of WO2006135726 illustrates a bounded command (Cycle+Temperature+MMP) with acknowledgements, followed by two consecutive bounded updates. Where bounded refers to elements of protocol which indicate to the receiver that more messages are coming from the source and that data processing by the application logic of the receiving component should be delayed until the bounding indicators of the protocol within the packet structure (MMP bit 7) indicate a complete transaction at which time data processing by the application logic is permitted. Notice that updates do not begin until bounded command execution is complete, providing the client the ability to filter away transient feedback data. Bounded commands are provided by the same mechanism, MMP, as bounded updates in order to provide applications a greater level of control.

The example of FIG. 9 in WO2006135726 is conceptual. The actual mechanism is MMP. However for illustrative purpose, the bounded command begins with an initial "begin" command initiator (MMP set) and includes commands to set a washer cycle to wash, a recipe status to ready, a water temperature to medium, again a recipe status to ready, and finally a cycle start indicator, followed by a command terminator (MMP unset). It can be noted that, in FIG. 9 in WO2006135726, updates, such as by eventing, are disabled to prevent updates from happening before the bounded command is complete. In addition, a "process command" indicator is shown periodically throughout the bounded command processing in the appliance to illustrate the portions of the command issued from the client 16 through the internal communications network are processed.

In the bounded updates, the updates are once again enabled since they were disabled at the beginning of the bounded command to allow the appliance to report its status to the client. In the example shown in bounded updates, the acknowledgment state is shown to ready, the cycle is reported as wash, the state is reported as running, the basket is reported as fill, the pump is reported as on, and the temperature is reported as medium. Again, beginning and terminating indicators enclose the bounded update 44. These beginning and terminating indicators can be reported by use of the flag, MMP, in the application packet structure as discussed in FIG. 4 of WO2006135726 or another method which would be apparent to one skilled in the art of network protocol.

In the bounded update, the basket is reported as agitate, the pump is reported as off and the motor is reported as on. Again, beginning and terminating indicators (MMP) enclose the bounded update 46. Without the beginning and terminating indicators (MMP), the client cannot deduce a relationship between the updates from the appliance. However, with beginning and terminating indicators (MMP), the client can deduce a relationship between the events.

The second embodiment of synchronous data collection is shown in FIG. 32 of WO2006135726. Generally, a node comprises at least a micro-processor, a memory, software, and circuitry coupled to a transmission media where the node is configured to take information from the memory of the micro-processor and, with the circuitry, produce a signal representing that information onto a transmission media. Two nodes in communication with each other could be two microprocessors on a single printed circuit board connected by a serial communications or two computers connected via the internet.

Figure 12:
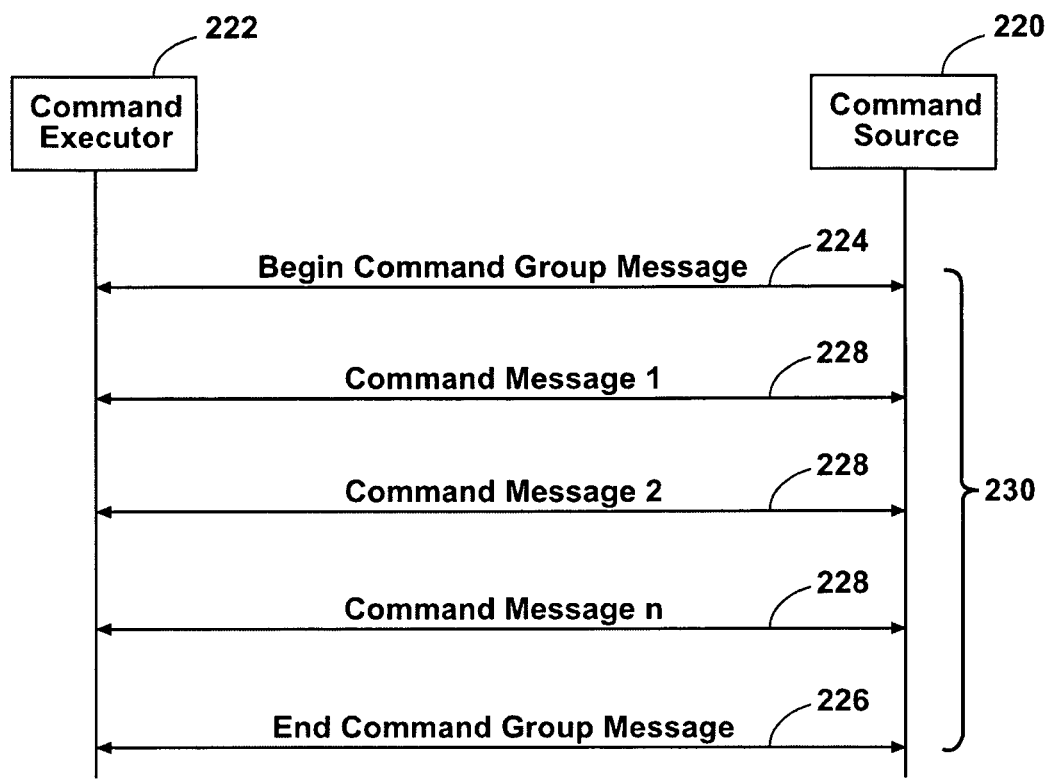
FIG. 12 illustrates synchronous data collection by binding messages in a command group.

As shown in FIG. 12, it is conventional for a command source 220 to send a complete command within one complete message to a command executor 222. The invention, however, contemplates using multiple messages to convey the elements of a command so that a command can be modular and can be composed by command elements. For this to work, the command executor 222 needs to know when to execute the command comprised of multiple command elements, each of which were sent as an independent single command message. The invention provides a solution by providing a begin command group message 224 and an end command group message 226, which inform the command executor 222 as to the which command elements belong together for the purpose of executing a plurality of command elements as a single aggregated command.

FIG. 12 shows how the command source 220, using a begin command group message 224 and an end command group message 226 bounding a series if independent command messages 228 can create a command group 230. Without a begin command group message 224 and an end command group message 226, the command executor 222 cannot deduce a relationship between command message 1, 2, through N. However, with the begin command group message 224 and the end command group message 226, the command executor 222 can deduce a relationship between the command messages 228. In message aggregation, whether data collection or batched commands, the MMP flag can be used to identify the beginning and ending of the message group.

A consumable holder communicating with an appliance on a network using a network protocol which supports message binding can be an important feature relating to the consumable holder's controller 32 in the process of executing logic which might result in one of the actuation of the introduction of a consumable to an appliance and an effect to an appliance cycle of operation or display of a user interface. This is because the execution logic may use a plurality of data received in a plurality of messages wherein the plurality of data functionally belongs to a plurality of valid data sets. With message binding, the execution logic will use a single valid data set per execution scan wherein the valid data set are constructed from data received in the plurality of messages according to groupings implied by the binding.

Figure 13:
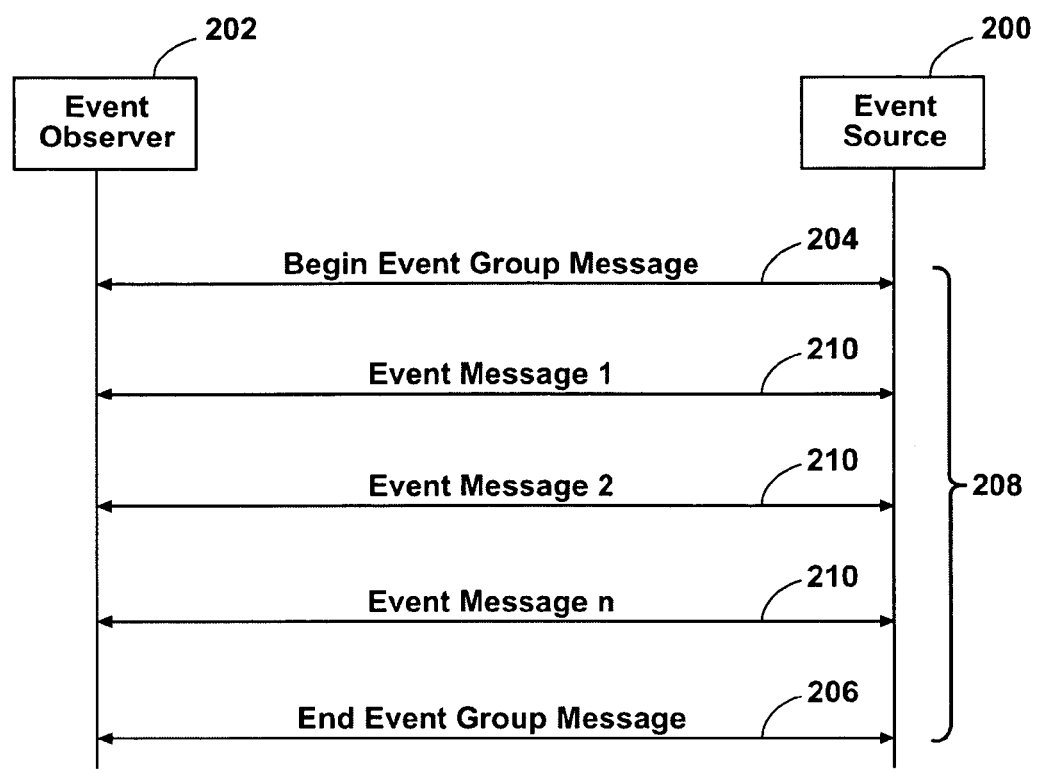
FIG. 13 illustrates the technique of FIG. 11 to bind event messages.

This technique can also be used to batch event, as shown in FIG. 13, which shows an eventing software architecture for communications between one node, event source 200, and a second node, event observer 202. The software architecture contemplates the event source sending a message to the event observer about the event. Rather than sending a single message, however, the event source 200 can use a begin event group message 204 and an end event group message 206 to create an event group 208 from a series of individual event messages 210. An advantage of sending separate messages in this technique is that it more efficiently uses the messaging architecture in rapidly changing states of an appliance and minimizes the number of uniquely identified messages needed to express the state of an appliance. Without the begin and end event group messages, the event observer 202 cannot deduce a relationship between any event messages 1, 2, ... , and n. However, with the begin and end event group messages, the event observer 202 can deduce a relationship between the events.

EXAMPLES

Messaging

Figure 14:
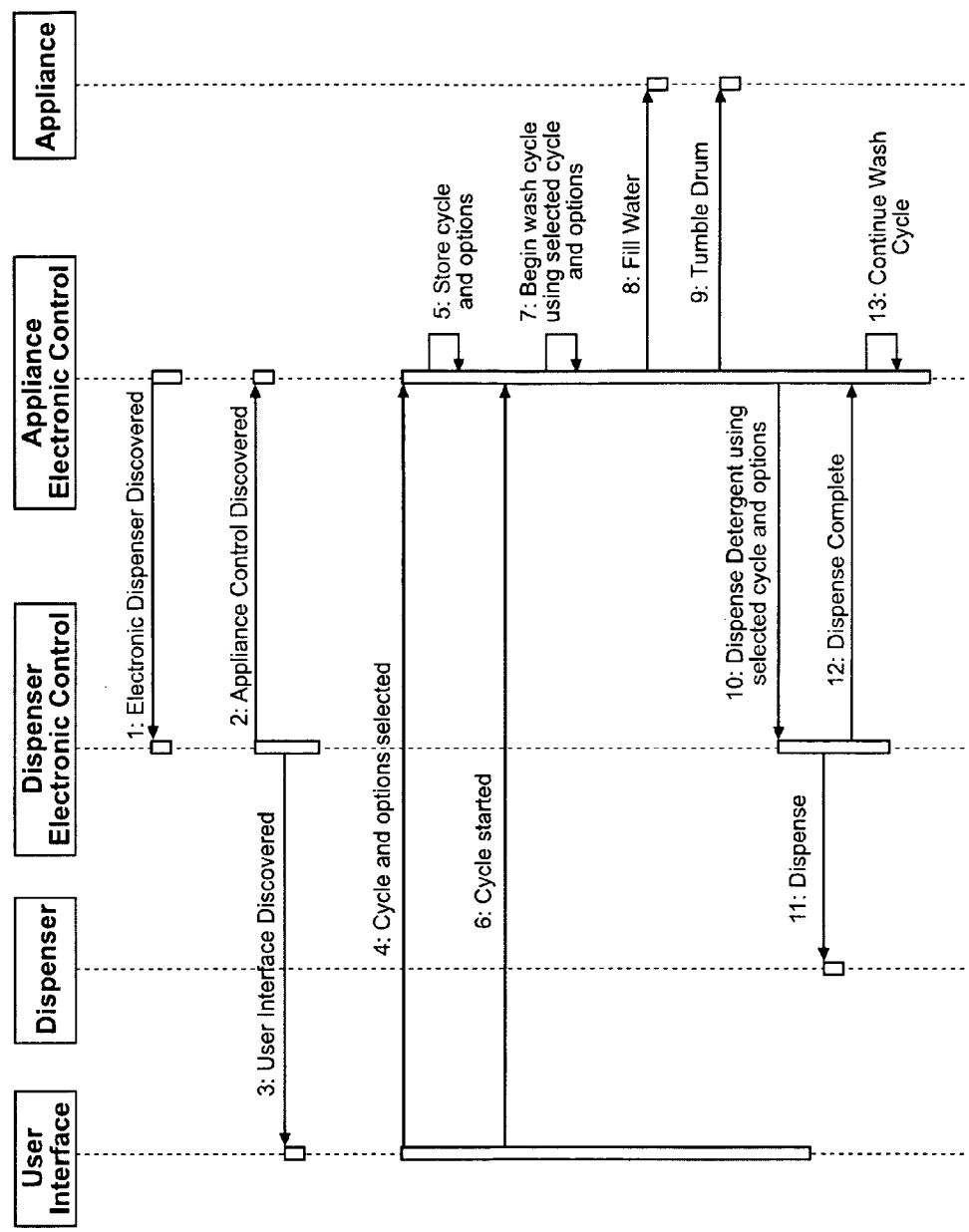
FIG. 14 illustrates messaging between a consumable holder and an appliance according to one embodiment of the invention.
Figure 15:
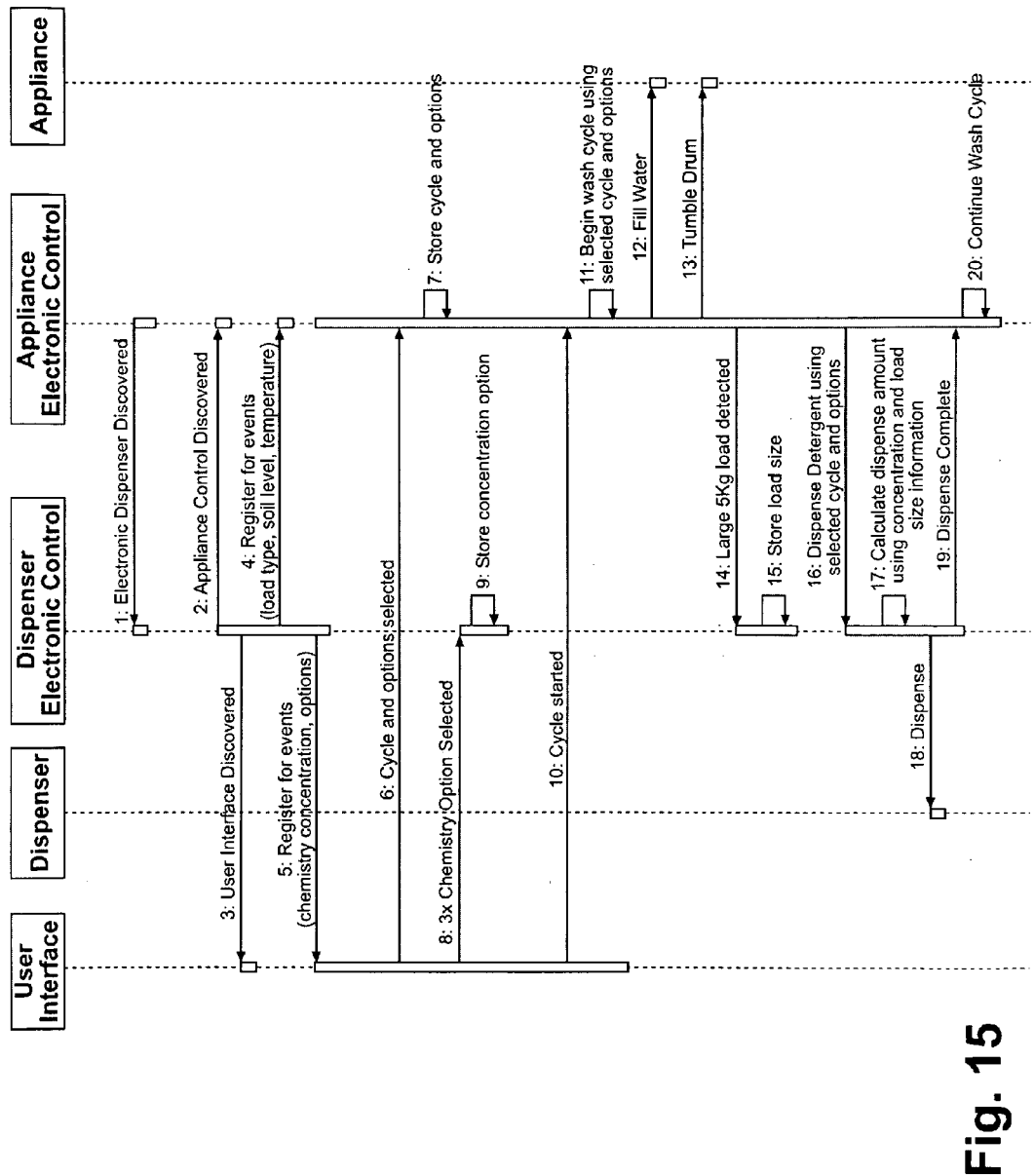
FIG. 15 illustrates messaging between a consumable holder and an appliance according to another embodiment of the invention.
Figure 16:
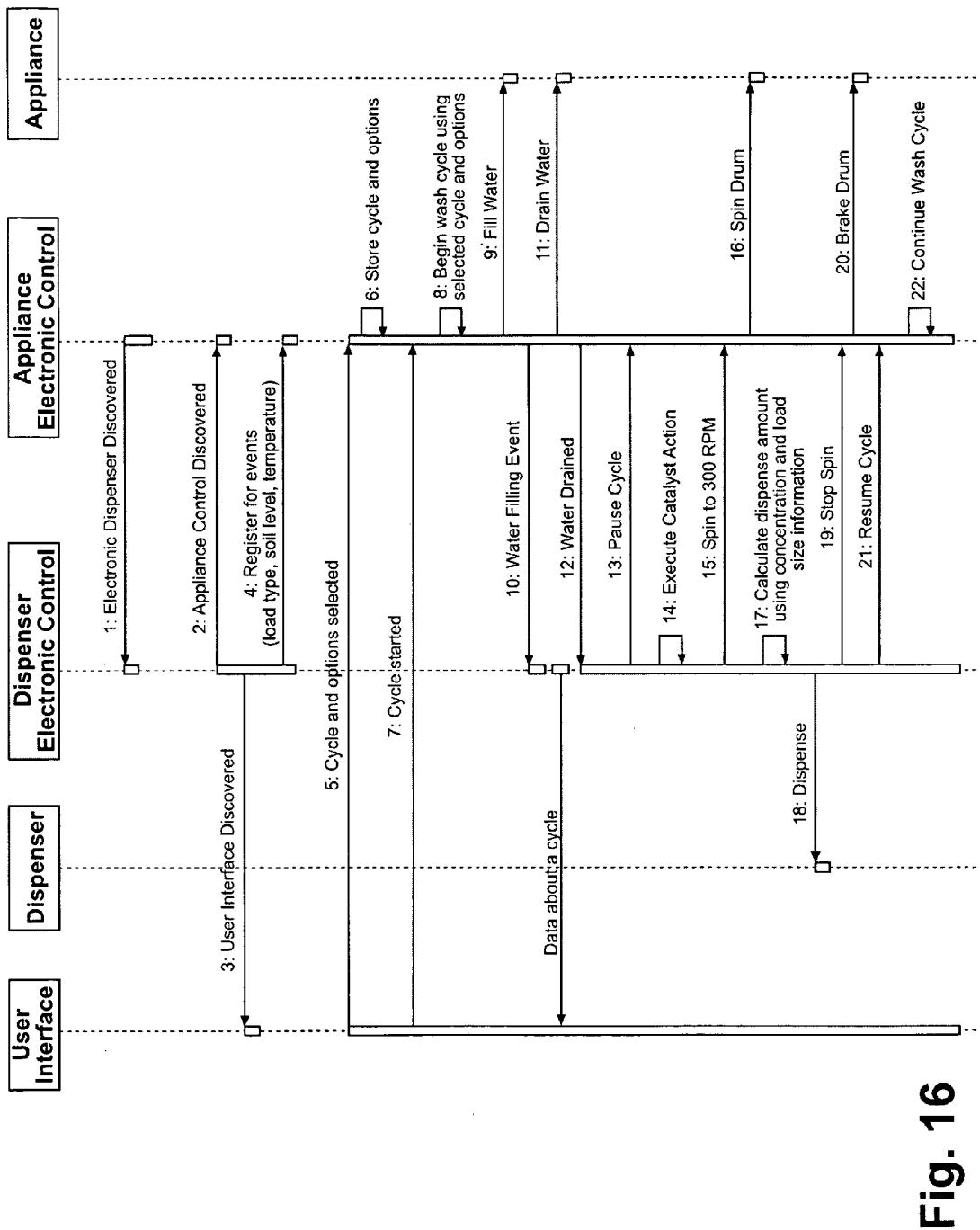
FIG. 16 illustrates messaging between a consumable holder and an appliance according to another embodiment of the invention.

Implementation of the inventive concepts in a washing machine can be seen in FIGS. 14-16. It is assumed that the washing machine is able to discover or detect the presence of the consumable holder and its functionalities. Likewise, the consumable holder is able to detect the presence of the washing machine control. Each is able to discover the capabilities of the other (through the use of standard interfaces) and use this information to collaborate together to provide new features for the user.

A first mode in FIG. 14 shows the messaging that might be employed when dispensing is needed during a cycle. The appliance control commands the consumable holder to dispense in a specific manner using a set of standard commands for dispensing. An example would be "dispense detergent, medium size."

FIG. 15 illustrates a second scenario where the appliance control can command the consumable holder to dispense at the appropriate time in the cycle through a set of standard commands. In addition to these commands, the consumable holder can gather other information from the appliance control and its related sensors such as but not limited to load size, load type, soil level, and temperature. The consumable holder can use this status information along with its own dispensing algorithm to dispense a more effective or more accurate chemistry amount and/or type. In addition to gathering cycle or sensor-based data from the appliance control, data can also be gathered from the user interface. This could include details such as detergent concentration, or the type of cycle and options selected by the user. This information can also be used to improve the performance of the dispensing algorithm. Finally, if the consumable holder is able to sense properties about the consumable that it is holding, such as the brand or type of chemistry, this information can also be integrated with the dispensing algorithm to improve performance.

FIG. 16 illustrates a scenario where the consumable holder can use status information from the appliance control to make decisions on when to dispense or even to change the cycle behavior by commanding the appliance control to execute certain processes. An example of this could be inserting a catalyst-type action into a cycle when dispensing certain chemistries by commanding the appliance control to spin and dispense simultaneously. Another example could be commanding the washer to heat the water to a specific temperature in combination with dispensing in order to best activate a chemical reaction upon dispensing a particular chemistry. The consumable holder can also provide status information to the user interface during this operation to notify the user about the improvement it is making to the appliance cycle process.

Smart Filtration

Figure 17:
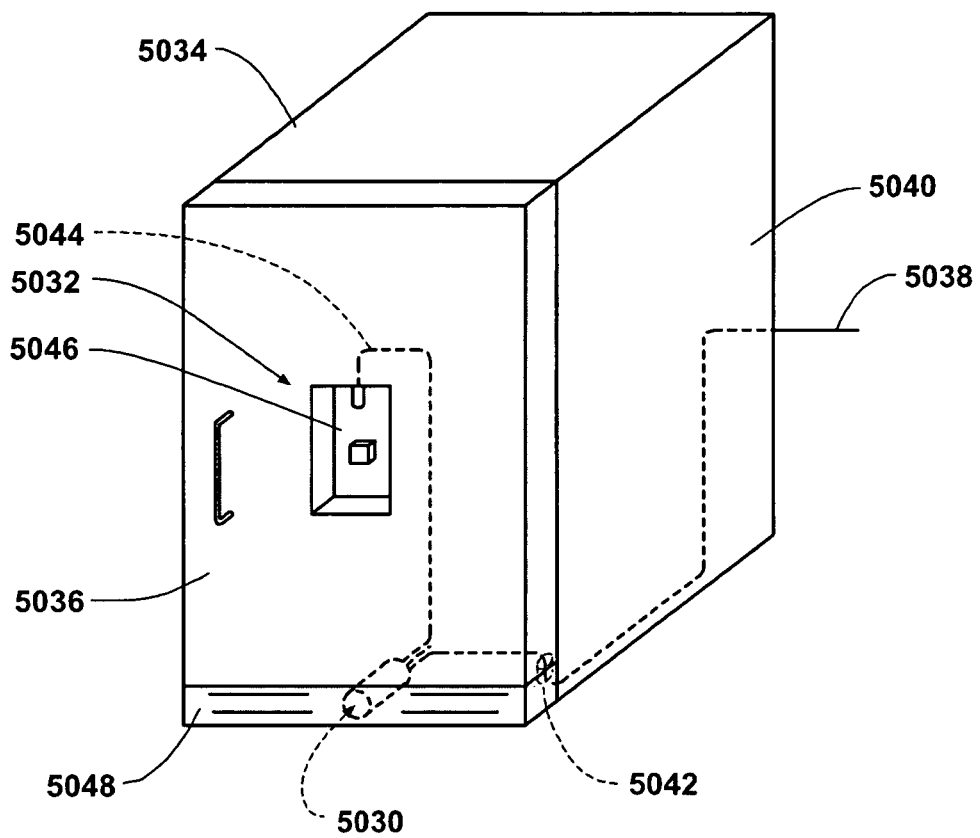
FIG. 17 is a schematic perspective view of a refrigeration appliance with a water filter cartridge system embodying the principles of the present invention.

Another example of a consumable holder according to the invention is found in filtration in a refrigerator as shown in FIGS. 17-20. FIG. 17 illustrates a water filter cartridge system 5030 that may find particular utility in a water dispensing system 5032, such as found in a refrigeration appliance 5034. The present invention also has utility in other appliances and environments and for filtering liquids other than water. For purposes of disclosing an embodiment of the invention, it will be disclosed in the environment of a water dispensing system 5032 in a domestic refrigerator appliance 5034 where the water is dispensed at a door 5036 of the refrigerator. The refrigerator can include a user interface (not shown) as for purposes discussed above. The water is supplied via a water line 5038 plumbed into a building supply, and passes through a cabinet 5040 of the appliance 5034, and into the refrigerator door 5036 at a hinge 5042 for the door. The water line 5038 in the door 5036 is connected to the water filter cartridge system 5030, from which a connecting water line 5044 leads to a water dispenser 5046 accessible from outside of the door 5036. The water filter cartridge system 5030 may be accessible for removal and replacement, such as at stationary ventilation grill 5048 positioned below the door 5036.

Figure 18:
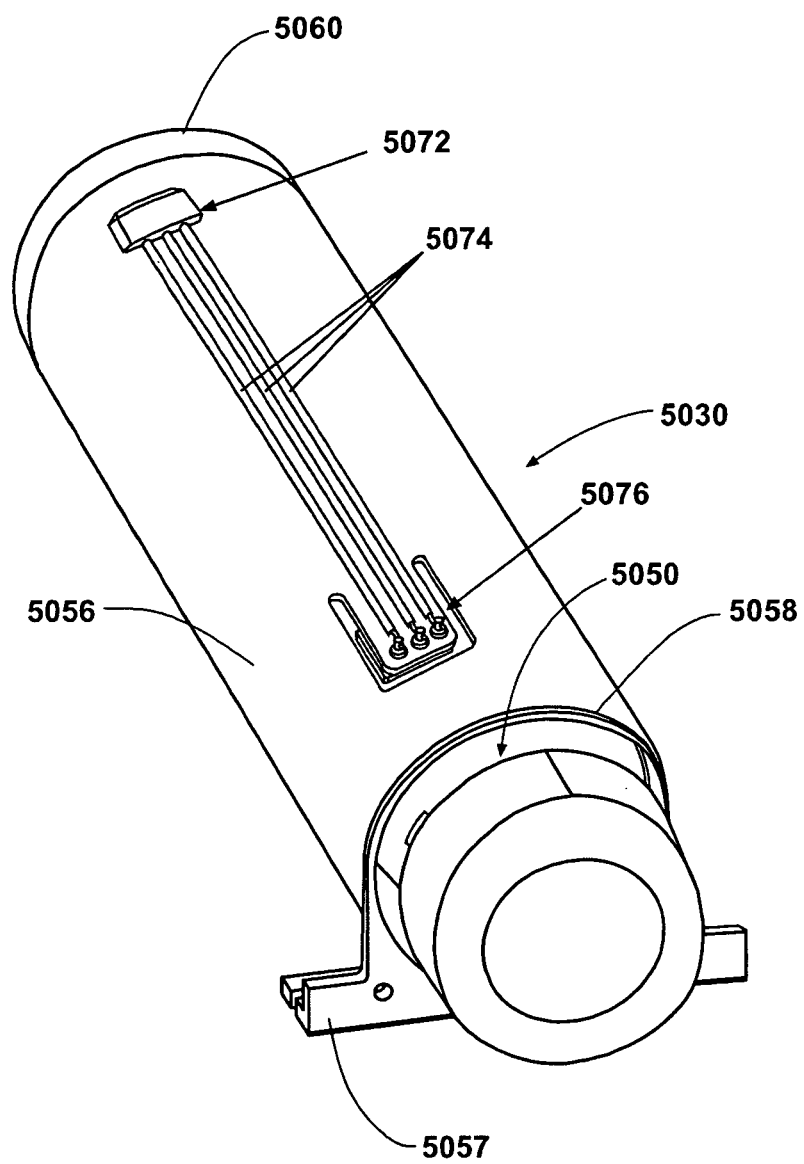
FIG. 18 is a perspective view of the water filter cartridge system of FIG. 16 shown in isolation.
Figure 19:
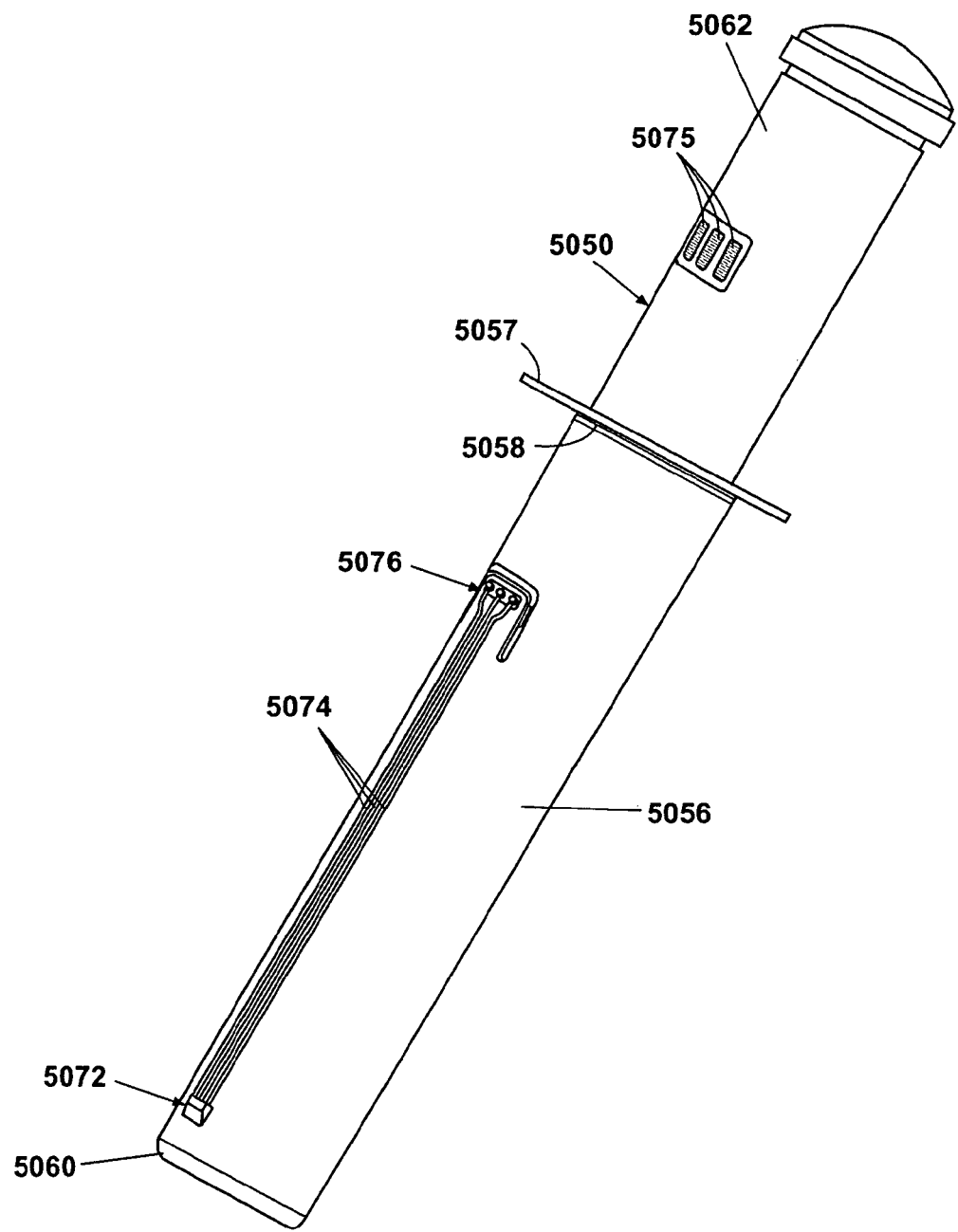
FIG. 19 is a perspective view of components of the water filter cartridge system of FIG. 17 with a cartridge being slightly withdrawn from a housing.

As illustrated in more detail in FIGS. 18-19, the water filter cartridge system 5030 comprises a filter cartridge 5050 and a cartridge housing 5056 which may be permanently attached to the refrigerator 5034, such as via a mounting bracket 5057. The housing 5056 may be in the form of a cylinder with a first open end 5058, and a second end 5060.

The filter cartridge 5050 can have a structure similar to that of a conventional filter cartridge including a porous filter body (not shown) that may have a cylindrical shape, with a similarly shaped impermeable housing 5062 having integrally formed end caps. Alternatively, the end caps can be formed separately and removably attached to the housing 5062 by any suitable means, such as by a snap fit. The cartridge 5050 has an outer diameter sized to fit within the housing 5062. One end of the housing comprises inlet and outlet passages (not shown) to allow unfiltered and filtered liquid, respectively, to flow therethrough.

The filter cartridge 5050 further comprises an identifying element 5075. The identifying element 5075 can be any device capable of storing or providing data and/or information associated with the water filter cartridge system 5030 such as, but not limited to, a barcode, a magnetic strip, a microprocessor, a memory chip, a license key, a specialized structure, a smart card, matermetrics (magnetic nanotechnology fingerprints), a magnetic switch, or an RFID. As shown, the identifying element 5075 comprises a memory chip. The identifying element 5075 can store a unique identifier for a particular filter cartridge, as well as characteristics and other information associated with the filter cartridge and/or its use.

Alternatively, the identifying element 5075 can be separate from the filter cartridge 5050, such as in the form of a license key (not shown). The license key would be configured to plug into a connector on the appliance 5034 and to communicate with the appliance 5034 and across the network of the appliance 5034. The license key can contain a unique identifier, as well as information about the filter cartridge 5050.

The appliance 5034 can comprise a reading element 5076, which can be a type of consumable reader, for communicatively coupling the appliance 5034 with the identifying element 5075. In the embodiment illustrated in FIGS. 18-19, the reading element 5076 is positioned on the cartridge housing 5056 and is communicatively coupled to the appliance 5034 via wires 5074 attached to an appliance contact 5072. The reading element 5076 extends through the cartridge housing 5056 such that the reading element 5076 is configured for placement against or adjacent to the identifying element 5075 when the filter cartridge 5050 is inserted into the cartridge housing 5056. If necessary, the appliance 5034 and/or the cartridge housing 5056 can include positioning elements (not shown) for ensuring proper alignment between the identifying element 5075 and reading element 5076 when the water filter cartridge 5050 is inserted into the cartridge housing 5056, as is shown in FIG. 19.

The appliance contact 5072 is configured to communicatively couple to the appliance 5034 when the cartridge housing 5056 is mounted in the appliance 5034. This can be accomplished by configuring the housing 5056 and/or mounting bracket 5057 to maintain the appliance contact 5072 in a position adjacent or abutting a housing contact (not shown) in the appliance 5034. The housing contact can be communicatively coupled to a network of the appliance 5034.

In other embodiments, the reading element 5076 can be positioned on the appliance 5034 or elsewhere on the cartridge housing 5056. For example, the reading element 5076 can be installed near the cartridge housing 5056 in a machine compartment of the appliance 5034. Installing the reading element 5076 in the appliance 5034 is particularly useful in the event that the identifying element 5075 does not require a wired connection with the reading element 5076 in order to communicate, such as when the identifying element 5075 is an RFID chip and the reading element 5076 is an RFID reader.

The reading element 5076 is configured to obtain, exchange, store, deliver, detect, and/or verify data and/or information by communicating with the identifying element 5075. The reading element 5076 can read data from the identifying element 5075, read and write data from/to the identifying element 5075, or engage in a two-way exchange of data with the identifying element 5075.

The reading element 5076 is communicatively coupled with a controller (not shown) of the water filter cartridge system 5030 such that the reading element 5076 can send data obtained from the identifying element 5075 to the controller. The controller can comprise a control board having software architecture configured for communication on the network such that the controller can communicate with other control boards or clients on the network. The controller can further comprise a unique identifier identifying at least one functionality associated with the filter cartridge system 5030 that can be communicated to the appliance 5034. The reading element 5076 can be configured for one or two-way communication with the controller. The controller can be a microprocessor having an internal memory or a memory associated therewith. The controller can be part of the reading element 5076. Alternatively, the controller can be located at any another point on the network of the appliance 5034 or on a network connected to the appliance 5034 and enabled for communication therewith. The controller can be configured for one or two way communication with the appliance 5034 and can be communicatively coupled to the appliance 5034 in a wired or wireless manner.

The Filter Cartridge System as a Node on a Network

The filter cartridge system 5030 can be a node on the network of the appliance 5034. As part of a node, the controller can communicate information related to filter cartridge 5050 (a consumable) to the appliance 5034. The controller can inform the appliance of the properties of the filter cartridge 5050 and the correct usage information using information received from the reading element 5076. The controller can be coupled to the network of the appliance 5034 via a direct wired connection or by a wireless connection. The controller includes the software architecture that enables communication and connection to the network of the appliance 5034. The controller can monitor and record events, communicate with other nodes on the network of the appliance 5034, or affect a cycle of operation of the appliance 5034. The controller can propagate and transfer information to additional networks, such as a third network connected to the network of the appliance 5034, or any other networks connected thereto.

The filter cartridge system 5030 can be discovered by other nodes on the network of the appliance 5034 using discovery messages. By taking advantage of this feature and sending messages to and from the controller, the appliance 5034 can automatically detect the water filter cartridge system 5030 and discover its capabilities. This also enables the water filter cartridge system 5030 control methods and algorithms to reside on the controller, rather than on the main appliance control. Because of this modular functionality, the appliance 5034 will be able to accept a larger variety of filters and can easily adapt to new features and configurations associated with the filter cartridge system 5030. The appliance 5034 can also automatically discover filter cartridges 5050 and the status of any installed filter cartridge 5050 can be communicated to the appliance 5034. Similarly, the filter cartridge system 5030 controller can query the network for the unique identifiers of the functionalities available in the appliance 5034.

Using the software architecture, the water filter cartridge system 5030 can be used to provide instructions or directions for changing appliance 5034 behavior. The controller of the filter cartridge system 5030 can send messages to the appliance 5034 to configure the appliance 5034. The filter cartridge 5050 can include data and information on the identifying element 5075 that can provide characteristics or information to the appliance 5034 through the reading element 5076. This information will be used by the appliance 5034 to modify appliance operation. The identifying element 5075 contain at least one of additional cycles of operation, updated cycles of operation, historical information relating to cycles of operation experienced by the appliance, and software to reconfigure the software architecture of the filter cartridge system 5030 or the appliance 5034.

For example, the filter cartridge 5050 can send the appliance 5034 information regarding volume capacity, flow rating, filtration capabilities, and time/temperature dependence of the filter cartridge 5050. The appliance 5034 can use this information to modify filter cartridge parameters stored in the system, such as by changing a filter cartridge life algorithm. This also enables the use of a number of different filter cartridges because as long as a desired filter cartridge is configured for insertion into the cartridge housing 5056, the appliance 5034 can discover the characteristics of the filter cartridge in order to learn how to implement it correctly.

Filter Cartridge Usage Sensing

Communication between the identification element 5075 and the reading element 5076 can be used for notifying a user that the filter cartridge 5050 has expired and needs to be replaced. This can be accomplished by activating at least one filter status indicator (not shown) when the filter requires replacement. The filter status indicator can be an LED, a sound, and/or a display on a user interface, such as a message or image. The filter status indicator is activated when information obtained by the reading element 5076 indicates that the filter cartridge 5050 needs to be changed. Upon replacement of the filter, the indicator will automatically be turned off and reset.

Another example of an indicator that can be used to draw a user's attention to the filter cartridge 5050 and that can also provide feedback regarding the status of the filter cartridge 5050 is an indicator cap. The indicator cap is best used when the filter cartridge system 5030 is easily visible to a user. In the preferred embodiment, the indicator cap comprises two types of plastic. One type of plastic is transparent, and the type of plastic is opaque. The transparent plastic functions as a light pipe and can be molded to include indicia associated with the filter cartridge 5050. The indicator cap can further comprise an LED light positioned between the layers of plastic to illuminate the indicia. The LED light can be changed to different colors or blinked on and off to provide information about the status of the filter cartridge 5050. For example, when a new filter cartridge 5050 is installed, the LED light can be a steady blue color. When the filter cartridge 5050 has only 10% remaining capacity, the LED light can be a steady red color. When the filter cartridge 5050 expires, the light can blink red on and off until the filter cartridge 5050 is replaced.

The controller can store the unique identifier associated with each filter cartridge 5050 installed in the cartridge housing 5056. When a filter cartridge 5050 is installed in the cartridge housing 5056, the reading element 5076 can obtain data from the identifying element 5075 regarding the filter cartridge 5050. The controller can use this data to check the unique identifier of the filter cartridge 5050 against previously stored unique identifiers associated with previously installed filter cartridges. If the controller determines that the unique identifier already exists in the memory, the controller can instruct the reading element 5076 to retrieve information from the identifying element 5075 regarding whether the filter cartridge 5050 has was any remaining capacity. If the control determines that the filter cartridge 5050 has capacity, the controller can enable operation of the water dispensing system 5032 and can update filter-related parameters in the memory. If the controller determines that the filter cartridge has no remaining life, the user can be alerted that a filter replacement is required. If a filter cartridge 5050 is installed and has a unique identifier not stored in the memory, the controller can record the unique identifier and reset any filter status indicators and store filter-related parameters in the memory.

The identifying element 5075 can include information such as the type, brand, serial number, and flow rate of the particular filter cartridge 5050. Because the reading element 5076 and controller can read and store the unique identifier associated with each filter cartridge 5050, the controller is able to distinguish a new filter cartridge from a used one. The controller can also store dates and times of filter cartridge usage in the memory for service and warranty information purposes.

The identifying element 5075 and/or controller can track the total volume of water that passes through each filter cartridge 5050 and/or the total time that each filter cartridge 5050 is used and associate that information with each filter cartridge's unique identifier. This function can be used to monitor water quality and to help maintain proper filtering characteristics and energy requirements.

The filter cartridge 5050 can also include various sensors for determining parameters associated with filter cartridge usage, such as a water contaminant sensor, a water conductivity sensor, a turbidity sensor, electrochemical sensors, and leak sensors. These sensors can comprise but are not limited to simple electrical leads or contacts, IR sensors, ultrasonic sensors, temperature sensors, and/or capacitive sensors. Information gathered by the sensors can be sent to the controller and can be used to control filter cartridge 5050 and filter cartridge system 5030 operation. Based on the sensed parameters and information about the filter cartridge 5050 obtained from the identifying element 5075, the performance of the filter cartridge 5050 can be adjusted. For example, using the user interface, the user select operational properties of the filter cartridge 5050 and filter cartridge system 5030 that will lengthen the life of the filter cartridge 5050 while diminishing the level of filtration of water, or vice versa.

The leak sensor can be positioned such that any water leaking from the filter cartridge 5050 or cartridge housing 5056 will contact the sensor. The sensor can then notify the controller of the leak, and the controller can shut off a water supply or halt operation of the appliance 5034, dispensing system 5032, or filter cartridge system 5030.

In the event that a particular filter cartridge 5050 can be used to add certain additives to the water, such as vitamins and minerals or flavorings, the controller can be used to adjust additive dosing based on information received from the sensors, from the identifying element 5075, and from a user interface. If the filter cartridge 5050 is dispensing vitamins and/or minerals, the controller can use the sensors and information from the identifying element 5075 to ensure that the level of vitamins and minerals being dispensed is within a range deemed safe for consumption. The user interface can also be updated to reflect the particular additives available for dispensing, and the user can control the type and dosing of any additives being dispensed.

Compatible Filter Detection

The identifying element 5075 can enable automatic detection of a compatible filter cartridge 5050. Upon insertion of a cartridge 5050 into the housing 5056, the reading element 5076 can detect the presence of the identifying element 5075 and interact with the identifying element 5075 to ascertain whether the filter cartridge 5050 is compatible with the filter cartridge system 5030 and appliance 5034. A determination of filter cartridge compatibility can be made based on one or more desired filter cartridge traits, such as filter cartridge manufacturer, filter cartridge size, filter type, remaining filter capacity, filter age, and/or whether the filter cartridge is new or used. This can be accomplished by the reading element 5076, which obtains filter cartridge information from the identifying element 5075. The reading element 5076 can send the filter cartridge information to the controller. The controller can compare the filter cartridge information obtained by the reading element 5076 to compatible filter cartridge information contained in the memory of the controller in order to determine whether the filter cartridge 5050 is compatible.

Alternatively or in addition, the cartridge housing 5056 can include a lockout mechanism configured to accept only compatible filter cartridges 5050. The cartridge housing 5056 and/or cartridge 5050 can also include elements (not shown) designed to break or otherwise deform to ensure that only compatible filter cartridges 5050 can be inserted into the cartridge housing 5056. In addition, such elements can be used to prevent cartridges 5050 from being removed and then reinserted into the same or into a different cartridge housing 5056.

If a user inserts an incompatible filter cartridge 5050, the user can be notified using a user interface of the appliance 5034, lights, sounds, or any combination thereof. Operation of the water dispensing system 5032 can be halted until a compatible filter cartridge 5050 is inserted into the cartridge housing 5056. Alternatively, the water dispensing system 5032 can be configured to bypass the water filter cartridge system 5030 in the event that an incompatible filter cartridge is installed by a user.

Alternatively, the filter cartridge 5050 and cartridge housing 5056 can include an auto-eject mechanism (not shown) capability that would mechanically eject incompatible filter cartridges 5050. The auto-eject mechanism can comprise a motorized latch release or an electromagnetic solenoid that will push the filter cartridge 5050 out of the cartridge housing 5056 if the filter cartridge is determined to be incompatible.

The filter cartridge 5050 can further comprise a proximity target located thereon, a proximity sensor located on the cartridge housing 5056, and a sensor-actuated connector (not shown) located on or near the cartridge housing 5056. The proximity target and proximity sensor can be the identifying element 5075 and the reading element 5076, respectively. When the filter cartridge 5050 is installed in the cartridge housing 5056, the proximity sensor can detect the proximity target on the filter cartridge 5050 and then actuate the connector to close an electrical circuit. This circuit provides power to one of: an electronic control that manages the water dispensing system 5032, an electronic solenoid valve that turns a water supply on and off, or another electronic device related to the appliance 5034 and the water filter cartridge system 5030. In another embodiment, the connector can close the electrical circuit once the controller or appliance 5034 receives information from the identifying element 5075 communicating operational information about the filter cartridge 5050.

Data and information contained on the identifying element 5075 can be encrypted or otherwise protected in order to prevent competitors from creating replacement filters without consent.

Filter Cartridge Replacement Process

Figure 20:
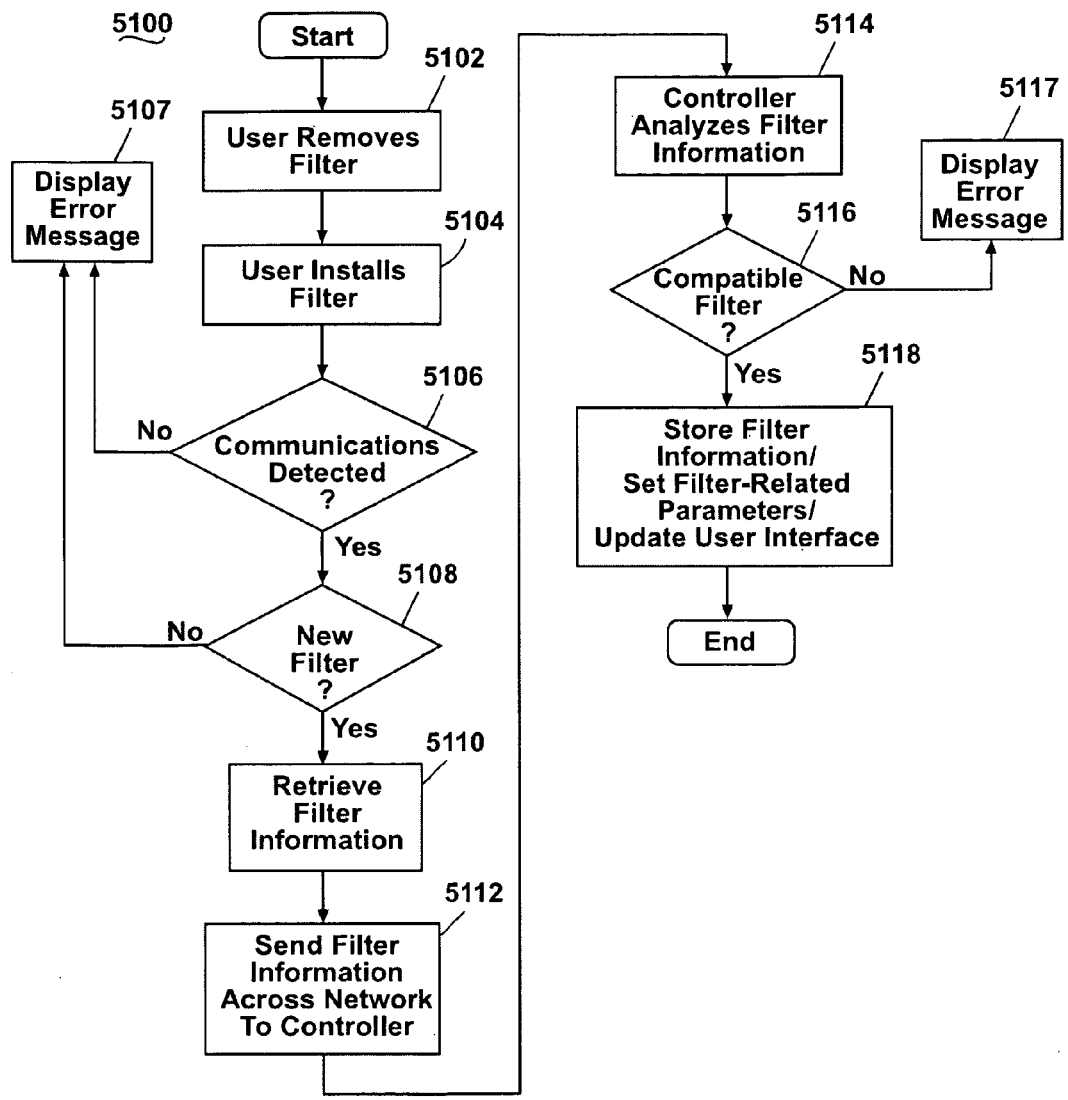
FIG. 20 is a flow chart illustrating an exemplary water filter cartridge replacement process according to one embodiment of the invention.

An exemplary filter cartridge replacement process 5100 is illustrated in FIG. 20. At step 5102, a user removes a used filter cartridge from the cartridge housing 5056. In the event that no filter cartridge 5050 is currently in place, the user simply skips step 5102. At step 5104, the user inserts a new filter cartridge 5104.

If the reading element 5076 is unable to interact or communicate with the identifying element 5075 at step 5106, an error message is displayed 5107 to the user, and operation of the water dispensing system 5032 is halted, and/or the water filter cartridge system 5030 is bypassed.

If communications between the reading element 5076 and the identifying element 5075 are detected, the controller receives communications from the reading element 5076 regarding whether the filter cartridge 5050 has been used before. If the filter cartridge 5050 has been used before and has no further filtration capacity, the error message is displayed 5107, and operation of the water dispensing system 5032 is halted, and/or the water filter cartridge system 5030 is bypassed.

If the filter cartridge 5050 is new, then filter information is retrieved 5110 from the identifying element 5075 by the reading element 5076. The reading element 5076 then sends the filter cartridge information across the network to the controller at step 5112. Once the controller receives the filter cartridge information, the controller analyses the filter cartridge information at step 5114. Based on instructions and other information contained in the memory associated with the controller, the controller determines whether the filter cartridge 5050 is compatible at step 5116. If the filter cartridge 5050 is not compatible, an error message is displayed 5117, and operation of the water dispensing system 5032 is halted, or the water filter cartridge system 5030 is bypassed.

If the filter cartridge 5050 is compatible, then at step 5118, the reading element 5076 sends all information obtained from the identifying element 5075 to the controller to be stored in the memory, all filter cartridge-related parameters are set, and the user interface, if present, is updated to reflect current filter cartridge 5050 information. Normal operation of the water dispensing system 5032 and the water filter cartridge system 5030 can begin.

The present invention has been described utilizing particular embodiments. As will be evident to those skilled in the art, changes and modifications may be made to the disclosed embodiments and yet fall within the scope of the present invention. For example, various components could be utilized separately or independently in some embodiments without using all of the other components in the particular described embodiment. The disclosed embodiment is provided only to illustrate aspects of the present invention and not in any way to limit the scope and coverage of the invention. The scope of the invention is therefore to be limited only by the appended claims.

Creating Cycle Structures

Figure 6:
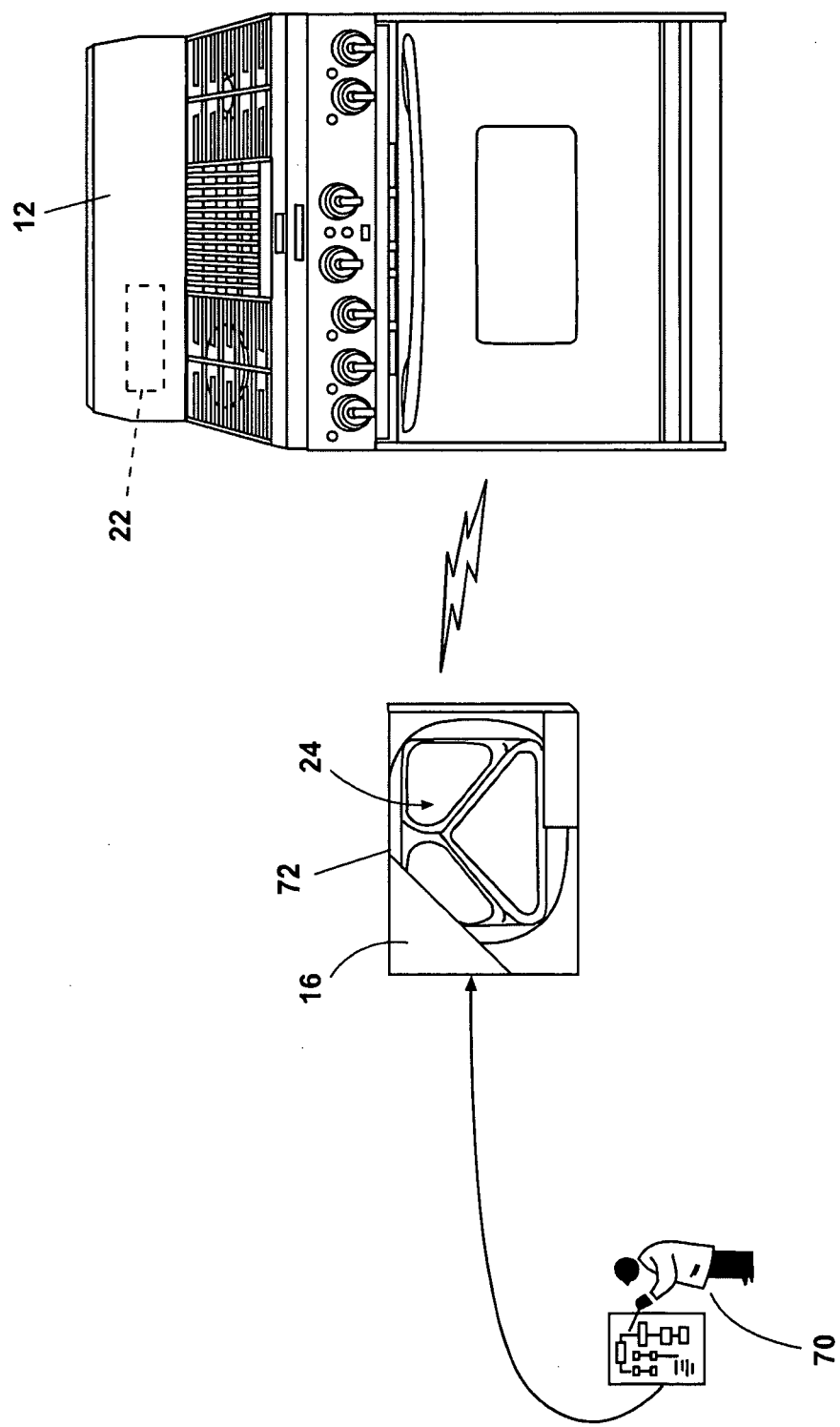
FIG. 6 is a schematic view of a consumable and a consumable reader according to one embodiment of the invention for use with a communicating appliance.

FIG. 21 illustrates how a consumable holder according to the invention can facilitate the creation or modification of cycle structures for an appliance, such as the appliance to which the consumable holder might be coupled. A cycle structure can, of course, be created independently of a consumable holder as by an authoring tool. This may be created, for example, by a food supplier as illustrated in FIG. 6., or any other consumable or article provider of such items as chemicals, detergents, additives, bleaches, softeners, rinse aids, clothing tags and the like. The consumable holder, however, can also facilitate creation or modification of a cycle structure by accessing information associated with the consumable and acting with the cycle engine to create or modify the cycle structure. The information associated with a consumable will more than likely be in a consumable information holder (see FIG. 11). The consumable holder can send the cycle structure information gleaned from the consumable information holder directly to the cycle engine or reply to a query from the cycle engine. If the information is not directly translatable from the consumable information holder, the consumable holder can execute a conversion to convert the information associated with the consumable holder. The converter converts the data to create the cycle structure 71 that the consumable holder can communicate to the cycle engine so that it can create the new or modified cycle structure 71(*b*).

While the invention has been specifically described in connection with certain specific embodiments thereof, it is to be understood that this is by way of illustration and not of limitation, and the scope of the appended claims should be construed as broadly as the prior art will permit.

What is claimed is:

1. An embedded virtual router in a system comprising a device having a first software component configured to obtain and convey information associated with a consumable and an appliance having a second software component configured to perform a physical cycle of operation on an article using the consumable, the improvement wherein the first and second software components collaborate with each other by at least one method of access or exposure to each other to facilitate the cycle of operation, and the embedded virtual router encapsulates routing information about the locations of the first and second software components wherein collaboration between the first and second software components is uniform and identical whether the collaboration is over a network or within a shared runtime environment.

2. The embedded virtual router of claim 1 wherein the device is a consumable reader.

3. The embedded virtual router of claim 1 wherein the system further comprises a consumable holder with an arbitrary software component, whereby the arbitrary software component is configured to communicate over the network via the embedded virtual router.

4. The embedded virtual router of claim 1 wherein the system further comprises a user interface with an arbitrary software component, whereby the arbitrary software component is configured to communicate over the network via the embedded virtual router.

5. The embedded virtual router of claim 1 wherein the first software component is on a first network and the second software component is on a second network whereby the first and second software components are configured to communicate over the networks via the embedded virtual router.

6. In a system comprising a device having a first memory and a first software component configured to obtain and convey information associated with a consumable and an appliance having a second memory and a second software component configured to perform a physical cycle of operation on the consumable or on an article using the consumable, the improvement wherein the first and second software components collaborate with each other by using identification and routing information to facilitate the cycle of operation, and an embedded virtual router in each of the first and second memories encapsulates the identification and routing information associated with the first and second software components, whereby messages can be routed to or through one of the first and second software components using the encapsulated identification and routing information so that collaboration between the first and second software components is independent of architecture dependencies.

7. The embedded virtual router of claim 6 wherein the collaboration comprises a message between a component in the appliance a component in the device.

8. The embedded virtual router of claim 6 wherein the collaboration comprises a message between two components in one of the device and the appliance.

9. The embedded virtual router of claim 6 wherein one of the device and the appliance has a data acquisition engine that stores communicable information associated with an event and the collaboration comprises a message between a software component in one of the device and the appliance and the data acquisition engine.

10. The embedded virtual router of claim 6 further comprising a remote operating environment containing a data acquisition engine that stores communicable information associated with an event and the collaboration comprises a message between a software component in one of the device and the appliance and the data acquisition engine.

11. The embedded virtual router of claim 6 wherein one of the device and the appliance comprises first and second arbitrary software components and the collaboration comprises a message from the first arbitrary software component to the second arbitrary software component that invokes a software function linked to the encapsulated identification and routing information.

12. The embedded virtual router of claim 11 wherein the device is a consumable holder.

13. The embedded virtual router of claim 11 wherein the device is a consumable reader.

14. The embedded virtual router of claim 11 wherein the device is a user interface.

15. The embedded virtual router of claim 6 wherein the first software component is on a first network and the second software component is on a second network whereby the first and second software components can communicate over the network via the embedded virtual router.

16. In a system comprising a device having a first memory and a first software component configured to obtain and convey information associated with a consumable and an appliance having a second memory and a second software component configured to perform a physical cycle of operation on the consumable or on an article using the consumable, the improvement wherein the first and second software components are configured to collaborate with each other by using identification and routing information to facilitate the cycle of operation, each of the first and second memories comprises an embedded virtual router having an encapsulation of identification and routing information associated with the first and second software components, and the collaboration comprises a message from the first software component to the second software component that invokes a software function linked to the encapsulated identification and routing information, whereby messages can be routed to or through one of the first and second software components using the encapsulated identification and routing information so that collaboration between the first and second software components is independent of architecture dependencies.

17. The improvement of claim 16 wherein the device is a consumable holder.

18. The improvement of claim 16 wherein the device is a consumable reader.

19. The improvement of claim 16 wherein the device is a user interface.

\* \* \* \* \*